United States Patent
Vigen et al.

(10) Patent No.: US 12,208,854 B2
(45) Date of Patent: Jan. 28, 2025

(54) SNOWMOBILE FRAME

(71) Applicant: Arctic Cat Inc., Thief River Falls, MN (US)

(72) Inventors: David Vigen, Thief River Falls, MN (US); Todd MacDonald, Montague (CA); Benjamin Taylor Langaas, Thief River Falls, MN (US); Marcus Moldaschel, Thief River Falls, MN (US); Samuel J. Sandoz, Thief River Falls, MN (US); Jacob Tyler Crosby, Oklee, MN (US); Andrew Beavis, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 10 days.

(21) Appl. No.: 18/103,902

(22) Filed: Jan. 31, 2023

(65) Prior Publication Data
US 2023/0257071 A1     Aug. 17, 2023

Related U.S. Application Data

(63) Continuation of application No. 18/090,074, filed on Dec. 28, 2022.
(Continued)

(51) Int. Cl.
*B62M 27/02* (2006.01)
*B62D 65/10* (2006.01)

(52) U.S. Cl.
CPC .......... *B62M 27/02* (2013.01); *B62D 65/10* (2013.01); *B62M 2027/026* (2013.01); *B62M 2027/028* (2013.01)

(58) Field of Classification Search
CPC ............ B62M 27/02; B62M 2027/026; B62M 2027/028; B62D 65/10
See application file for complete search history.

(56) References Cited

U.S. PATENT DOCUMENTS

| 745,862 A | 12/1903 | Kerr |
| 3,529,494 A | 9/1970 | Matte |

(Continued)

FOREIGN PATENT DOCUMENTS

| CA | 2456088 A1 | 8/2001 |
| CA | 2456088 C | 3/2005 |

(Continued)

OTHER PUBLICATIONS

"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.
(Continued)

*Primary Examiner* — Jason D Shanske
*Assistant Examiner* — Matthew James O'Neill
(74) *Attorney, Agent, or Firm* — Billion & Armitage

(57) ABSTRACT

A method of assembling two snowmobiles with a common frame includes providing a common forward frame. A first common component is provided and positioned at a first orientation or at a second orientation with respect to the common forward frame. The first common component is secured at the first orientation or at the second orientation. The method includes selecting between a first set of first model components and a second set of second model components and securing the first set of first model components or the second set of second model components.

28 Claims, 77 Drawing Sheets

Related U.S. Application Data

(60) Provisional application No. 63/434,382, filed on Dec. 21, 2022, provisional application No. 63/405,016, filed on Sep. 9, 2022, provisional application No. 63/405,176, filed on Sep. 9, 2022, provisional application No. 63/405,033, filed on Sep. 9, 2022, provisional application No. 63/405,121, filed on Sep. 9, 2022, provisional application No. 63/404,992, filed on Sep. 9, 2022, provisional application No. 63/404,617, filed on Sep. 8, 2022, provisional application No. 63/404,731, filed on Sep. 8, 2022, provisional application No. 63/404,171, filed on Sep. 6, 2022, provisional application No. 63/402,768, filed on Aug. 31, 2022, provisional application No. 63/400,056, filed on Aug. 23, 2022, provisional application No. 63/344,165, filed on May 20, 2022, provisional application No. 63/310,983, filed on Feb. 16, 2022, provisional application No. 63/310,264, filed on Feb. 15, 2022.

(56) References Cited

U.S. PATENT DOCUMENTS

| | | | |
|---|---|---|---|
| 3,548,961 | A | 12/1970 | Newman |
| 3,688,604 | A | 9/1972 | Schlosser |
| 3,688,856 | A | 9/1972 | Boehm et al. |
| 3,750,774 | A | 8/1973 | Trapp |
| 3,758,169 | A | 9/1973 | Trapp |
| 3,963,083 | A | 6/1976 | Reese |
| 4,489,801 | A | 12/1984 | Marier |
| 4,502,353 | A | 3/1985 | Beaudoin |
| 4,602,525 | A | 7/1986 | Moroto et al. |
| 4,620,604 | A | 11/1986 | Talbot |
| 4,667,758 | A | 5/1987 | Tamura |
| 4,892,165 | A | 1/1990 | Yasui et al. |
| 4,940,100 | A | 7/1990 | Ueda |
| 4,987,965 | A | 1/1991 | Bourret |
| 5,000,056 | A | 3/1991 | Crawford et al. |
| 5,152,255 | A | 10/1992 | Fukuda |
| 5,232,066 | A | 8/1993 | Schnelker |
| 5,251,718 | A | 10/1993 | Inagawa et al. |
| 5,660,245 | A | 8/1997 | Marier et al. |
| 5,862,662 | A | 1/1999 | Fukuda et al. |
| 5,924,514 | A | 7/1999 | Bullerdick |
| 5,957,230 | A | 9/1999 | Harano et al. |
| 6,109,217 | A | 8/2000 | Hedlund et al. |
| 6,161,908 | A | 12/2000 | Takayama et al. |
| 6,170,589 | B1 | 1/2001 | Kawano et al. |
| 6,224,134 | B1 | 5/2001 | Johnson et al. |
| 6,270,106 | B1 | 8/2001 | Maki et al. |
| 6,419,533 | B2 | 7/2002 | Lecours |
| 6,446,744 | B2 | 9/2002 | Wubbolts et al. |
| 6,561,297 | B2 | 5/2003 | Yatagai et al. |
| 6,561,302 | B2 | 5/2003 | Karpik |
| 6,604,594 | B2 | 8/2003 | Wubbolts et al. |
| 6,644,261 | B2 | 11/2003 | Morii et al. |
| 6,651,764 | B2 | 11/2003 | Fournier et al. |
| 6,651,765 | B1 | 11/2003 | Weinzierl |
| 6,681,724 | B1 | 1/2004 | Berg |
| 6,695,087 | B2 | 2/2004 | Fournier et al. |
| 6,712,541 | B1 | 3/2004 | Henricksen |
| 6,745,862 | B2 | 6/2004 | Morii et al. |
| 6,749,036 | B1 | 6/2004 | Schrapp et al. |
| 6,758,497 | B2 | 7/2004 | Bergman |
| 6,823,957 | B2 | 11/2004 | Girouard et al. |
| 6,823,960 | B2 | 11/2004 | Shimizu et al. |
| 6,860,352 | B2 | 3/2005 | Mallette et al. |
| 6,860,826 | B1 | 3/2005 | Johnson |
| 6,890,010 | B2 | 5/2005 | Bergman |
| 6,904,990 | B2 | 6/2005 | Etou |
| 6,923,284 | B2 | 8/2005 | Bédard et al. |
| 6,923,287 | B2 | 8/2005 | Morii |
| 6,926,107 | B2 | 8/2005 | Nishijima |
| 6,941,924 | B2 | 9/2005 | Morii et al. |
| 6,942,050 | B1 | 9/2005 | Honkala et al. |
| 6,942,052 | B1 | 9/2005 | Blakely |
| 6,951,523 | B1 | 10/2005 | Dieter et al. |
| 6,955,237 | B1 | 10/2005 | Przekwas et al. |
| 6,966,395 | B2 | 11/2005 | Schuehmacher et al. |
| 6,976,550 | B2 | 12/2005 | Vaisanen |
| 6,981,564 | B2 | 1/2006 | Bédard et al. |
| 7,011,173 | B2 | 3/2006 | Cadotte et al. |
| 7,025,161 | B2 | 4/2006 | Bertrand et al. |
| 7,032,561 | B2 | 4/2006 | Morii et al. |
| 7,036,619 | B2 | 5/2006 | Yatagai et al. |
| 7,048,293 | B2 | 5/2006 | Bédard |
| 7,063,178 | B2 | 6/2006 | Etou |
| 7,080,704 | B1 | 7/2006 | Kerner et al. |
| 7,083,024 | B2 | 8/2006 | Bergman et al. |
| 7,096,988 | B2 | 8/2006 | Moriyama |
| 7,104,352 | B2 | 9/2006 | Weinzierl et al. |
| 7,104,355 | B2 | 9/2006 | Hoi |
| 7,124,846 | B2 | 10/2006 | Bédard et al. |
| 7,124,847 | B2 | 10/2006 | Girouard et al. |
| 7,124,848 | B2 | 10/2006 | Girouard et al. |
| 7,128,176 | B1 | 10/2006 | Mills et al. |
| 7,140,463 | B2 | 11/2006 | Morii et al. |
| 7,147,074 | B1 | 12/2006 | Berg et al. |
| 7,150,336 | B2 | 12/2006 | Desmarais |
| 7,152,706 | B2 | 12/2006 | Pichler et al. |
| 7,188,693 | B2 | 3/2007 | Girouard et al. |
| 7,198,126 | B2 | 4/2007 | Vaisanen |
| 7,198,127 | B2 | 4/2007 | Yatagai et al. |
| 7,204,355 | B2 | 4/2007 | Akiyama et al. |
| 7,204,497 | B2 | 4/2007 | Bergman |
| 7,213,668 | B2 | 5/2007 | Richard et al. |
| 7,213,669 | B2 | 5/2007 | Fecteau et al. |
| 7,249,647 | B2 | 7/2007 | Nietlispach |
| 7,255,068 | B2 | 8/2007 | Ashida |
| 7,255,195 | B2 | 8/2007 | Haruna |
| 7,264,075 | B2 | 9/2007 | Schuemacher et al. |
| 7,281,598 | B2 | 10/2007 | Hoi |
| 7,296,645 | B1 | 11/2007 | Kerner et al. |
| 7,296,657 | B2 | 11/2007 | Ohno et al. |
| 7,300,382 | B2 | 11/2007 | Yamamoto |
| 7,303,037 | B2 | 12/2007 | Yatagai et al. |
| 7,328,765 | B2 | 2/2008 | Ebert et al. |
| 7,353,898 | B1 | 4/2008 | Bates |
| 7,353,899 | B2 | 4/2008 | Abe et al. |
| 7,353,901 | B2 | 4/2008 | Abe et al. |
| 7,357,207 | B2 | 4/2008 | Vaeisaenen |
| 7,360,618 | B2 | 4/2008 | Hibbert et al. |
| 7,370,724 | B2 | 5/2008 | Saito et al. |
| 7,374,016 | B2 | 5/2008 | Yamaguchi et al. |
| 7,377,348 | B2 | 5/2008 | Girouard et al. |
| 7,389,842 | B2 | 6/2008 | Inoguchi et al. |
| 7,401,674 | B1 | 7/2008 | Berg et al. |
| 7,401,816 | B2 | 7/2008 | Abe et al. |
| 7,409,949 | B1 | 8/2008 | Zauner et al. |
| 7,410,182 | B1 | 8/2008 | Giese |
| 7,413,046 | B2 | 8/2008 | Okada et al. |
| 7,451,846 | B2 | 11/2008 | Wubbolts et al. |
| 7,458,593 | B2 | 12/2008 | Saito et al. |
| 7,472,771 | B2 | 1/2009 | Yatagai et al. |
| 7,475,751 | B2 | 1/2009 | Pard et al. |
| 7,475,896 | B2 | 1/2009 | Ignacio |
| 7,484,584 | B1 | 2/2009 | Kerner et al. |
| 7,484,762 | B2 | 2/2009 | Miyamoto |
| 7,533,749 | B1 | 5/2009 | Sampson et al. |
| 7,540,511 | B2 | 6/2009 | Saito et al. |
| 7,543,669 | B2 | 6/2009 | Kelahaara |
| 7,543,672 | B2 | 6/2009 | Codere et al. |
| 7,591,332 | B1 | 9/2009 | Bates |
| 7,594,557 | B2 | 9/2009 | Polakowski et al. |
| 7,597,069 | B2 | 10/2009 | Ashida |
| 7,610,132 | B2 | 10/2009 | Yanai et al. |
| 7,617,900 | B2 * | 11/2009 | Olson .................. B62M 27/02 180/190 |
| 7,708,096 | B2 | 5/2010 | Vezina |
| 7,753,154 | B2 | 7/2010 | Maltais |
| 7,775,313 | B1 | 8/2010 | Sampson et al. |
| 7,779,944 | B2 | 8/2010 | Bergman et al. |

(56) References Cited

U.S. PATENT DOCUMENTS

| | | |
|---|---|---|
| 7,779,946 B2 | 8/2010 | Okada et al. |
| 7,789,184 B2 | 9/2010 | Maltais |
| 7,798,529 B2 | 9/2010 | Sato |
| 7,802,644 B2 | 9/2010 | Brodeur et al. |
| 7,802,645 B2 | 9/2010 | Mallette et al. |
| 7,802,646 B2 | 9/2010 | Matsudo |
| 7,806,215 B2 | 10/2010 | Codere et al. |
| 7,815,003 B2 | 10/2010 | Ferrer Almazan |
| 7,878,293 B2 | 2/2011 | Okada et al. |
| 7,891,454 B2 | 2/2011 | Giese et al. |
| 7,913,785 B2 | 3/2011 | Korsumaki et al. |
| 7,918,299 B2 | 4/2011 | Yoshihara |
| 7,950,736 B2 | 5/2011 | Olson |
| 7,980,629 B2 | 7/2011 | Bedard |
| 7,997,372 B2 | 8/2011 | Maltais |
| 8,001,862 B2 | 8/2011 | Albulushi et al. |
| 8,028,795 B2 | 10/2011 | Hisanaga et al. |
| 8,037,961 B2 | 10/2011 | Fecteau |
| 8,074,759 B2 * | 12/2011 | Rasidescu ............ B62M 27/02 29/469 |
| 8,127,877 B2 | 3/2012 | Fredrickson et al. |
| 8,167,073 B2 | 5/2012 | Polakowski et al. |
| 8,191,665 B1 | 6/2012 | Sampson et al. |
| 8,225,896 B2 | 7/2012 | Eichenberger et al. |
| 8,235,164 B2 | 8/2012 | Okada et al. |
| 8,240,417 B2 | 8/2012 | Takata |
| 8,281,889 B2 | 10/2012 | Inoue |
| 8,381,857 B1 | 2/2013 | Sampson et al. |
| 8,402,861 B2 | 3/2013 | Olson |
| 8,408,348 B2 | 4/2013 | Nakamura et al. |
| 8,430,197 B2 | 4/2013 | Matsudo |
| 8,453,779 B2 | 6/2013 | Vezina |
| 8,474,783 B2 | 7/2013 | Hu |
| 8,490,731 B2 | 7/2013 | Eaton et al. |
| 8,528,683 B2 | 9/2013 | Beavis et al. |
| 8,567,546 B2 | 10/2013 | Berg et al. |
| 8,590,654 B2 | 11/2013 | Kerner et al. |
| 8,607,912 B2 | 12/2013 | Mallette et al. |
| 8,657,054 B2 | 2/2014 | Mallette et al. |
| 8,733,773 B2 | 5/2014 | Sampson |
| 8,763,745 B2 | 7/2014 | Nagao et al. |
| 8,881,856 B2 | 11/2014 | Fecteau et al. |
| 8,919,477 B2 | 12/2014 | Conn et al. |
| 8,944,204 B2 | 2/2015 | Ripley et al. |
| 8,994,494 B2 | 3/2015 | Koenig et al. |
| 9,022,156 B2 | 5/2015 | Bedard et al. |
| 9,061,732 B1 | 6/2015 | Vezina |
| 9,073,604 B2 | 7/2015 | Mallette et al. |
| 9,090,313 B2 | 7/2015 | Bedard |
| 9,096,289 B2 | 8/2015 | Hedlund et al. |
| 9,114,852 B2 | 8/2015 | Fecteau et al. |
| 9,139,255 B1 | 9/2015 | Glissmeyer et al. |
| 9,162,731 B2 | 10/2015 | Maltais |
| 9,228,581 B2 | 1/2016 | Bernier et al. |
| 9,327,789 B1 | 5/2016 | Vezina et al. |
| 9,346,508 B1 | 5/2016 | Lemieux |
| 9,346,518 B2 | 5/2016 | Polakowski et al. |
| 9,352,801 B2 | 5/2016 | Makitalo et al. |
| 9,352,802 B2 | 5/2016 | Sampson |
| 9,359,022 B2 | 6/2016 | Bedard et al. |
| 9,387,907 B2 | 7/2016 | Nasca et al. |
| 9,428,232 B2 | 8/2016 | Ripley et al. |
| 9,446,810 B2 | 9/2016 | Ripley |
| 9,481,370 B2 | 11/2016 | Bernier et al. |
| 9,540,072 B2 | 1/2017 | Hedulnd |
| 9,545,844 B2 | 1/2017 | Forty et al. |
| 9,610,986 B2 | 4/2017 | Conn |
| 9,618,071 B2 | 4/2017 | Hirota |
| 9,682,746 B2 | 6/2017 | Yasuda et al. |
| 9,683,492 B2 | 6/2017 | Bernier et al. |
| 9,688,354 B2 | 6/2017 | Nagao et al. |
| 9,694,872 B2 | 7/2017 | Laroche et al. |
| 9,738,301 B2 | 8/2017 | Vezina et al. |
| 9,751,552 B2 | 9/2017 | Mangum et al. |
| 9,789,930 B1 | 10/2017 | Vezina et al. |
| 9,796,437 B2 | 10/2017 | Wilson et al. |
| 9,809,195 B2 | 11/2017 | Giese et al. |
| 9,828,064 B2 | 11/2017 | Pard et al. |
| 9,828,065 B2 | 11/2017 | Pard |
| 9,845,004 B2 | 12/2017 | Hedlund et al. |
| 9,873,485 B2 | 1/2018 | Mangum et al. |
| 9,988,067 B1 | 6/2018 | Mangum et al. |
| 10,001,200 B2 | 6/2018 | Parraga Gimeno et al. |
| 10,029,567 B2 | 7/2018 | Lefebvre et al. |
| 10,035,554 B2 | 7/2018 | Mertens et al. |
| 10,065,708 B2 | 9/2018 | Labbe et al. |
| 10,144,486 B2 | 12/2018 | Yasuda et al. |
| 10,195,999 B1 | 2/2019 | Glickman et al. |
| 10,202,169 B2 | 2/2019 | Mangum et al. |
| 10,215,083 B2 | 2/2019 | Vezina et al. |
| 10,232,910 B2 | 3/2019 | Mangum et al. |
| 10,259,507 B1 | 4/2019 | Johnson et al. |
| 10,293,885 B2 | 5/2019 | Vezina et al. |
| 10,300,989 B2 | 5/2019 | Vezina |
| 10,300,990 B2 | 5/2019 | Vezina |
| 10,358,187 B2 | 7/2019 | Vistad et al. |
| 10,377,446 B2 | 8/2019 | Thibault et al. |
| 10,392,079 B2 | 8/2019 | Vezina et al. |
| 10,406,910 B2 | 9/2019 | Vezina et al. |
| 10,435,059 B2 | 10/2019 | Mallette et al. |
| 10,450,968 B2 | 10/2019 | Bernier et al. |
| 10,513,970 B2 | 12/2019 | Vezina et al. |
| 10,526,045 B2 | 1/2020 | Vezina et al. |
| 10,538,262 B2 | 1/2020 | Mangum et al. |
| 10,543,792 B2 | 1/2020 | Yoshioka et al. |
| 10,597,105 B2 | 3/2020 | Lefebvre et al. |
| 10,619,615 B2 | 4/2020 | Dale et al. |
| 10,675,962 B2 | 6/2020 | Urabe et al. |
| 10,676,157 B2 | 6/2020 | Vigen |
| 10,730,576 B2 | 8/2020 | Labbe et al. |
| 10,766,571 B2 | 9/2020 | Sampson et al. |
| 10,766,572 B2 | 9/2020 | Pard et al. |
| 10,766,573 B2 | 9/2020 | Vezina et al. |
| 10,773,684 B2 | 9/2020 | Koenig et al. |
| 10,773,774 B2 | 9/2020 | Mangum et al. |
| 10,780,949 B2 | 9/2020 | Crain et al. |
| 10,793,226 B2 | 10/2020 | Crain et al. |
| 10,800,490 B2 | 10/2020 | Foxhall et al. |
| 10,814,935 B2 | 10/2020 | Vaisanen et al. |
| 10,822,054 B2 | 11/2020 | Lemieux |
| 10,843,758 B2 | 11/2020 | Hebert et al. |
| 10,870,465 B2 | 12/2020 | Crain et al. |
| 10,875,595 B2 | 12/2020 | Laberge et al. |
| 10,875,605 B2 | 12/2020 | Pard |
| 10,899,415 B2 | 1/2021 | Mangum et al. |
| 10,913,512 B2 | 2/2021 | Thompson et al. |
| 10,960,914 B2 | 3/2021 | Mangum et al. |
| 10,974,790 B2 | 4/2021 | Hosaluk et al. |
| 11,027,794 B2 | 6/2021 | Vigen |
| 11,097,793 B2 | 8/2021 | Marchildon et al. |
| 11,110,994 B2 | 9/2021 | Hedlund et al. |
| 11,142,286 B2 | 10/2021 | Sampson et al. |
| 11,208,168 B2 | 12/2021 | Hedlund et al. |
| 11,214,320 B2 | 1/2022 | Bates et al. |
| 11,220,310 B2 | 1/2022 | Pard et al. |
| 11,225,302 B2 | 1/2022 | Vigen |
| 11,230,351 B2 | 1/2022 | Vezina |
| 11,235,634 B2 | 2/2022 | Lavallee et al. |
| 11,286,019 B2 | 3/2022 | Hedlund et al. |
| 11,358,661 B2 | 6/2022 | Laugen et al. |
| 11,384,679 B2 | 7/2022 | Matsumoto et al. |
| 11,415,207 B2 | 8/2022 | Pard et al. |
| 11,505,263 B2 | 11/2022 | Hedlund et al. |
| 11,524,569 B2 | 12/2022 | Vezina et al. |
| 2001/0047900 A1 | 12/2001 | Fecteau et al. |
| 2003/0029663 A1 | 2/2003 | Etou |
| 2003/0127265 A1 | 7/2003 | Watson et al. |
| 2004/0090119 A1 | 5/2004 | Ebert et al. |
| 2005/0016784 A1 | 1/2005 | Fecteau |
| 2005/0205321 A1 * | 9/2005 | Girouard ............ B62K 5/027 180/190 |
| 2005/0205322 A1 | 9/2005 | Girouard et al. |
| 2005/0241867 A1 | 11/2005 | Abe et al. |
| 2006/0162977 A1 | 7/2006 | Etou |

(56) References Cited

U.S. PATENT DOCUMENTS

| | | |
|---|---|---|
| 2008/0277184 A1 | 11/2008 | Marleau |
| 2009/0071737 A1 | 3/2009 | Leonard et al. |
| 2011/0132679 A1 | 6/2011 | Kerner |
| 2011/0168477 A1 | 7/2011 | Yokomori et al. |
| 2012/0205902 A1* | 8/2012 | Beavis ............... B62M 27/02 280/781 |
| 2013/0032418 A1 | 2/2013 | Ripley et al. |
| 2013/0175106 A1 | 7/2013 | Bédard et al. |
| 2013/0206494 A1 | 8/2013 | Hedlund et al. |
| 2015/0021898 A1 | 1/2015 | Serbinski |
| 2016/0068227 A1 | 3/2016 | Yasuda et al. |
| 2017/0101142 A1 | 4/2017 | Hedlund et al. |
| 2017/0247084 A1 | 8/2017 | Vezina |
| 2017/0259877 A1 | 9/2017 | Thompson |
| 2018/0251168 A1* | 9/2018 | Mangum ............... B62K 13/08 |
| 2018/0334211 A1 | 11/2018 | Mertens et al. |
| 2019/0233055 A1 | 8/2019 | Vezina |
| 2019/0256170 A1 | 8/2019 | Labbe |
| 2019/0344657 A1 | 11/2019 | Vezina et al. |
| 2019/0344859 A1 | 11/2019 | Vistad et al. |
| 2020/0148056 A1 | 5/2020 | Forty et al. |
| 2020/0224628 A1 | 7/2020 | Dale et al. |
| 2020/0398785 A1 | 12/2020 | Koenig et al. |
| 2020/0408292 A1* | 12/2020 | Pard ............... F16H 61/0246 |
| 2021/0053652 A1 | 2/2021 | Fuchs et al. |
| 2021/0053653 A1 | 2/2021 | Mangum et al. |
| 2021/0115835 A1 | 4/2021 | Diehl et al. |
| 2021/0122445 A1 | 4/2021 | Thompson et al. |
| 2021/0129943 A1 | 5/2021 | Mangum et al. |
| 2021/0163086 A1 | 6/2021 | Mallette et al. |
| 2021/0188182 A1 | 6/2021 | Edwards et al. |
| 2021/0188185 A1 | 6/2021 | Hedlund et al. |
| 2021/0188376 A1 | 6/2021 | Laugen et al. |
| 2021/0188382 A1 | 6/2021 | Hedlund |
| 2021/0213899 A1 | 7/2021 | Yotsuyanagi et al. |
| 2021/0214044 A1 | 7/2021 | Krings et al. |
| 2021/0229731 A1 | 7/2021 | Stoxen et al. |
| 2021/0245837 A1 | 8/2021 | Vigen |
| 2021/0323629 A1 | 10/2021 | Blackburn et al. |
| 2021/0347432 A1 | 11/2021 | Halvorson |
| 2021/0362807 A1 | 11/2021 | Hedlund et al. |
| 2022/0024541 A1 | 1/2022 | Korsumaki |
| 2022/0097801 A1 | 3/2022 | Vigen |
| 2022/0111929 A1 | 4/2022 | Matsushita |
| 2022/0119049 A1 | 4/2022 | Bates et al. |
| 2022/0177077 A1 | 6/2022 | Vistad et al. |
| 2022/0212754 A1 | 7/2022 | Stock et al. |
| 2022/0349339 A1 | 11/2022 | Schuehmacher et al. |
| 2023/0052282 A1 | 2/2023 | Hedlund et al. |

FOREIGN PATENT DOCUMENTS

| | | |
|---|---|---|
| CA | 2411964 C | 7/2005 |
| CA | 2371477 C | 7/2006 |
| CA | 2363856 C | 1/2008 |
| CA | 2639857 A1 | 6/2009 |
| CA | 2483670 C | 12/2011 |
| CA | 2842698 A1 | 2/2013 |
| CA | 3098848 A1 | 2/2013 |
| CA | 3079718 A1 | 8/2013 |
| CA | 2877554 A1 | 1/2014 |
| CA | 2655481 C | 8/2014 |
| CA | 2955977 A1 | 1/2016 |
| CA | 2987534 A1 | 12/2016 |
| CA | 2748842 C | 1/2017 |
| CA | 2925800 A1 | 10/2017 |
| CA | 2925822 A1 | 10/2017 |
| CA | 2788551 C | 3/2019 |
| CA | 3117886 A1 | 5/2020 |
| CA | 2863952 C | 6/2020 |
| CA | 3030691 C | 10/2020 |
| CA | 3103308 A1 | 6/2021 |
| CN | 105422273 A | 3/2016 |
| DE | 102017114828 A1 | 1/2019 |
| JP | S55125312 A | 9/1980 |
| JP | H10217921 A | 8/1998 |
| JP | 2005193788 A | 7/2005 |
| JP | 4840406 B2 | 10/2011 |
| WO | 8607423 A1 | 12/1986 |
| WO | 2009114414 A1 | 9/2009 |

OTHER PUBLICATIONS

"Front Frame and Footrest Assembly [65748]", https://www.countrycat.com/arctic-cat-parts?gclid=EAlalQobChMI7O-P-JzGgAMVdqtaBR1Dbg33EAAYASABEgKGPvD_BWE#/Arctic_Cat/1997_ZR_440_%5b97ZRA-1997-22-25%5d/FRONT_FRAME_AND_FOOTREST_ASSEMBLY_%5b65748%5d/97ZRA-1997-22-25/65748/y.

"Running Board Support Bracket", https://www.countrycat.com/arctic-cat-parts?gclid=EAlalQobChMI7O-P-JzGgAMVdqtaBR1Dbg33EAAYASABEgKGPvD_BwE#/Arctic_Cat/1992_PANTHER_%5b0650-173-1992-17-02%5d/Tunnel_And_Rear_Bumper_%5b59192%5d/0650-173-1992-17-02/59192/y.

"DE102017114828A1 machine English translation", (Year: 2019), 11 Pages.

* cited by examiner

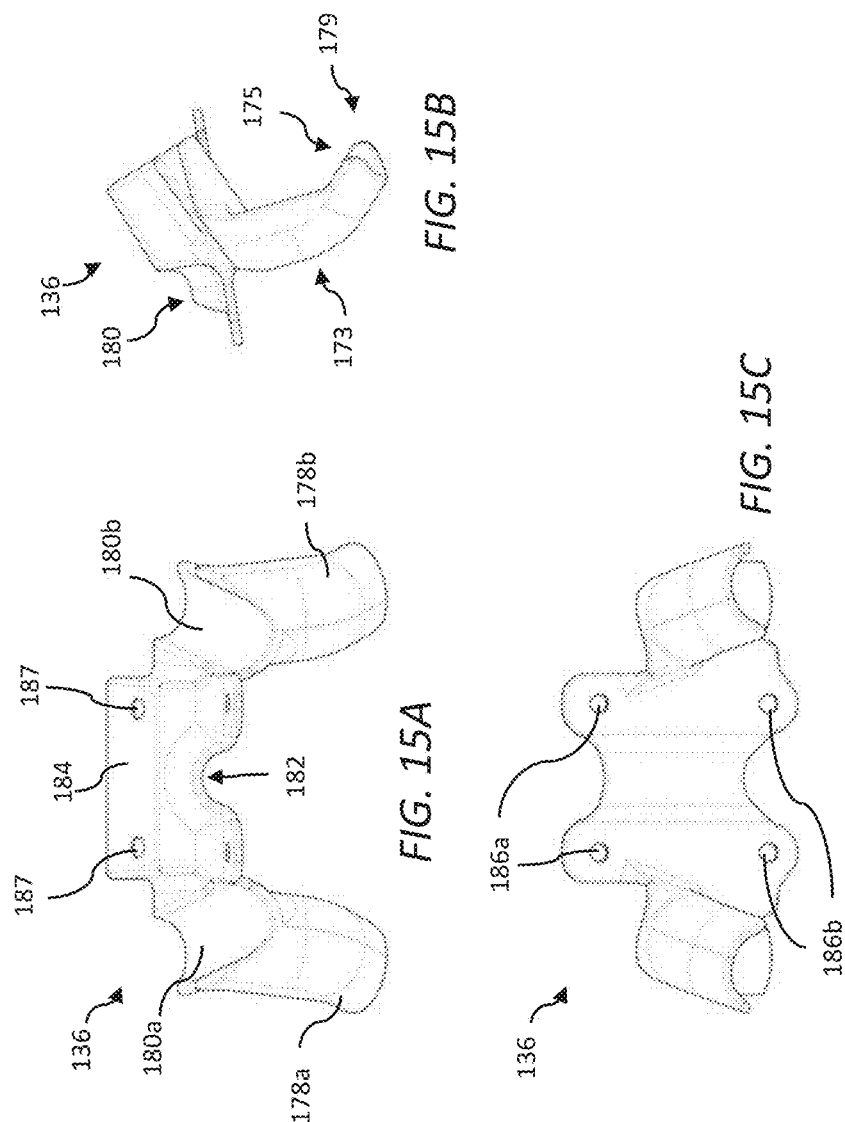

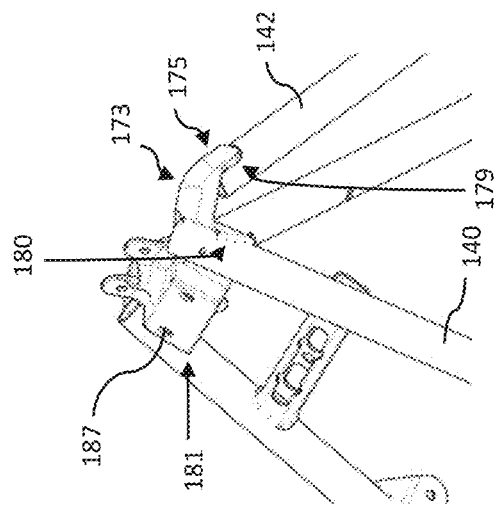
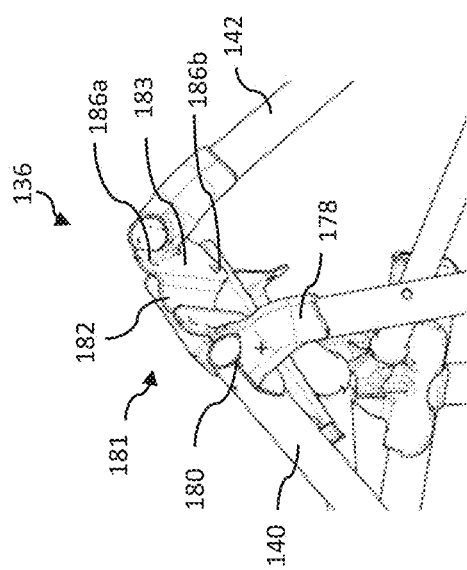
FIG. 16A
FIG. 16B

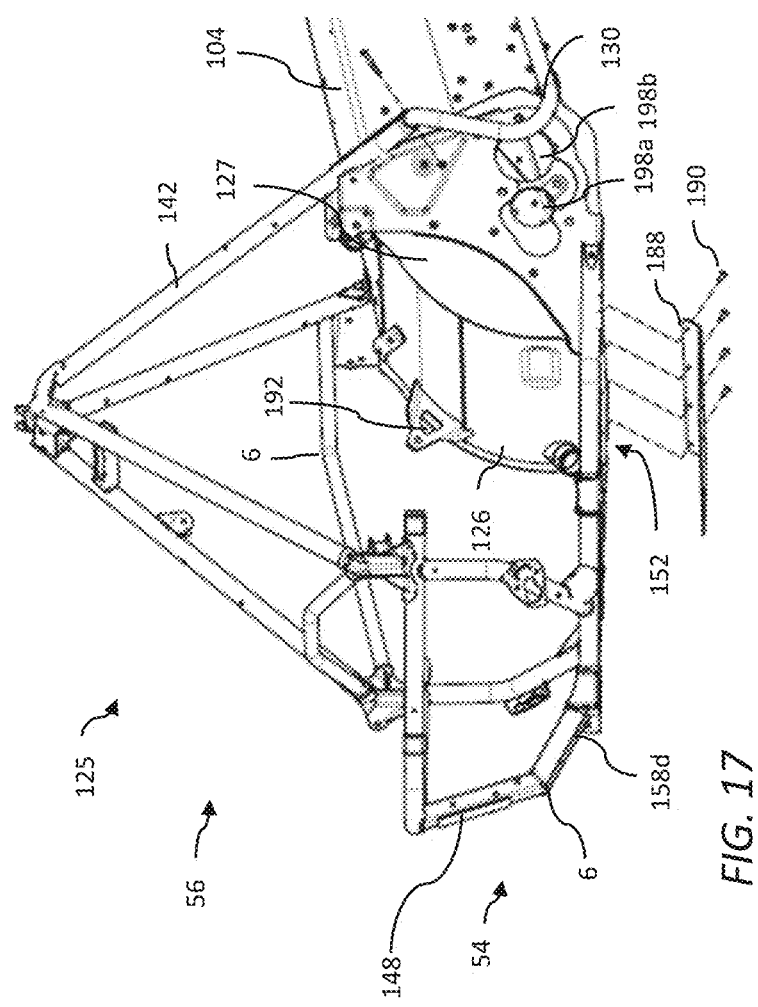

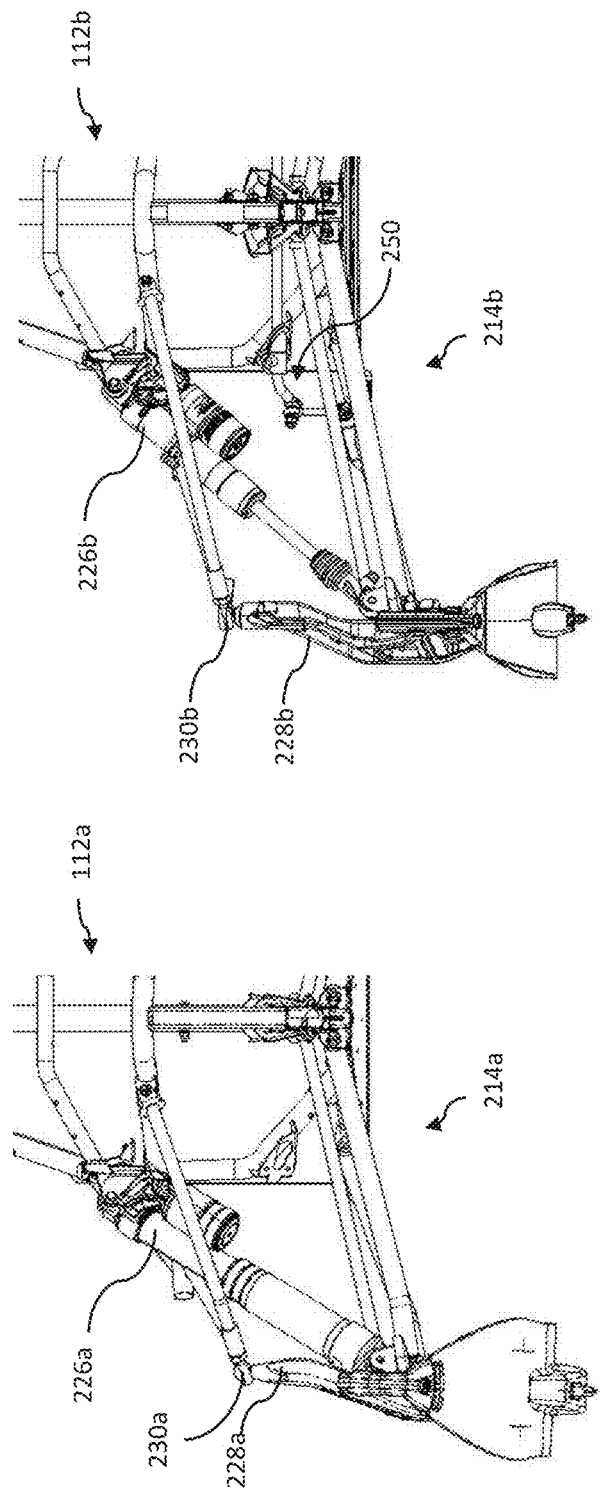

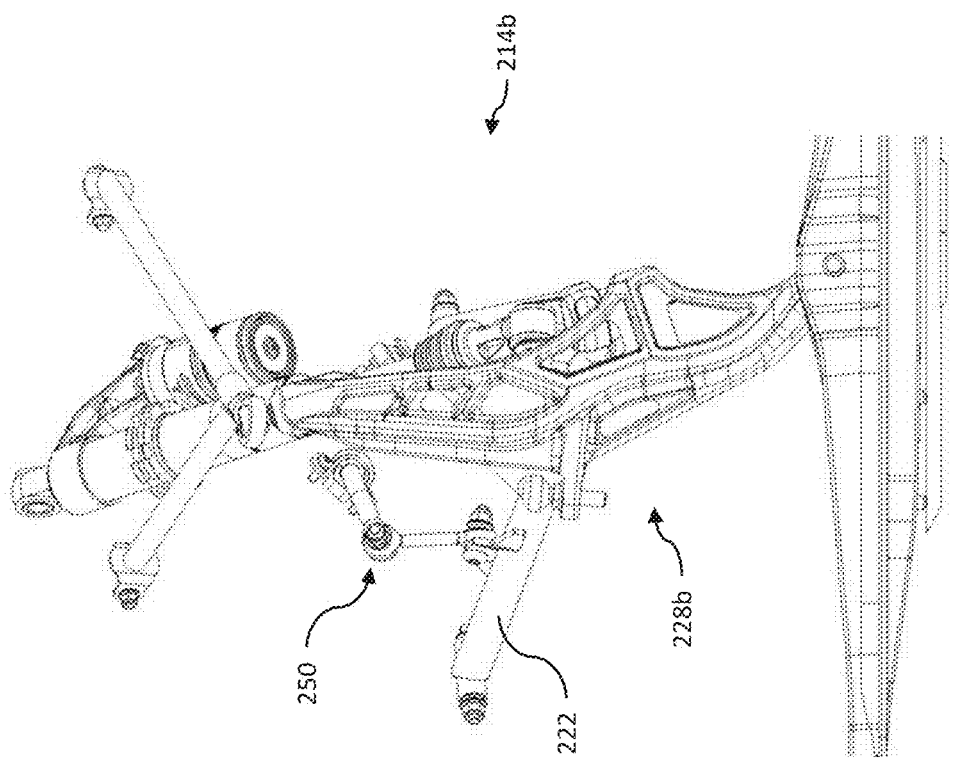

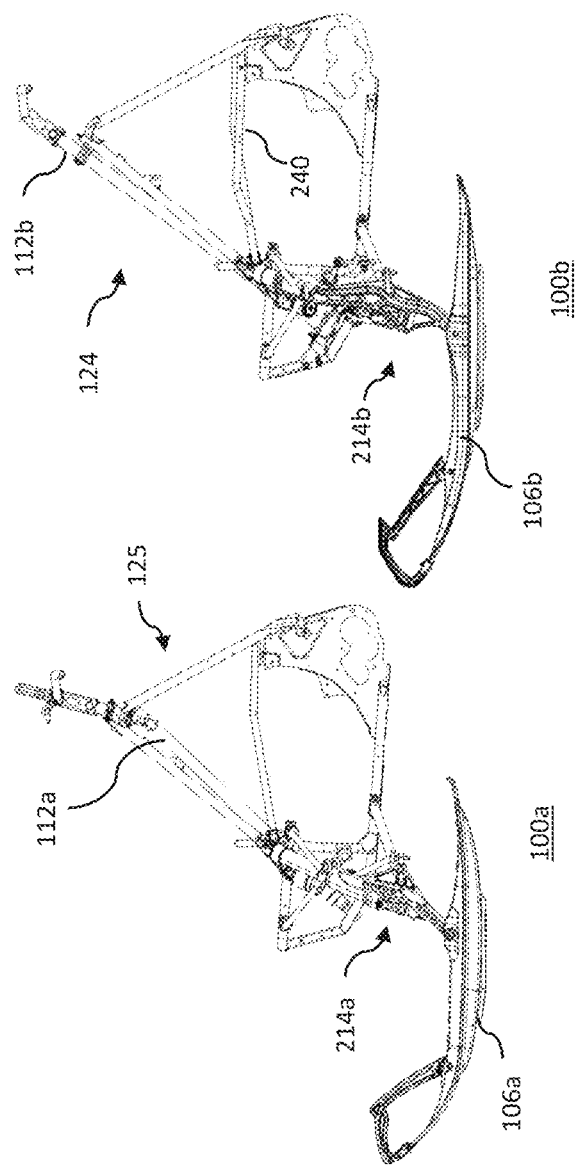

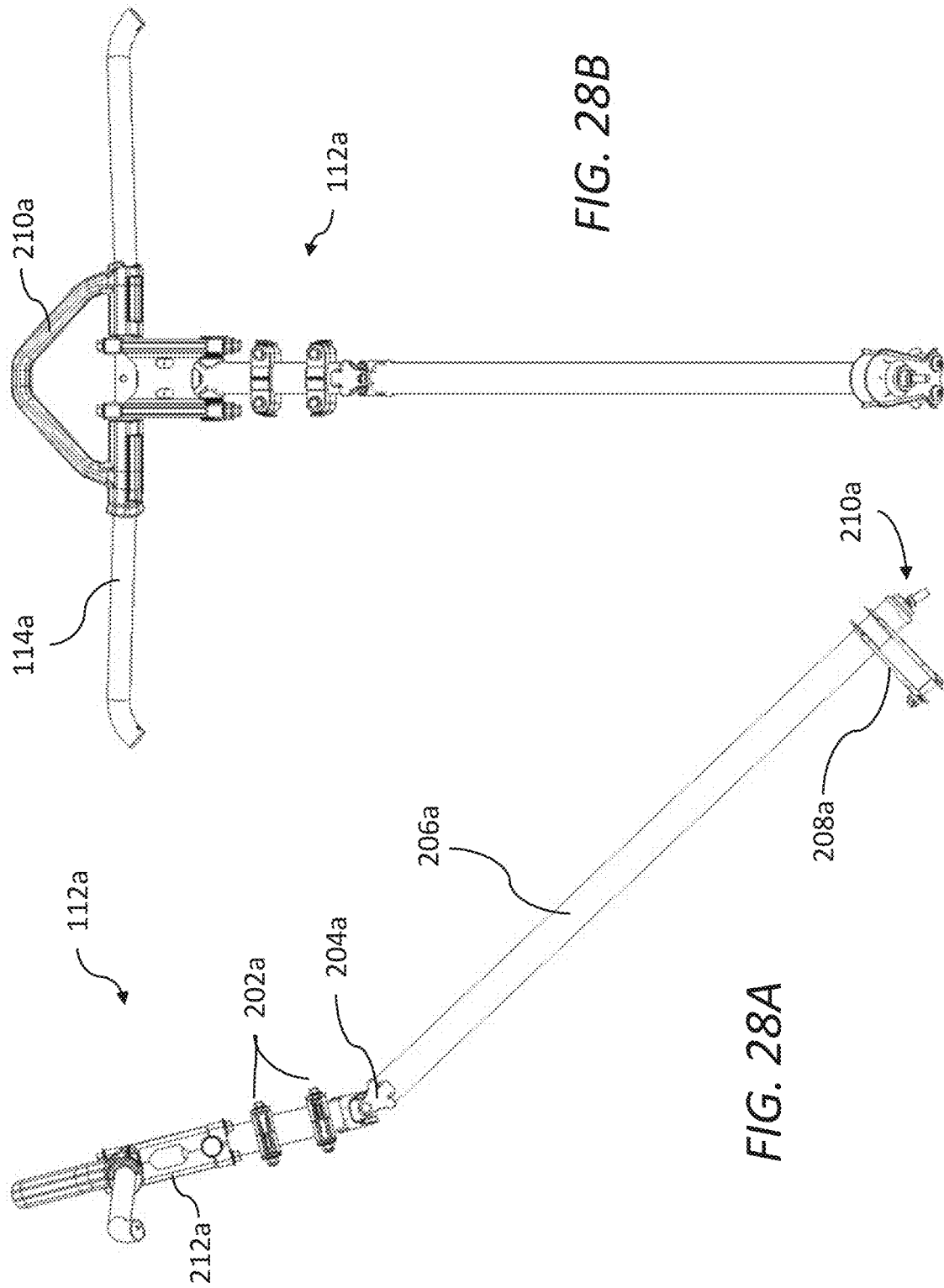

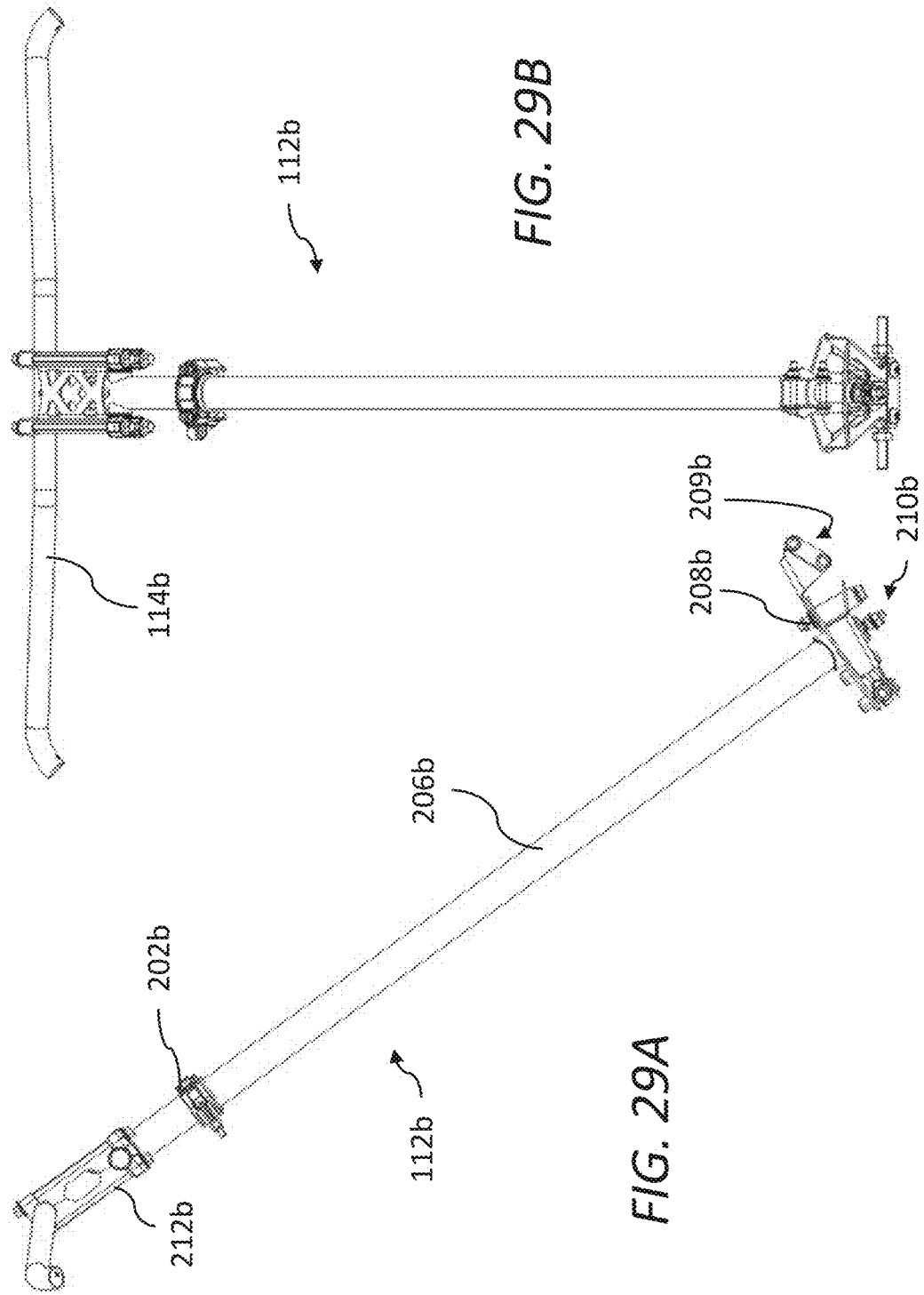

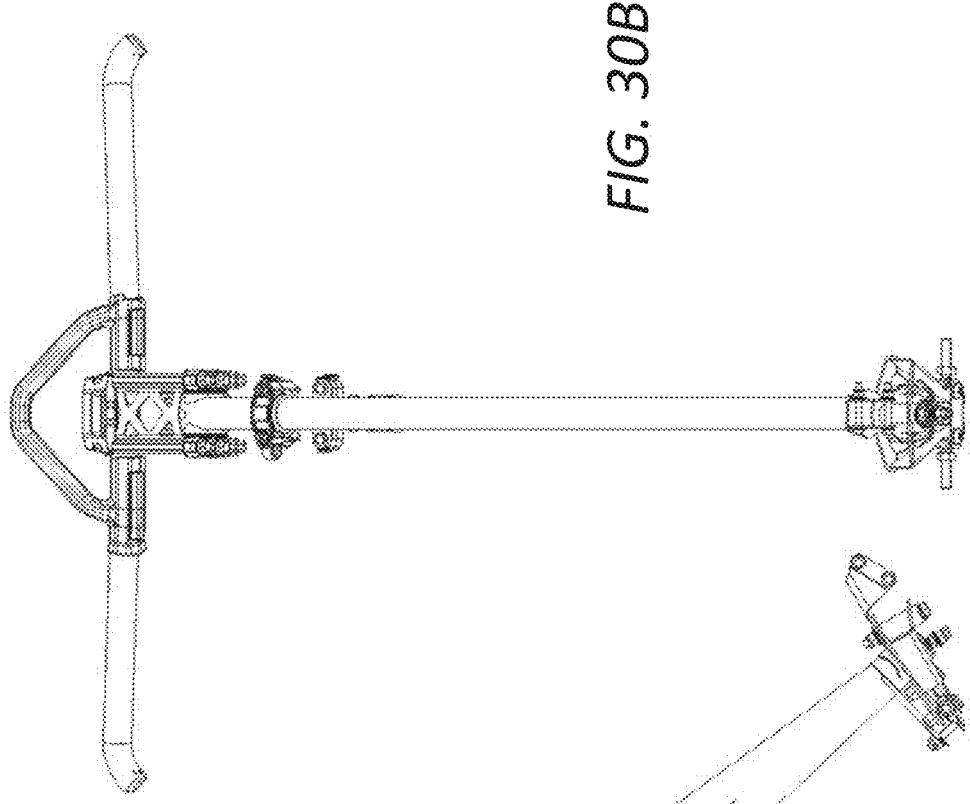
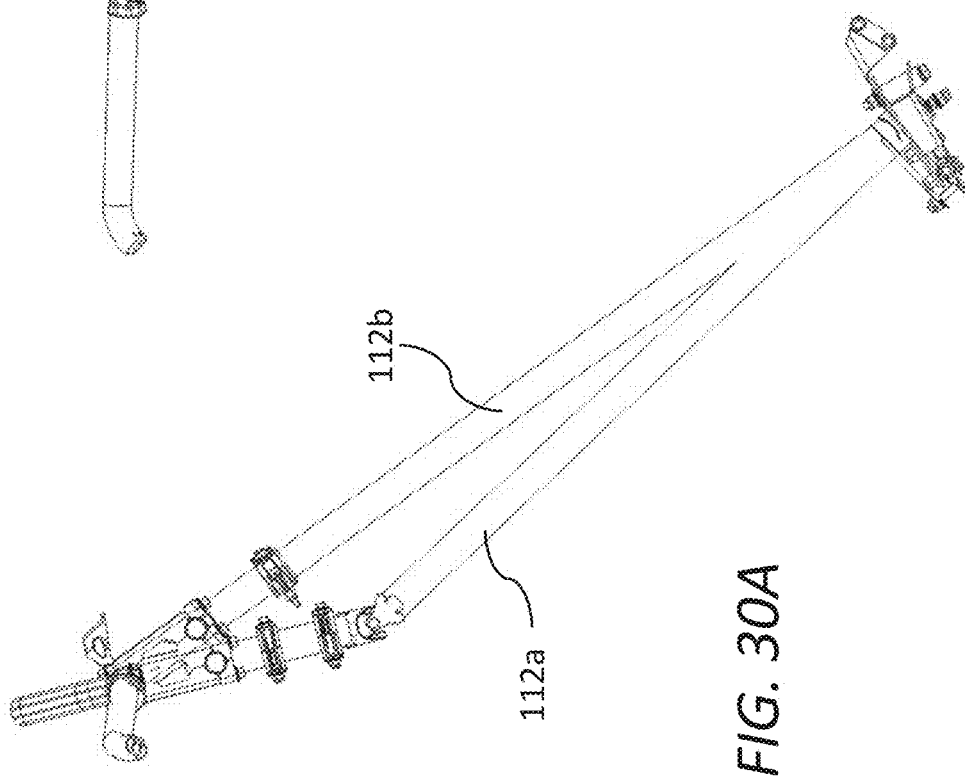
FIG. 30B
FIG. 30A

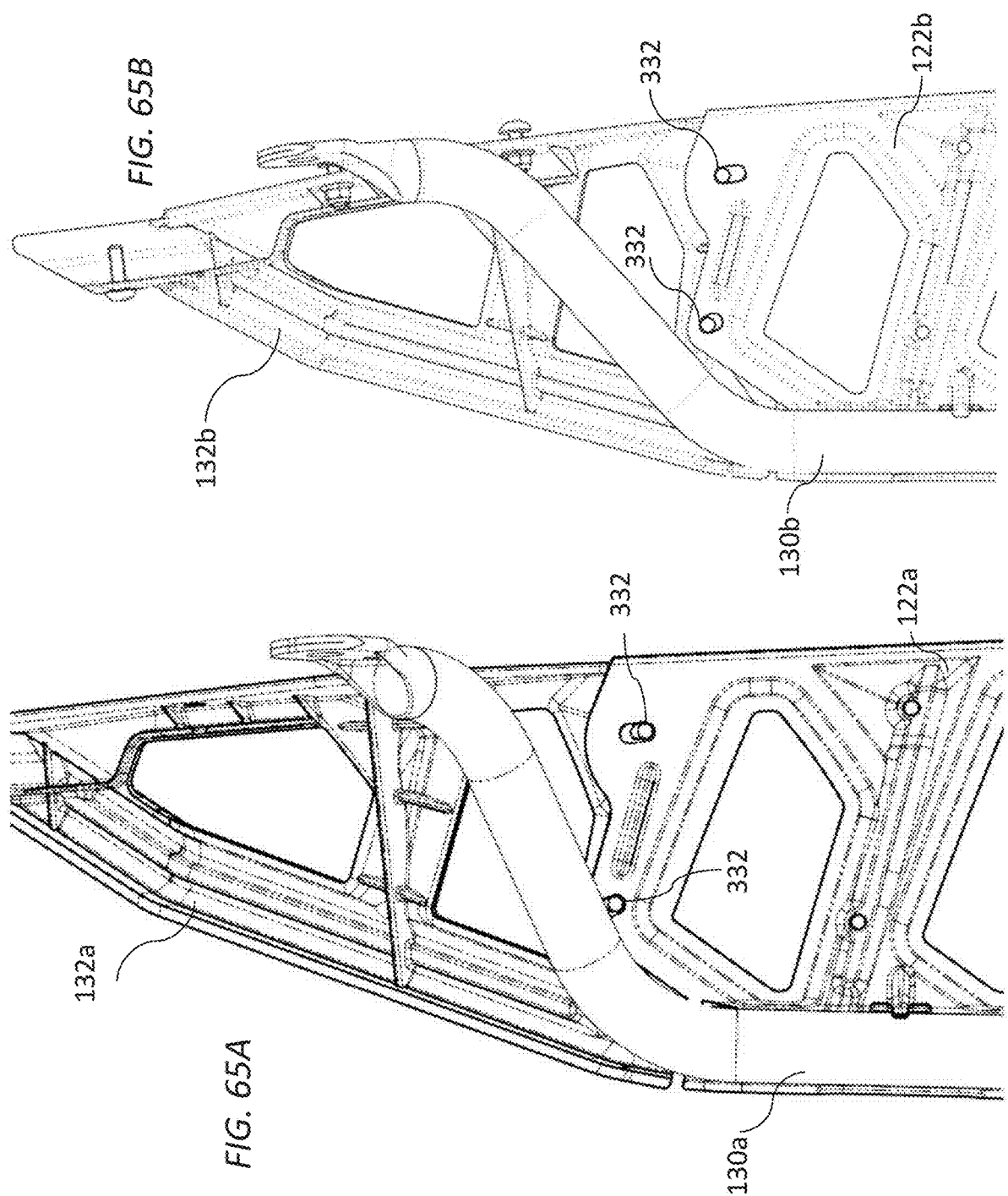

SNOWMOBILE FRAME

CROSS-REFERENCE TO RELATED APPLICATION

This application is related to commonly-owned U.S. Provisional Application No. 63/310,264, filed on Feb. 15, 2022 and entitled "Accessory Attachment System", U.S. Provisional Application No. 63/310,254, filed on Feb. 15, 2022 and entitled "Recreational Vehicle Spindle", U.S. Provisional Application No. 63/310,276, filed on Feb. 15, 2022 and entitled "Spindle for Recreational Vehicle", U.S. Provisional Application No. 63/310,232, filed on Feb. 15, 2022 and entitled "Headlight Assembly", U.S. Provisional Application No. 63/310,951, filed on Feb. 16, 2022 and entitled "Clutch Guard with Integrated Torque Control Link", U.S. Provisional Application No. 63/310,983, filed on Feb. 16, 2022 and entitled "Composite Running Board", U.S. Provisional Application No. 63/310,994, filed on Feb. 16, 2022 and entitled "Two-Stroke Engine", U.S. Provisional Application No. 63/342,447, filed on May 16, 2022 and entitled "Off-Road Vehicle", U.S. Provisional Application No. 63/344,165, filed on May 20, 2022 and entitled "Snowmobile Frame", U.S. Provisional Application No. 63/350,553, filed on Jun. 9, 2022 and entitled "Snowmobile with Seat and Gas Tank Assembly", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,167, filed on Sep. 6, 2022 and entitled "Intake, Airbox, and Storage Assembly for Snowmobile", U.S. Provisional Application No. 63/404,856, filed on Sep. 8, 2022 and entitled "Recreational Vehicle Spindle", U.S. Provisional Application No. 63/404,841, filed on Sep. 8, 2022 and entitled "Spindle for a Recreational Vehicle", U.S. Provisional Application No. 63/404,655, filed on Sep. 8, 2022 and entitled "Snowmobile with Seat Assembly", U.S. Provisional Application No. 63/404,682, filed on Sep. 8, 2022 and entitled "Snowmobile with Seat Assembly", U.S. Provisional Application No. 63/404,822, filed on Sep. 8, 2022 and entitled "Recoil Housing, Engine Assembly, and Method of Assembling Engine Assembly", U.S. Provisional Application No. 63/404,617, filed on Sep. 8, 2022 and entitled "Recreational Vehicle Running Board", U.S. Provisional Application No. 63/404,731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405,016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", and which applications are hereby incorporated by reference in their entirety.

A claim of priority is made to commonly-owned U.S. Provisional Application No. 63/310,264, filed on Feb. 15, 2022 and entitled "Accessory Attachment System", U.S. Provisional Application No. 63/310,983, filed on Feb. 16, 2022 and entitled "Composite Running Board", U.S. Provisional Application No. 63/344,165, filed on May 20, 2022 and entitled "Snowmobile Frame", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,617, filed on Sep. 8, 2022 and entitled "Recreational Vehicle Running Board", U.S. Provisional Application No. 63/404,731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405,016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", U.S. patent application Ser. No. 18/090,074, filed on Dec. 28, 2022, and entitled "Running Board Support Member", and which applications are hereby incorporated by reference in their entirety.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars. The snowmobile also includes a footrest for the rider while riding.

SUMMARY

In some embodiments, a method of assembling two different types of snowmobiles with a common front frame includes: providing a common front frame that includes a longitudinal centerline and a steering column mount positioned at an upper portion of the common front frame, the steering column mount including a forward side and a rear side; providing a first steering assembly that includes a steering post and a handlebar, the first steering assembly having a first pivot axis; providing a second steering assembly including a steering post and a handlebar, the second steering assembly having a second pivot axis that is different than the first pivot axis; and coupling the first steering assembly or the second steering assembly to the steering column mount, wherein the first steering assembly is coupled to the rear side of the steering column mount and the second steering assembly is coupled to the front side of the steering column mount.

Embodiments further include a method of assembling two different types of snowmobiles with a common forward frame including: providing a common forward frame comprises a longitudinal centerline and a control arm mounting point; providing a first suspension assembly including a control arm and a spindle that includes a front mount comprising a ball joint; providing a second suspension assembly that is different than the first suspension assembly, the second suspension assembly including a control arm and a spindle that includes a front mount comprising a ball joint; and securing the control arm of either the first suspension assembly or the second suspension assembly to the control arm mounting point; wherein the ball joint of the first front mount is positioned at a different position along the centerline of common forward frame than the ball joint of the second front mount when the respective suspension assembly is secured to the common forward frame.

Embodiments further include a snowmobile forward frame assembly, comprising a front; a rear; a first side extending between the front and the rear, the first side includes an inner perimeter that defines a first side opening; and a second side extending between the front and the rear, the second side is spaced apart from the first side, and the second side includes an inner perimeter that defines a second side opening, wherein the first side and the second side define a rear opening therebetween at the rear of the forward frame assembly for receiving at least a portion of a heat exchanger assembly, a tunnel, or both therein.

In other embodiments, a snowmobile forward frame assembly, includes a front; a rear; a first side extending along a longitudinal centerline of the forward frame assembly, the first side includes an inner perimeter that defines a first side opening; a second side extending along the longitudinal centerline and spaced apart from the first side, the second side includes an inner perimeter that defines a second side opening, wherein the first side and the second side define a rear opening therebetween for receiving a heat exchanger assembly, a tunnel, or both therein.

In some embodiments, a snowmobile forward frame assembly comprises: a front at least partially defined by a casting; a rear; a first side defined by a plurality of tubes, the first side is secured to the casting and includes an inner perimeter that defines a first side opening; and a second side defined by a plurality of tubes, the second side is secured to the casting and includes an inner perimeter that defines a second side opening, and wherein the first side and the second side define a rear opening therebetween at the rear of the forward frame assembly for receiving at least a portion of a heat exchanger assembly, a tunnel, or both therein.

In additional embodiments, a snowmobile forward frame assembly includes: a front; a rear; a first side extending between the front and the rear, the first side includes a first leg including an end extending upward and rearward and a second leg including an end extending upward and forward, wherein the first leg and the second leg of the first side at least partially define an inner perimeter that defines a first side opening; a second side extending between the front and the rear, the second side includes a first leg including an end extending upward and rearward and a second leg including an end extending upward and forward, wherein the first leg and the second leg of the second side at least partially define an inner perimeter that defines a second side opening, wherein the first side and the second side define a rear opening therebetween at the rear of the forward frame assembly for receiving at least a portion of a heat exchanger assembly, a tunnel, or both therein; and a steering mount component positioned between the first side and the second side, wherein the steering mount component connects the end of the first leg of the first side to the end of the second leg of the first side, and connects the end of the first leg of the second side to the end of the second leg of the second side.

In at least one embodiment, a steering mount component includes a pair of forward facing channels for receiving a pair of forward frame members; a pair of arches extending rearward from the forward facing channels for receiving a pair of rearward frame members thereunder.

In some embodiments, a snowmobile forward frame assembly includes a steering column mount component configured to secure an upper portion of a steering column, a rearward leg extending rearward from the steering column mount component, a forward leg extending forward from the steering column mount component, a lower member positioned below the rearward leg and the forward leg, a front member extending forward from the forward leg, and a pivot mount joint extending upward from the lower member to the front member. The pivot mount joint includes a first steering column mounting point configured to secure a lower portion of the steering column at a first location on the forward frame, and an A-arm mounting point configured to secure an A-arm suspension member.

In some embodiments, a method of assembling a snowmobile includes providing a preassembled forward frame including a front and rear, the forward frame including a first side and a second side, wherein the first side and the second side are spaced apart to define a rear opening at the rear of the forward frame; positioning at least a portion of a heat exchanger assembly, a tunnel, or both in the rear opening between the first side and the second side; and securing the forward frame to one or both of the heat exchanger assembly and the tunnel.

In some embodiments, a snowmobile forward frame assembly includes a steering column mount component configured to secure an upper portion of a steering column, a first rearward leg extending rearward from the steering column mount component along a first outboard side of the forward frame and a second rearward leg extending rearward from the steering column mount component along a second outboard side of the forward frame, a first forward leg extending forward from the steering column mount component along the first outboard side of the forward frame and a second forward leg extending forward from the steering column mount component along the second outboard side of the forward frame, a first lower tube positioned below the first rearward leg and the first forward leg, a second lower tube positioned below the second rearward leg and the second forward leg, a first metal plate component extending from the first rearward leg to the first lower tube, and a second metal plate component extending from the second rearward leg to the second lower tube. The first metal plate component and the second metal plate component are positioned outboard of a heat exchanger assembly.

In some embodiments, a powertrain assembly includes a chassis, a prime mover positioned on the chassis, a CVT coupled to the prime mover, a driven/jack shaft including a first end and a second end, where the first end is operably coupled to the CVT, a flexible mount positioned adjacent the first end of the driven shaft, the mount secured to the chassis, and a belt assembly including a top sprocket operably connected to a bearing, a lower sprocket, and a belt operably connected to the sprockets, wherein the top sprocket is positioned a first distance from the lower sprocket, wherein the second end of the driven/jack shaft extends through the bearing, wherein the bearing has two degrees of freedom and the shaft can pivot in response to a torque input to change the center distance between sprockets to a second distance.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 15A illustrates a perspective view of a steering column mount, according to some embodiments.

FIG. 15B illustrates a perspective view of a steering column mount, according to some embodiments.

FIG. 15C illustrates a perspective view of a steering column mount, according to some embodiments.

FIG. 16A illustrates a perspective view of the steering column mount coupled to the front frame, according to some embodiments.

FIG. 16B illustrates a perspective view of the steering column mount coupled to the front frame, according to some embodiments.

FIG. 17 illustrates a perspective view of a chassis, according to some embodiments.

FIG. 22A illustrates a front view of a first front suspension of the first snowmobile of FIG. 6A coupled to a common frame, according to some embodiments.

FIG. 22B illustrates a second front suspension of the second snowmobile of FIG. 6B coupled to a common front frame, according to some embodiments.

FIG. 23 illustrates a side view of the front suspension of FIG. 22B, according to some embodiments.

FIG. 27A illustrates a side view of the snowmobile model shown in FIG. 25A, according to some embodiments.

FIG. 27B illustrates a side view of the snowmobile model shown in FIG. 25B, according to some embodiments.

FIG. 28A illustrates a side view of the first steering column, according to some embodiments.

FIG. 28B illustrates a front view of the first steering column, according to some embodiments.

FIG. 29A illustrates a side view of the second steering column, according to some embodiments.

FIG. 29B illustrates a front view of the second steering column, according to some embodiments.

FIG. 30A illustrates a superimposed side view of the first steering column and second steering column illustrated in FIGS. 28A and 29A, according to some embodiments.

FIG. 30B illustrates a superimposed front view of the first steering column and the second steering column illustrated in FIGS. 28B and 29B, according to some embodiments.

FIG. 65A illustrates a bottom view of a rear kick-up and running board of the snowmobile of FIG. 6A, according to some embodiments.

FIG. 65B illustrates a bottom view of a rear kick-up and running board of the snowmobile of FIG. 6B, according to some embodiments.

DETAILED DESCRIPTION

Figure 1:
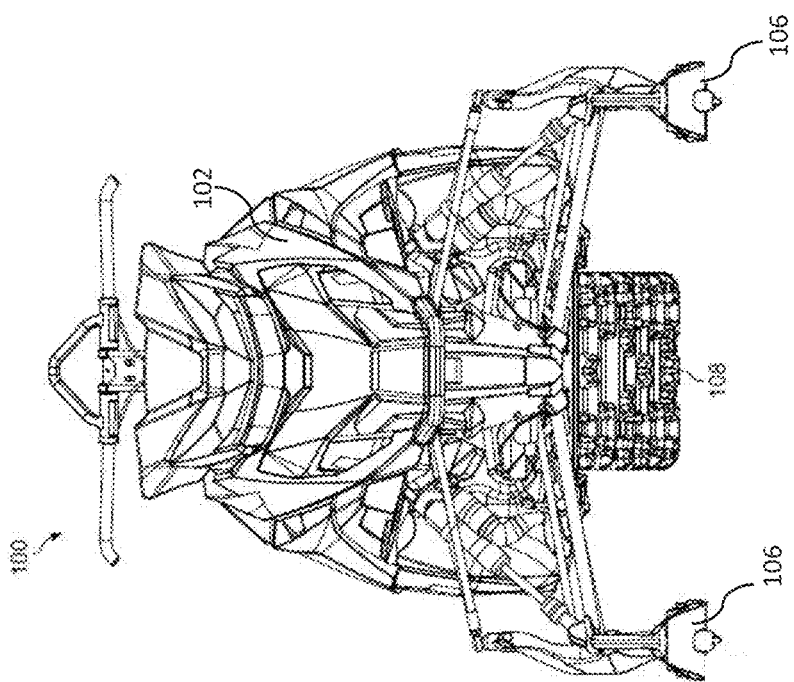
FIG. 1 illustrates a front view of a snowmobile, according to some embodiments.
Figure 2:
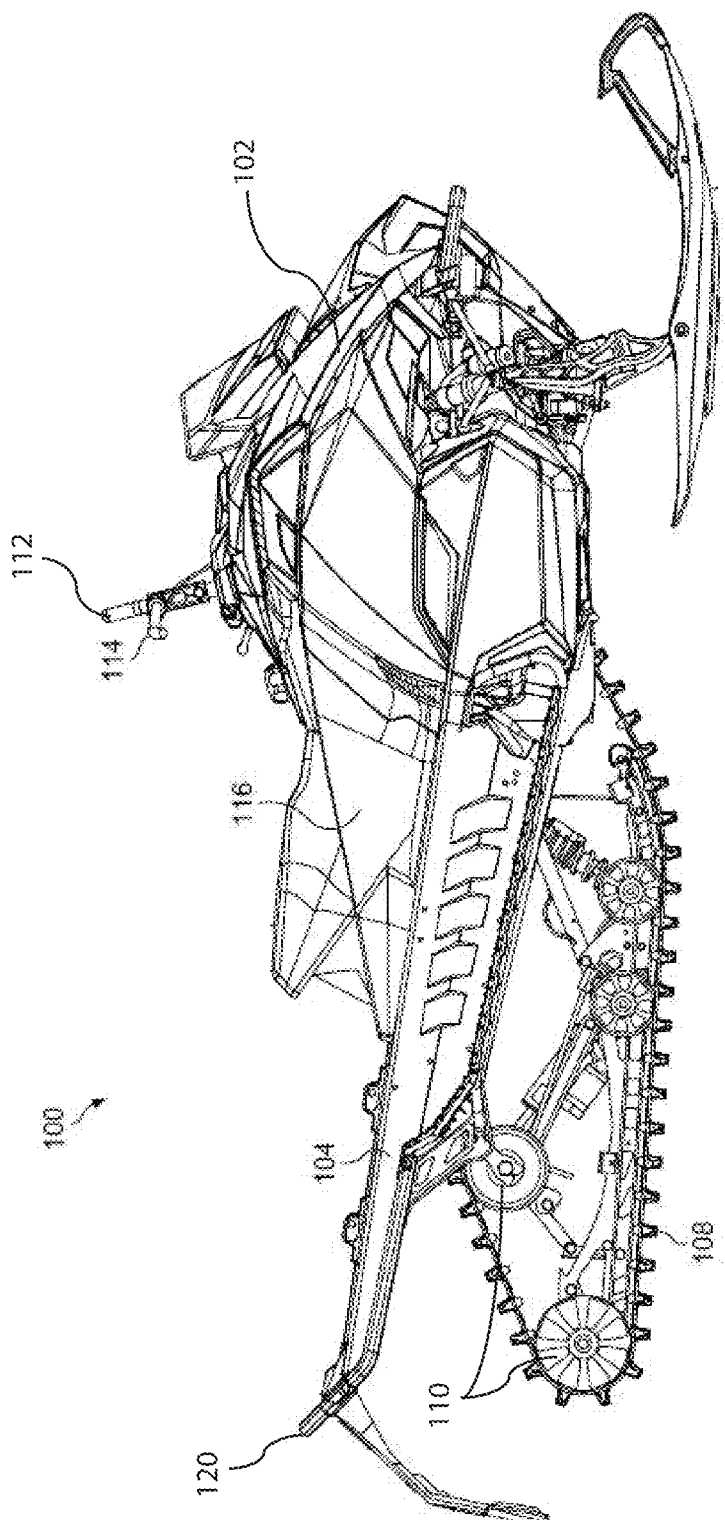
FIG. 2 illustrates a side of a snowmobile, according to some embodiments.
Figure 3:
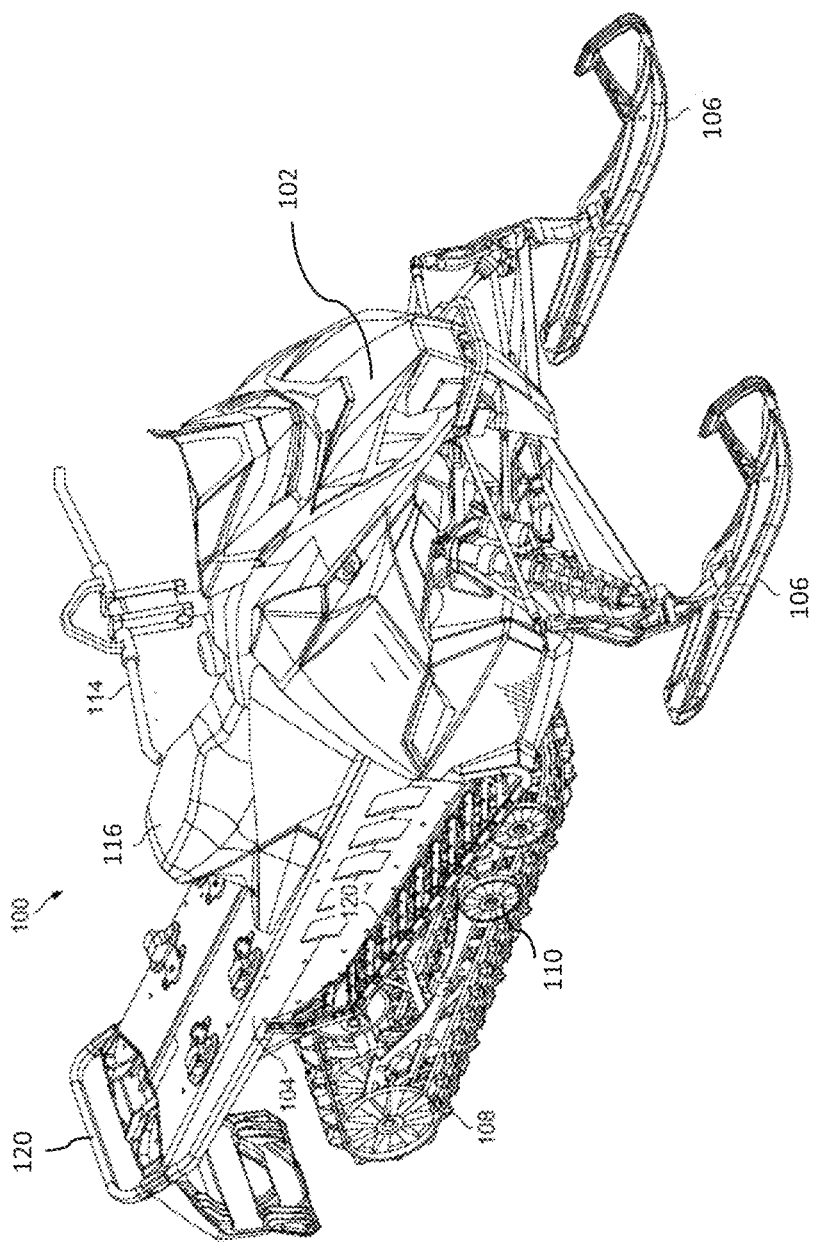
FIG. 3 illustrates a perspective view of a snowmobile, according to some embodiments.

Embodiments of the present disclosure describe a snowmobile, a front frame, a forward frame assembly, a steering column, running boards, and assembly of a snowmobile. Components described herein may be integral or unitary for lower cost-construction, increased structural integrity, increased performance, and/or efficiencies in assembly. For example, the front frame may include components welded together to form an integral front frame. The front frame described herein may be utilized for different snowmobile models/configurations. For example, the front frame may include common mounts for different types or configurations of front suspensions, steering columns, heat exchanger end caps, tunnels, toe stops, bottom-out protectors, and/or running boards. In addition to, or alternatively, the front frame may include features that may be utilized to attach the belt case and/or the track drive shaft in different positions.

FIGS. 1-4 illustrate a snowmobile 100, according to some embodiments of this disclosure. The snowmobile 100 includes a body 102, a front suspension 214, and an endless track 108 (see e.g., FIG. 1). The body 102 may be coupled to a chassis/frame. The front suspension 214 may be coupled to skis 106. The snowmobile may also include at least one wheel 110 positioned within the track 108, a steering column 112 with at least one handle/handlebar 114, a seat 116, and a tunnel 104 with a rear bumper 120 (see e.g., FIGS. 2-3).

Figure 5:
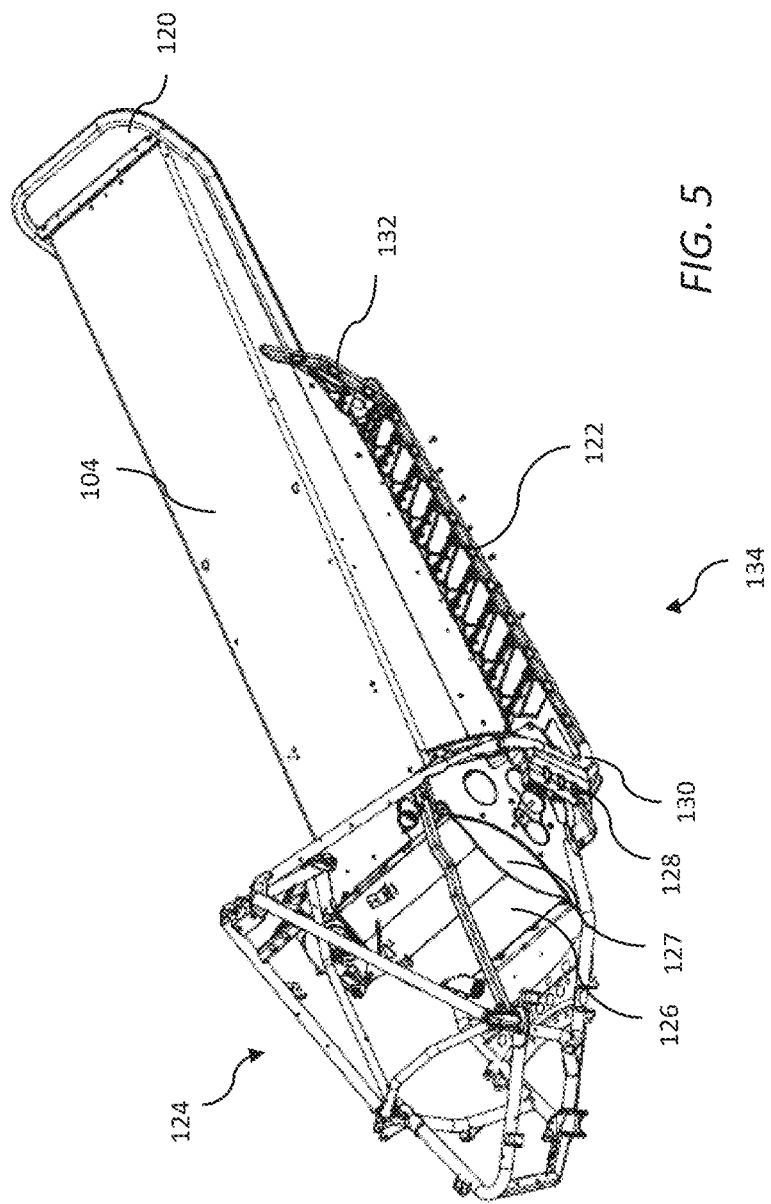
FIG. 5 illustrates a perspective view of a chassis, according to some embodiments.

FIG. 5 illustrates a snowmobile 100 with the body 102 removed—i.e., the chassis. In some embodiments, the chassis of the snowmobile 100 includes a forward frame assembly 124, a heat exchanger assembly 126, a front toe stop 128, a running board support member 130, a rear kick-up panel 132, and a rear bumper 120.

Figure 6A:
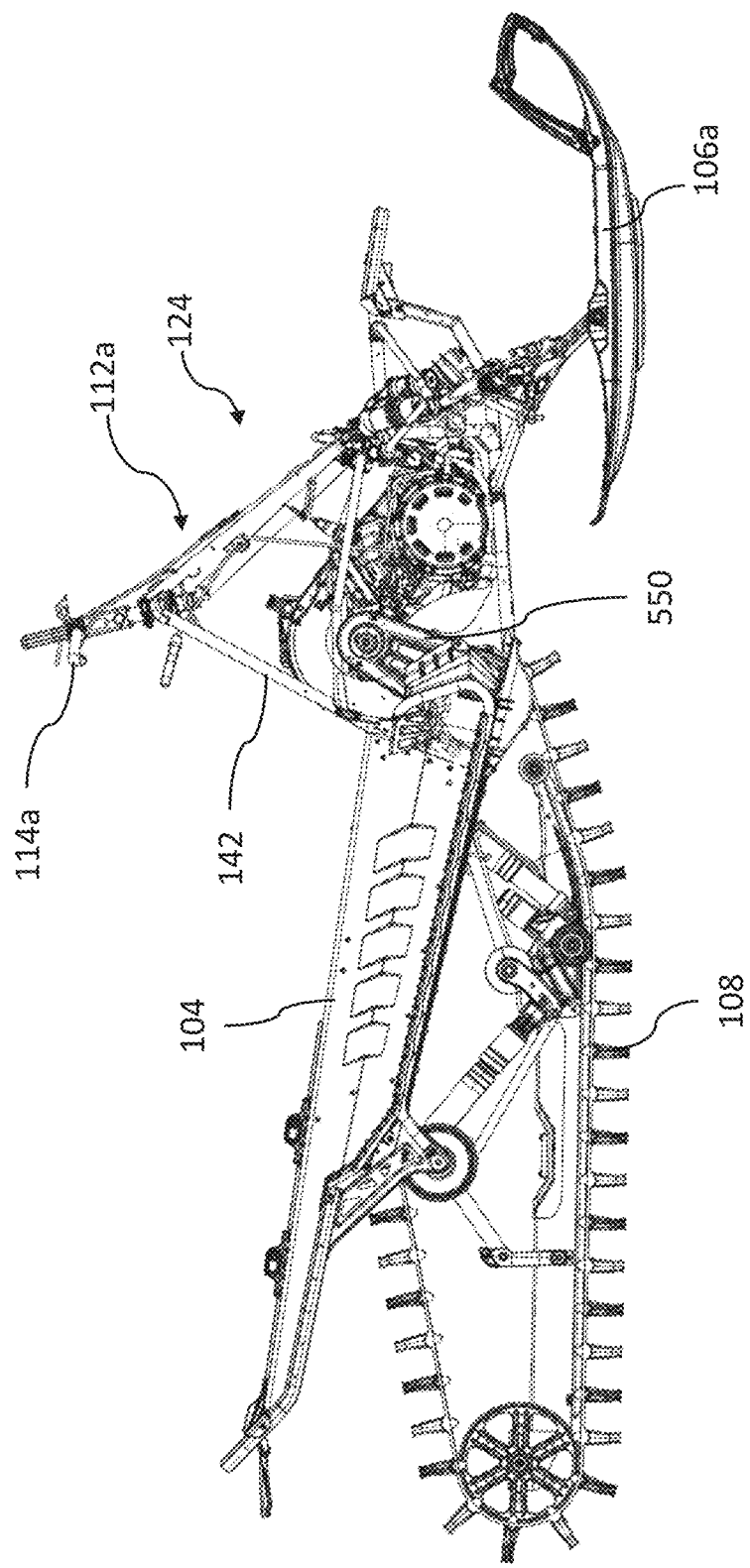
FIG. 6A illustrates a side view of a frame of a first snowmobile, according to some embodiments.
Figure 6B:
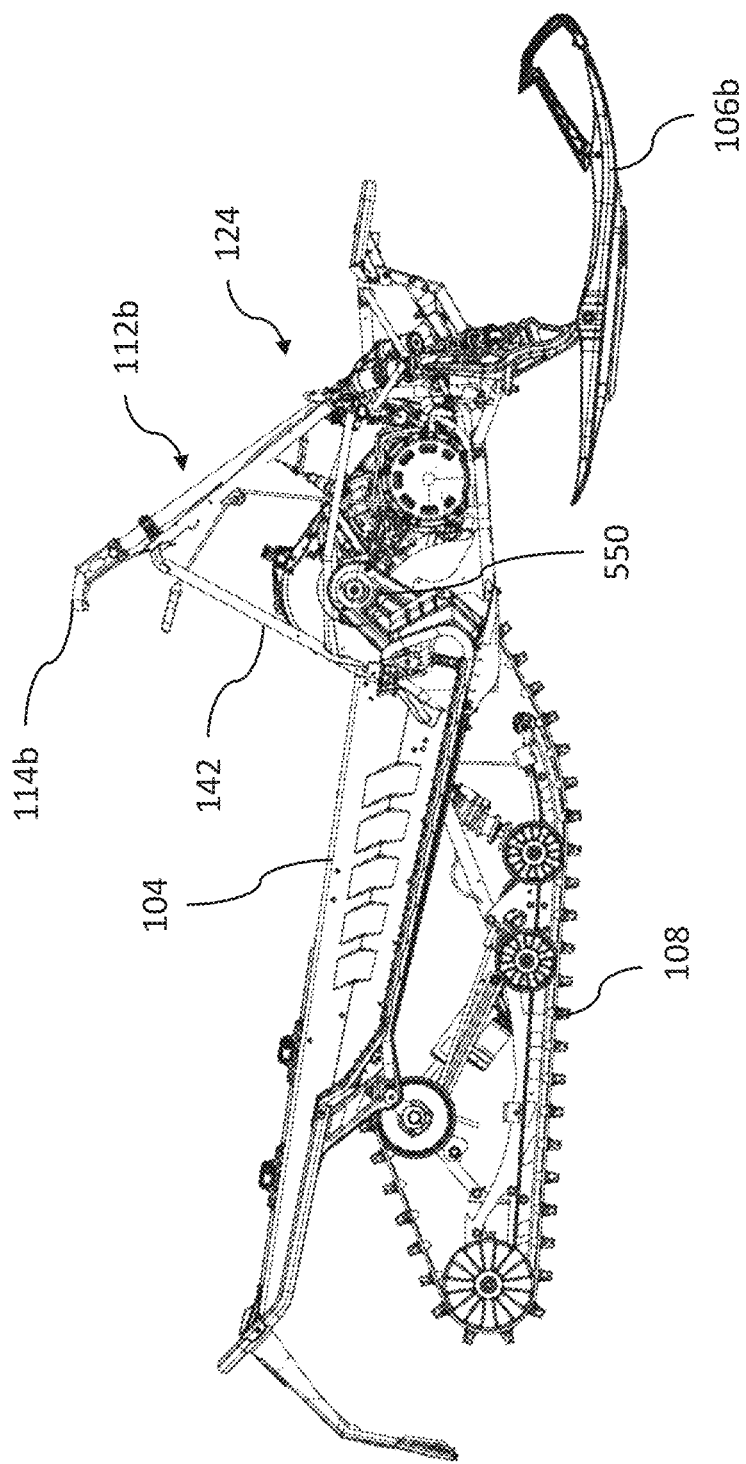
FIG. 6B illustrates a side view of a frame of a second snowmobile, according to some embodiments.
Figure 7A:
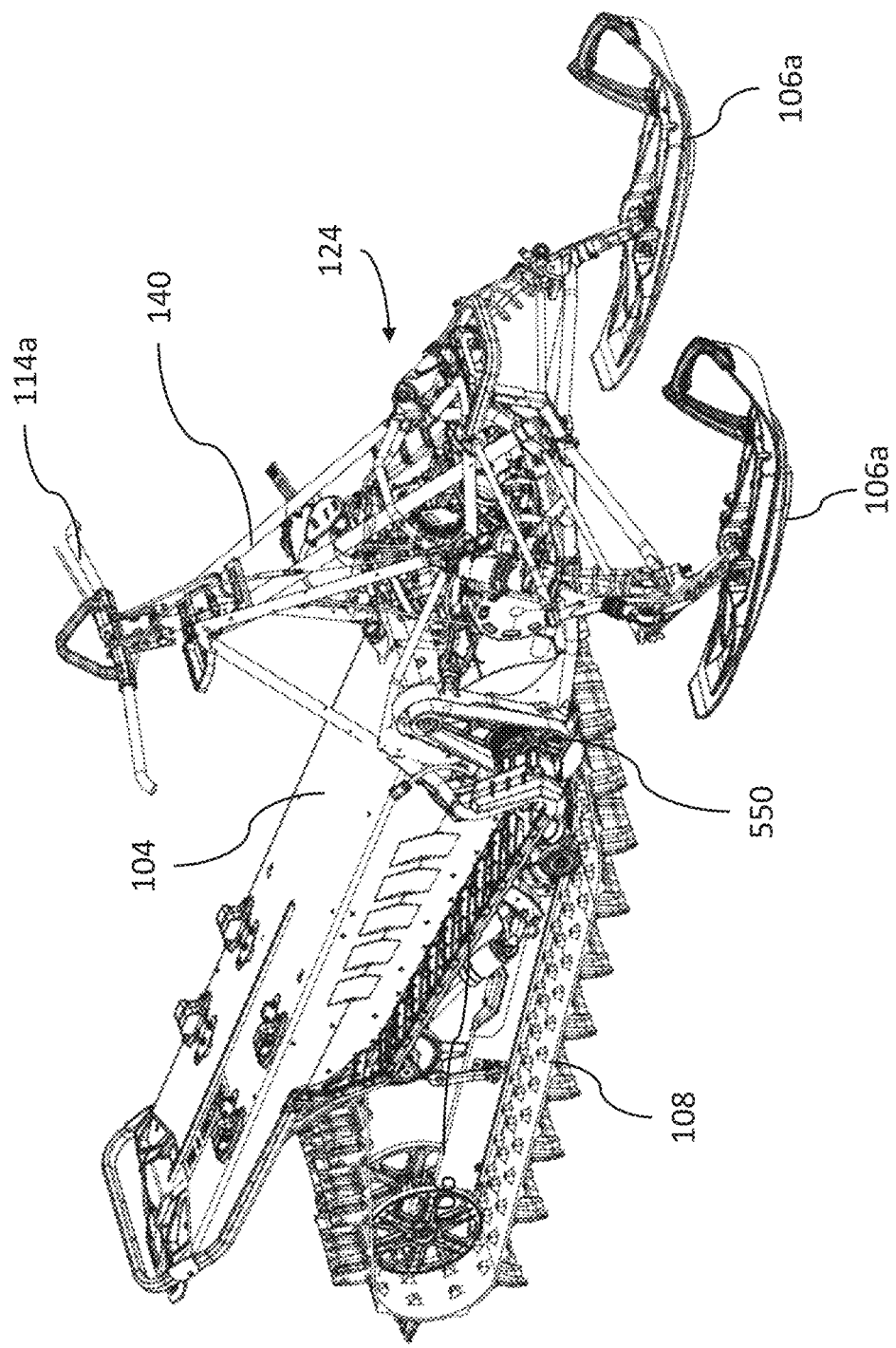
FIG. 7A illustrates an isometric view of the frame of the first snowmobile of FIG. 6A, according to some embodiments.
Figure 7B:
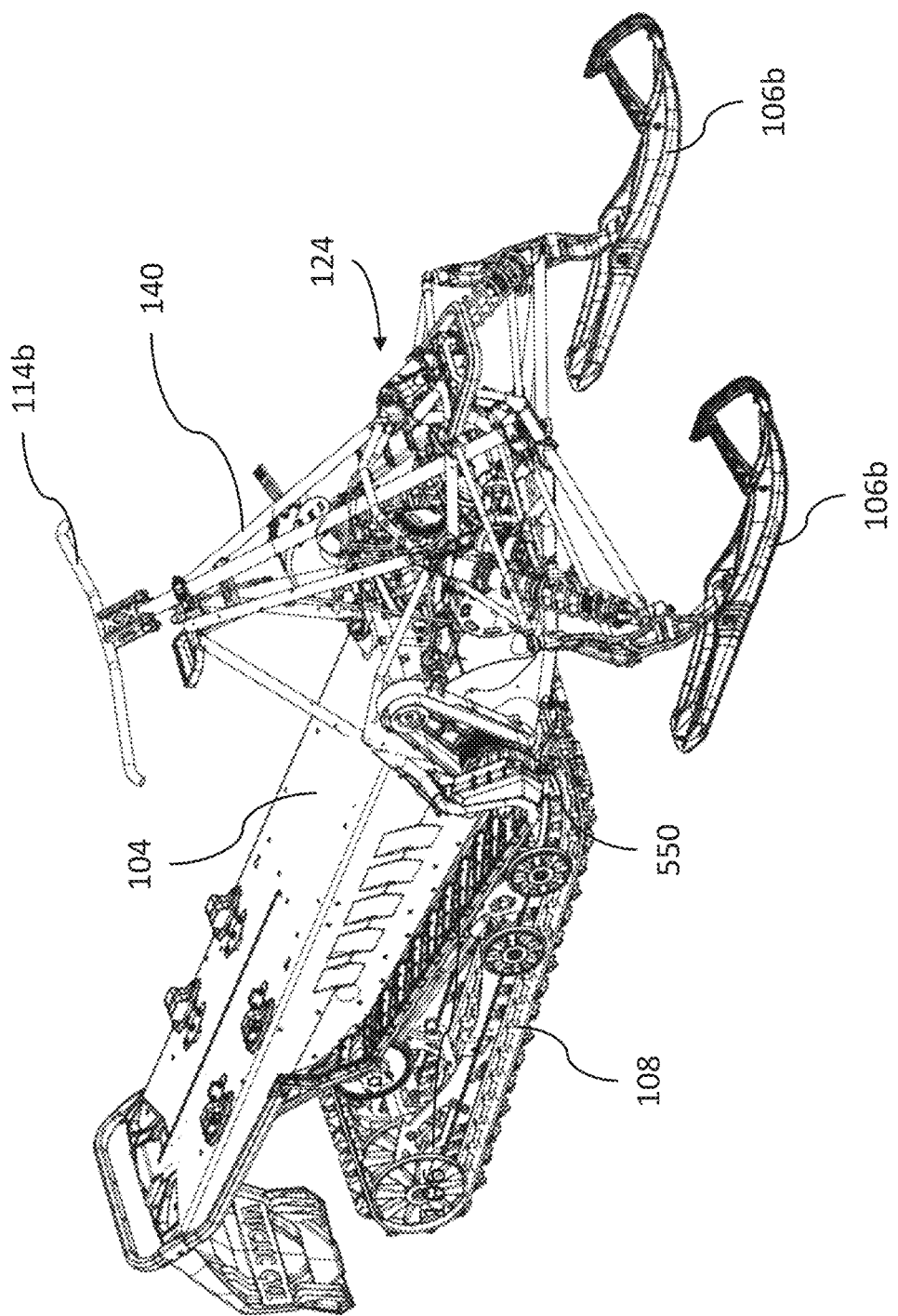
FIG. 7B illustrates an isometric view of the frame of the second snowmobile of FIG. 6B, according to some embodiments.
Figure 8A:
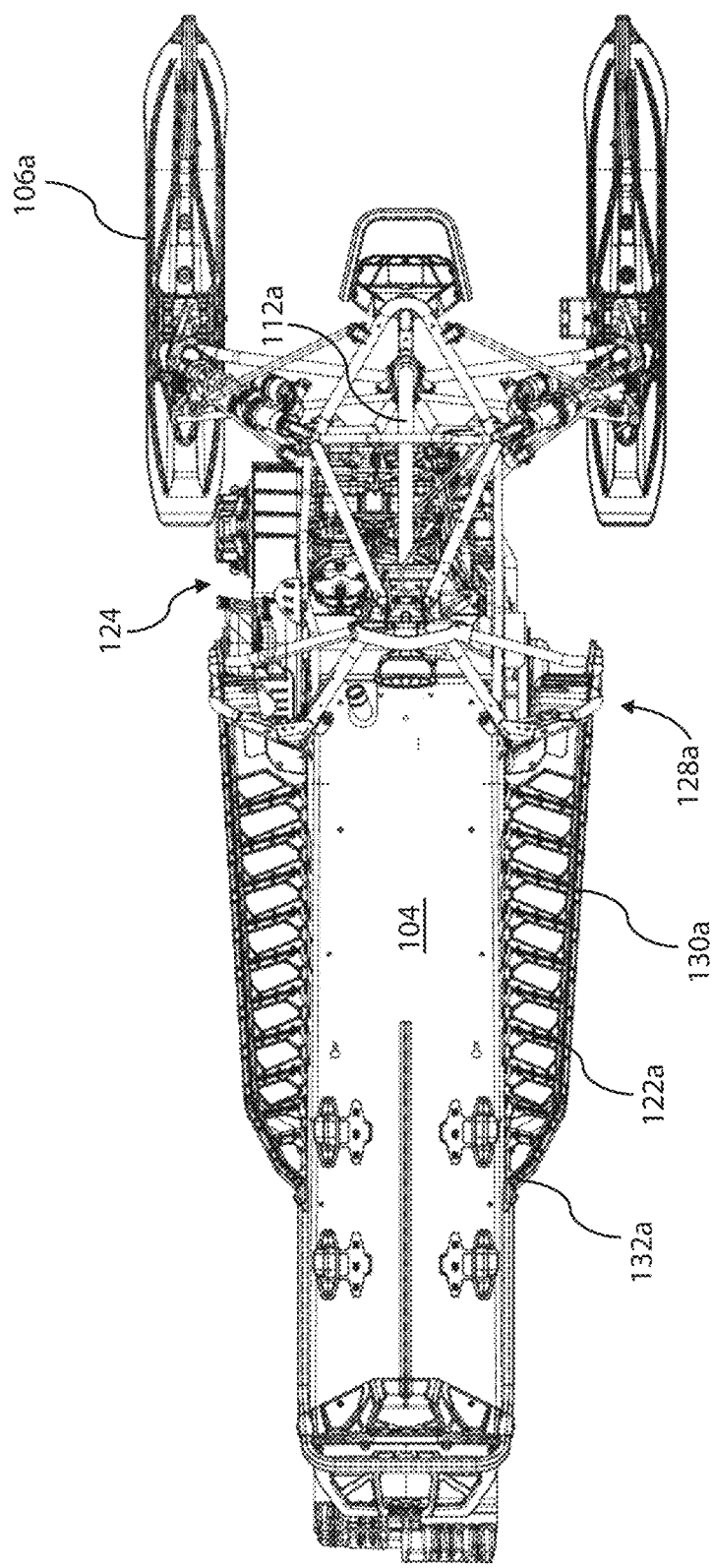
FIG. 8A illustrates a top view of the frame of the first snowmobile of FIG. 6A, according to some embodiments.

FIG. 6A illustrates a first snowmobile having a first frame, according to some embodiments. The first snowmobile includes a first ski 106a, a first steering column 112a, a first running board 122a, a first toe stop 128a, a first support member 130a, and a first kick-up 132a. FIG. 6B illustrates a second snowmobile having a second frame, according to some embodiments. The second snowmobile includes a second ski 106b, a second steering column 112b, a second running board 122b, a second toe stop 128b, a second support member 130b, and a second kick-up 132b (see also FIGS. 65A-B). In some embodiments, the first and second snowmobiles may include a different tunnel, a different rear suspension, a different track, a different engine, a different heat exchanger assembly, a different running board assembly and/or a different spindle. In some embodiments, the first snowmobile and the second snowmobile may include the same forward frame assembly 124. FIGS. 7A and 8A further illustrate the first snowmobile and FIGS. 7B and 8B further illustrate the second snowmobile. Various embodiments of snowmobile models having running boards, toe stops, bottom-out protectors, accessory skid plates, rear kick-ups, support members, brackets, and combinations thereof are described in commonly owned U.S. patent application Ser. No. 18/090,170 filed on Dec. 28, 2022 and entitled "Skid Plate, Secondary Skid Plate, and Track Drive Protector for a Recreational Vehicle," the contents of which are incorporated by reference in their entirety. In some embodiments, the first running board 122a and the second running board 122b are identical, i.e., a common component between the snowmobile of FIG. 6A and the snowmobile of FIG. 6B. In some embodiments, the first rear kick-up 132a and the second rear kick-up 132b are identical, i.e., a common component between the snowmobile of FIG. 6A and the snowmobile of FIG. 6B.

In some embodiments, the forward frame assembly 124 comprises a plurality of tube members 140/142/144/146/150/152/166/240 (see e.g., FIGS. 6A-20). Members 140, 142, 144, 146, 150, 152 and 166 may comprise round steel tubes. The forward frame assembly 124 may include a front/forward frame 125 and a removable horizontal member 240. Accordingly, without the removable horizontal member 240 attached, the forward frame assembly 124 is a front/forward frame 125. In at least one embodiment, the forward frame assembly 124 is made of a metal, such as steel, although other metallic or composite materials including, but not limited to, aluminum may be employed.

The front frame 125 may be assembled prior to securing to one or both the tunnel 104 and heat exchanger assembly 126 to provide a free-standing structure. The front frame 125 may also be coupled to a different components including, but not limited to, a support member 130.

Figures 25A, 25B:
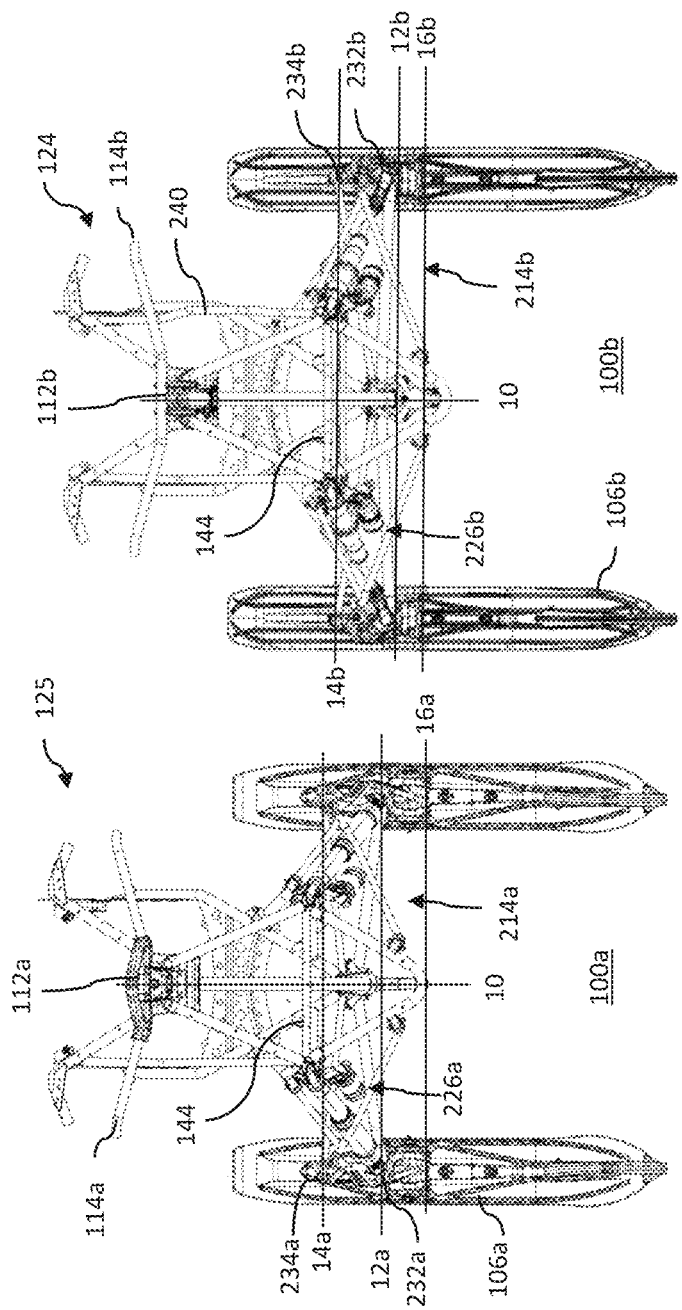
FIG. 25A illustrates a top view of the front frame assembly of FIG. 24A, according to some embodiments.
FIG. 25B illustrates a top view of the front frame assembly of FIG. 24B, according to some embodiments.

In at least one embodiment, the front frame 125 may be used for different models/configurations of a snowmobile 100 (see e.g., FIG. 25A-B). In other words, the front frame 125 is a common front frame. In an illustrative example, snowmobile models may have different front suspensions 214, steering columns 112, engines, and/or have components operably connected to the snowmobile at different orientations with respect to the front frame 125 depending on the model. For example, as discussed below in greater detail, a front frame 125 as disclosed herein may be coupled to front suspensions 104 utilizing different spindle configurations, different linkages, and different configurations of steering columns 112.

Figure 9:
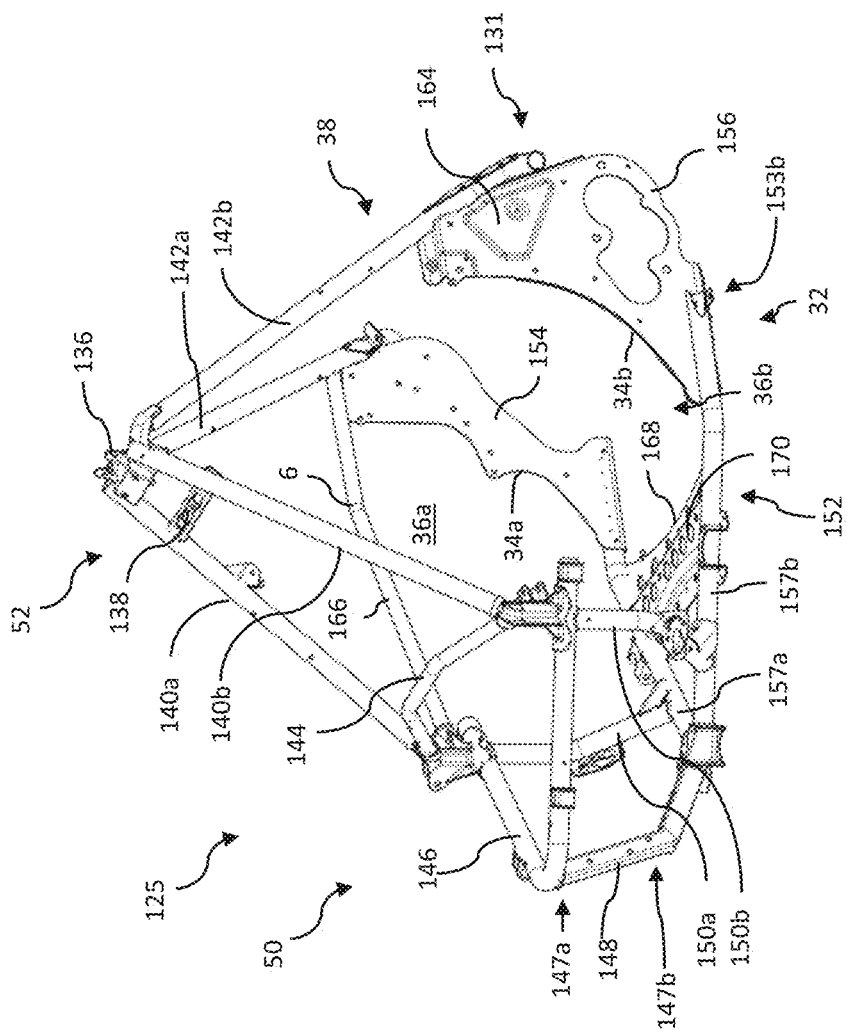
FIG. 9 illustrates a perspective front view of a front frame, according to some embodiments.

As shown in FIG. 9, the front frame 125 may comprise a steering column mount component 136 positioned at the top of the front frame 125. The steering column mount component 136 may be a structural component used to join a forward leg/tube 140 and a rearward leg/tube 142. An upper frame member/support 138 may be provided that extends between the forward legs 140a, 140b to support a body component such as an intake, airbox, and storage assembly as described in commonly owned U.S. Provisional Application No. 63/404,167 filed on Sep. 6, 2022, and entitled "Intake, Airbox, and Storage Assembly for Snowmobile", U.S. patent application Ser. No. 17/984,050, filed Nov. 9, 2022, and entitled "Air Intake for Snowmobile", and U.S. patent application Ser. No. 17/983,968, filed on Nov. 9, 2022, and entitled "Bumper Mount for Snowmobile", the contents of which are incorporated by reference in their entirety. A cross-tube 144 may extend between the lower ends of the forward legs 140a, 140b and connect opposing joints 158 to reinforce suspension components secured to the joints 158. An upper front member 146 extends forward from the joints to intersect with a lower front member 148 that connects the upper front member 146 to the lower portion of the front frame 125. An upright support/member 150 also extends from the lower portion of the front frame 125 to intersect and support the rearward end of the upper front member 146 beneath the joints 158. A horizontal member 166 is provided on one side of the front frame 125 that extends from the joint 158 rearward to the rearward leg 142a. The lower portion 152 of the front frame 125 may comprise tube members 157a, 157b and a bottom plate 168 extending therebetween that may support an engine assembly. The front frame 125 may comprise a first metal plate component 154, a second metal plate component 156 that connect the lower portion 152 of the front frame 125 to the rear legs 142a, 142b. As described herein, the joints 158 may couple tubular components of the front frame 125 together, and/or join components of a front suspension to the front frame 125 (e.g., the joint includes or is a suspension mount), or couple a steering post 206 to the front frame 125. Some joints 158 may couple components of the front frame 125 and couple one or more suspension components to the front frame 125 (e.g., joints 158a and 158d).

In at least one embodiment, the components of the front frame 125 are integral/unitary/non-separable—in other words, they form a single unit. For example, the components of the front frame 125 are welded together. As an illustrative example, components of the front frame 125 are welded together at joints 158a1/158a2/158d/158g1/158g2/158h1/158h2/158i. In an illustrative example, 140/142/152/150/146/144/166 comprise steel tubes, 154/156 comprise steel plates, and 148/136/158 comprise steel castings. In some embodiments, joints 158a, 158d are castings and joints 158g, 158h, 158i are welds.

Figure 4:
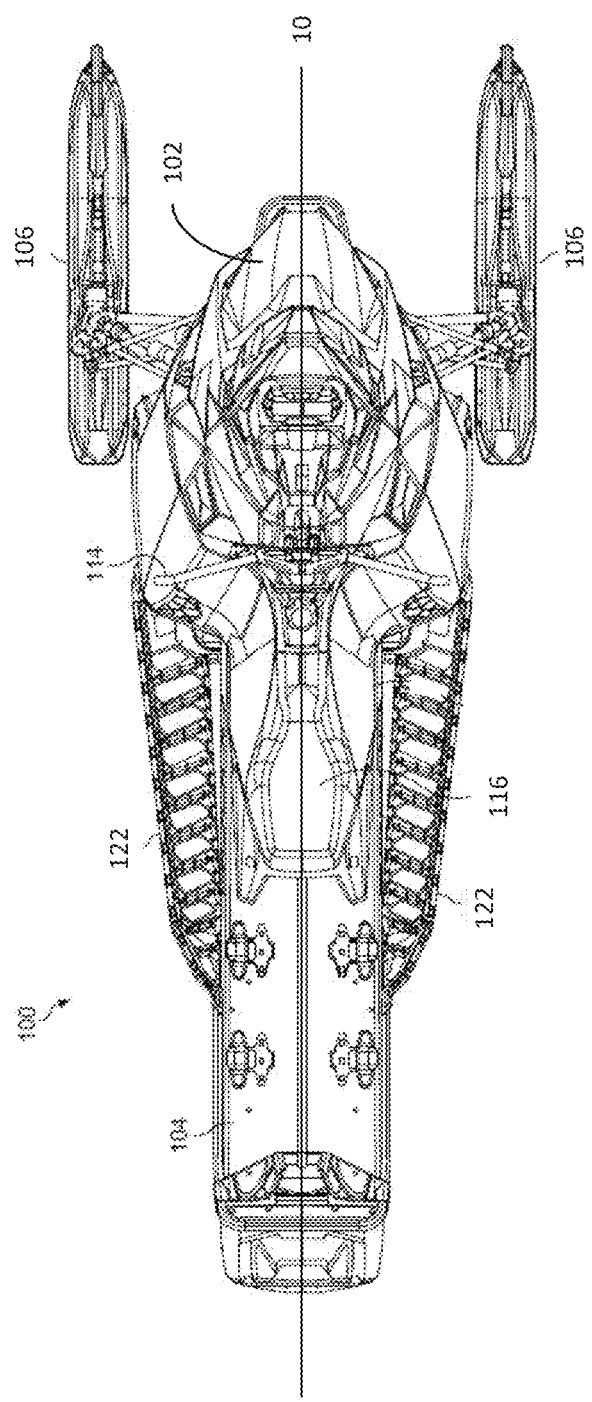
FIG. 4 illustrates a top view of a snowmobile, according to some embodiments.
Figure 13:
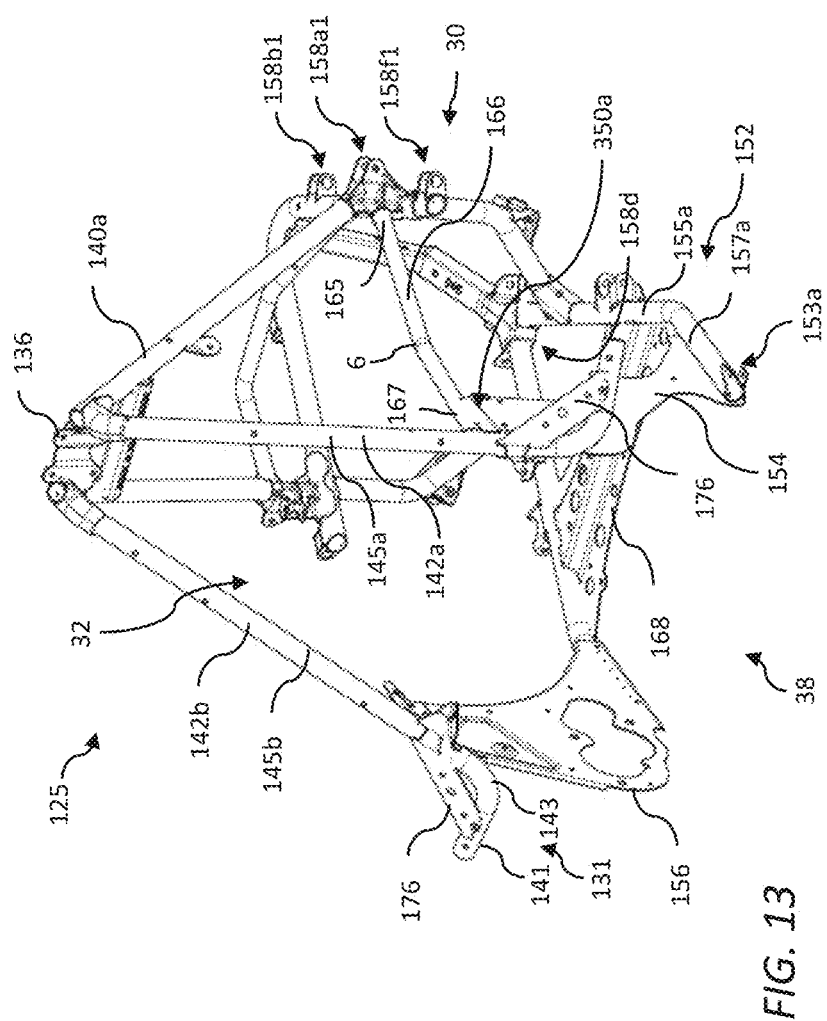
FIG. 13 illustrates a perspective rear view of a front frame, according to some embodiments.
Figure 20:
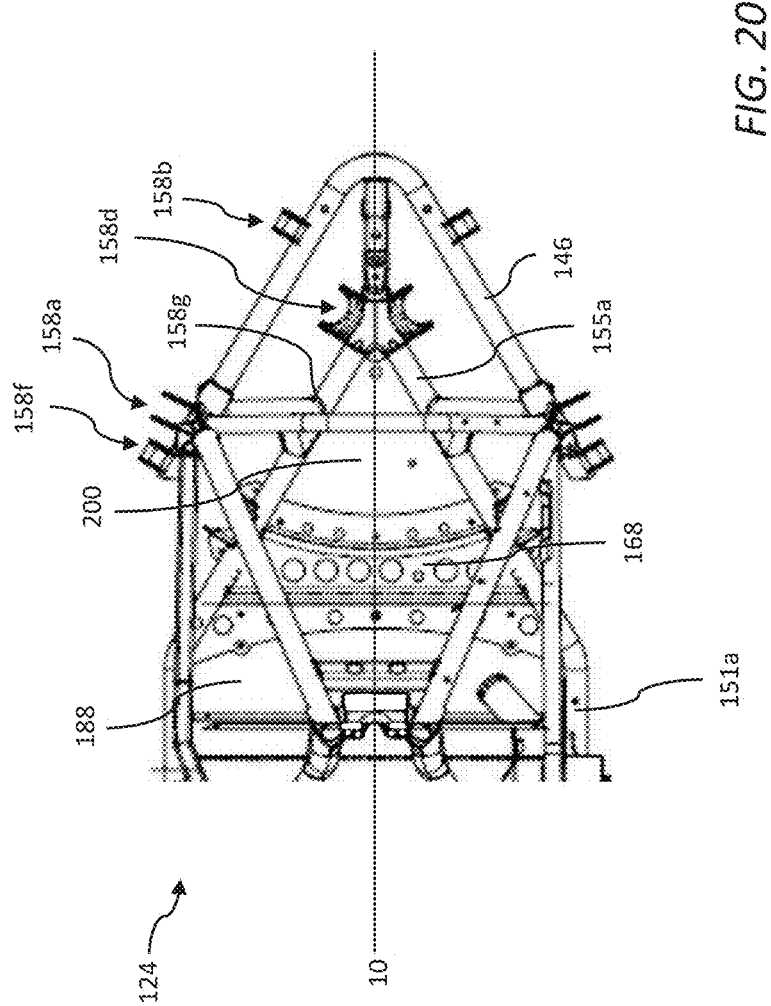
FIG. 20 illustrates a top view of a portion of the forward frame assembly.
Figure 21:
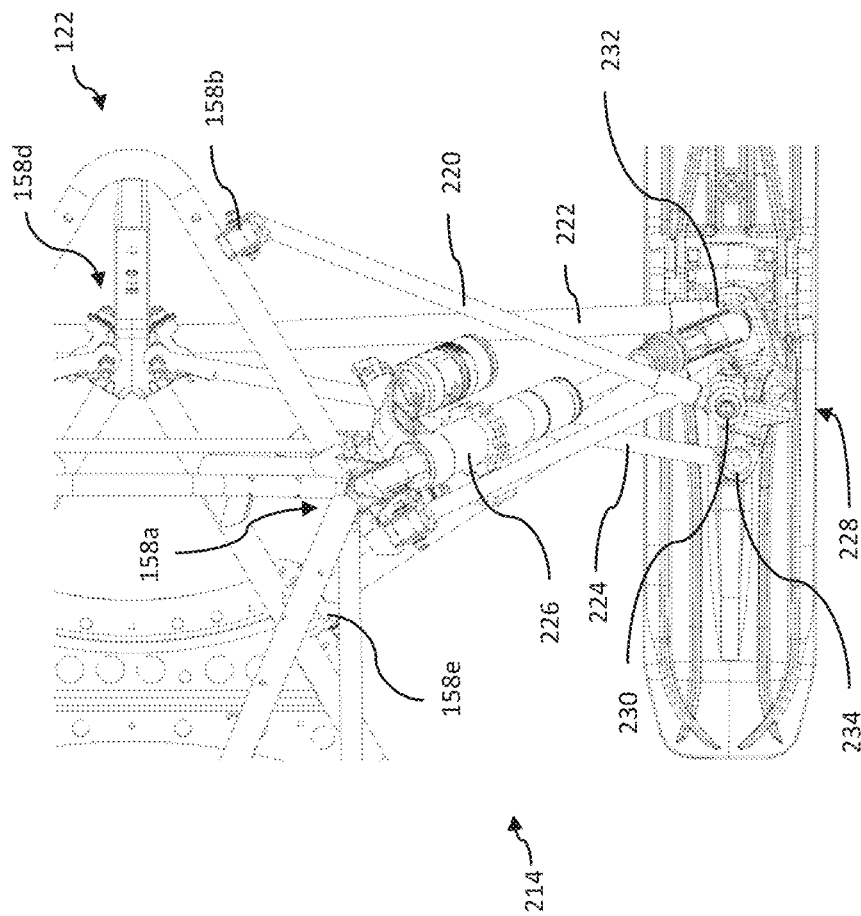
FIG. 21 illustrates a perspective top view of a front suspension coupled to the front frame, according to some embodiments.

The front frame 125 may define a front, a rear, and a longitudinal centerline 10 (centerline 10 is shown in FIGS. 4 and 20). The front frame 125 may include a first side 30 extending substantially along the longitudinal centerline 10 and a second side 32 extending substantially along the longitudinal centerline 10 and spaced apart from the first side 30 (see e.g., FIGS. 9-10). Each of the first side 30 and the second side 32 includes an inner perimeter 34 (34a, 34b) defining a side opening 36 (36a, 36b). As shown in FIG. 13, the first side 30 and the second side 32 are positioned to define a rear opening 38 therebetween at the rear of the front frame 125 for receiving the heat exchanger assembly 126, tunnel 104, or both therein. Accordingly, different heat exchanger assemblies and/or tunnels may be joined to the pre-assembled forward frame 125, eliminating the need to provide different frames dedicated to a single snowmobile model or configuration.

According to one or more aspects of the present disclosure, a forward frame assembly 124 for a snowmobile 100 is provided, comprising a front frame 125 including a front, a rear, and a longitudinal centerline 10. The front frame 125 includes a first side 30 extending along the longitudinal centerline 10, a second side 32 extending along the longitudinal centerline 10 and spaced apart from the first side 30. Each of the first side 30 and the second side 32 includes an inner perimeter 34 defining a side opening 36. The first side 30 and the second side 32 define a rear opening 38 therebetween at the rear of the front frame 125 for receiving a heat exchanger assembly 126 and/or tunnel 104 therein. Optionally, the first side 30 defines an outer perimeter 40 and the second side 32 defines an outer perimeter 42 (see e.g., FIG. 10). The first and second sides 30, 32 may define an interior region of the front frame 125. The interior region of the front frame 125 may house at least a portion of the heat exchanger assembly 126 (see e.g., FIG. 5 and FIG. 17). The interior region of the front frame 125 may further house an engine. In one example, the engine is positioned in the interior region forward of the heat exchanger assembly 126.

Figure 34:
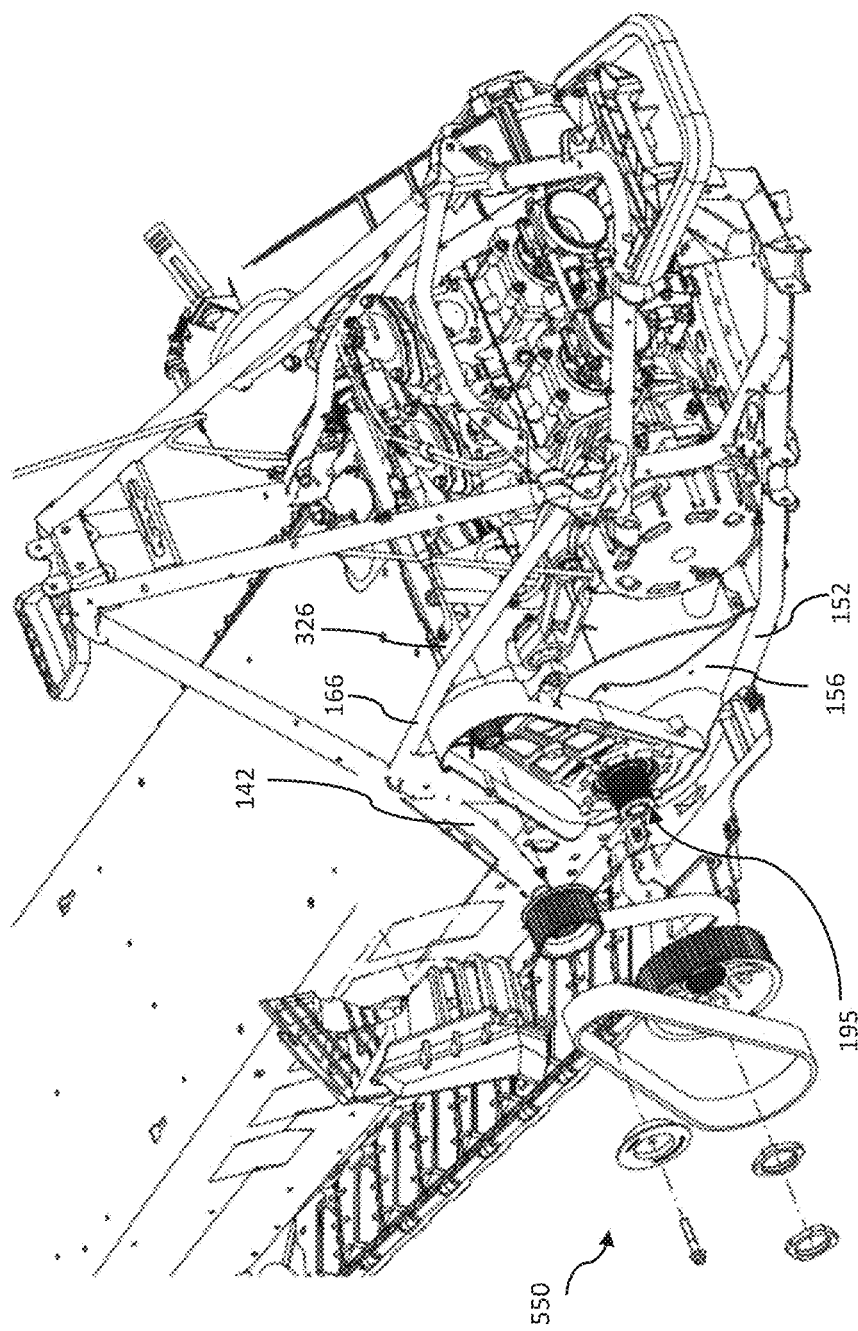
FIG. 34 illustrates an exploded isometric view of a belt housing assembly secured to a forward frame assembly, according to some embodiments.

In a non-limiting example, the forward frame assembly 124 comprises a first side 30 that includes an inner perimeter 34a that defines a first side opening 36a, and a second side 32 that includes an inner perimeter 34b that defines a second side opening 36b. The first side 30 may be at least partially defined by one or more of a forward leg 140a, the steering column mount component 136, a rearward leg 142a, the first metal plate component 154, and the tube member 157a (see e.g., FIGS. 9-10). The second side 32 may be at least partially defined by one or more of a forward leg 140b, the steering column mount component 136, a rearward leg 142b, the second metal plate component 156, and the tube member 157b. A track drive shaft 195 (see e.g., FIG. 34) is positioned rearward of the outer perimeter 40 of the first side 30 and forward of the outer perimeter 42 of the second side 32. An upper end of the metal plate 156 may include a flange 350 or shelf to support a rearward end of the removable horizontal member 240. The flange 350 may form a part of a rearward joint 239 (see e.g., FIG. 14) wherein the horizontal member 240 is joined to the front frame 125 with a vertically oriented fastener and a horizontally oriented fastener. The horizontal member 240 may be removably secured to the front frame 125 (e.g., to joint 158a2 and the metal plate 156 at the flange 350). The rearward end of the horizontal member 240 may be vertically positioned higher than at least a forward end of the tunnel 104. Optionally, the first side 30 defines an outer perimeter 40, the second side 32 defines an outer perimeter 42, and a track drive shaft 195 extends across the front frame 125. Optionally, the first side 30 includes a rearward leg 142a extending upward and forward from the metal plate 154 to a steering column mount component 136, a forward leg 140a extending upward and rearward to the steering column mount component 136, and a horizontal member 166 substantially extending along the longitudinal centerline 10 from the forward leg 140a to the rearward leg 142a, and a rearward end of the horizontal member 166 is vertically positioned higher than at least a forward end of the tunnel 104. The horizontal member 166 may be welded at one end to the joint 158a1 and at the other end to one or both of the metal plate 154 and the rearward leg 142a. Optionally, the track drive shaft 195 is positioned rearward of the inner perimeter 34a of the first side 30 and rearward of the inner perimeter 34b of the second side 32. Optionally, the second side 32 includes a rearward leg 142b extending upward and forward from the metal plate 156 to a steering column mount component 136, a forward leg 140b extending upward and rearward to the steering column mount component 136, and a horizontal member 240 substantially extending along the longitudinal centerline from the forward leg 140 to the rearward leg 142.

Figure 52:
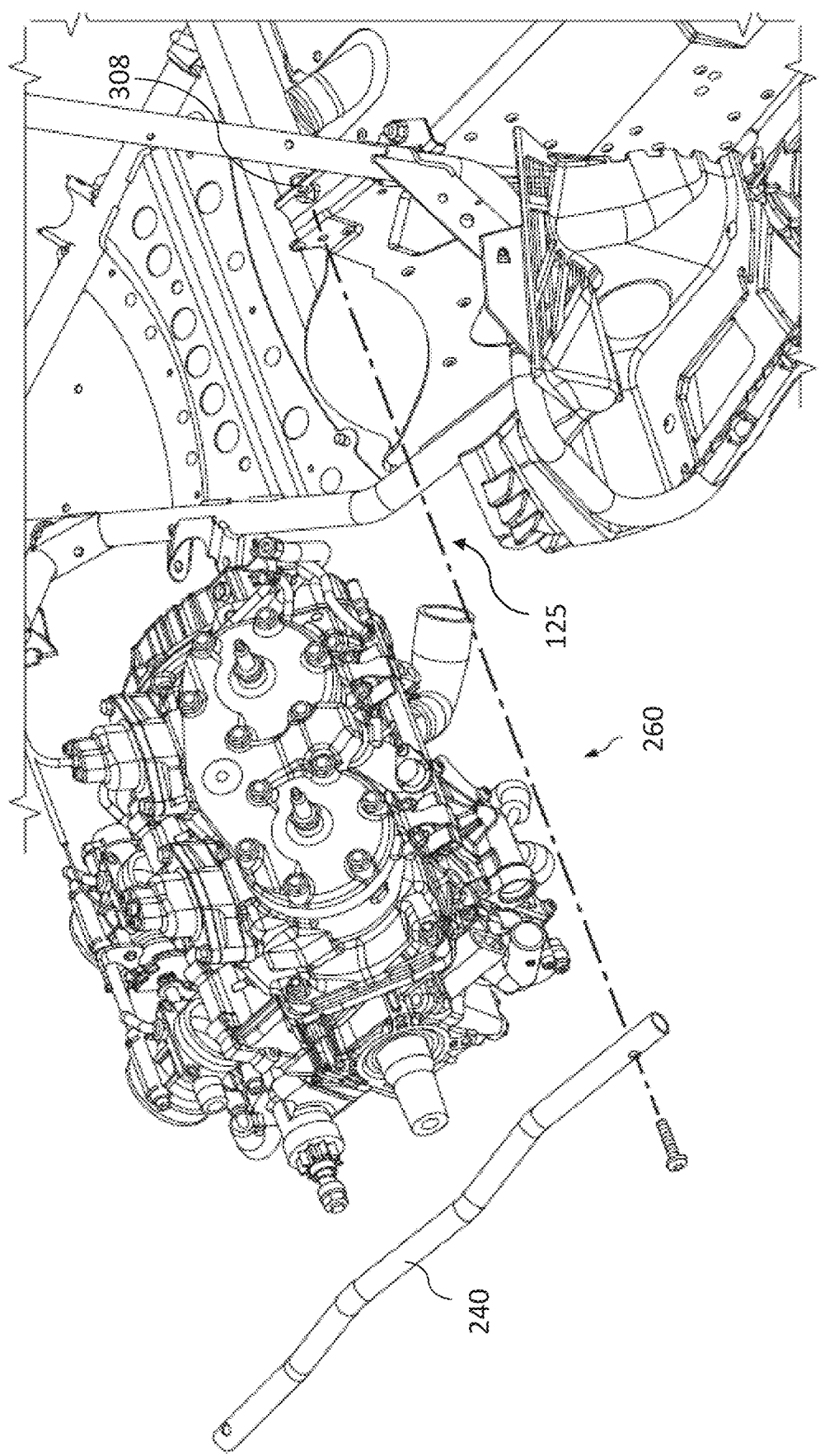
FIG. 52 illustrates an exploded isometric view of an engine being inserted within a front frame of a snow vehicle, according to some embodiments.
Figure 53:
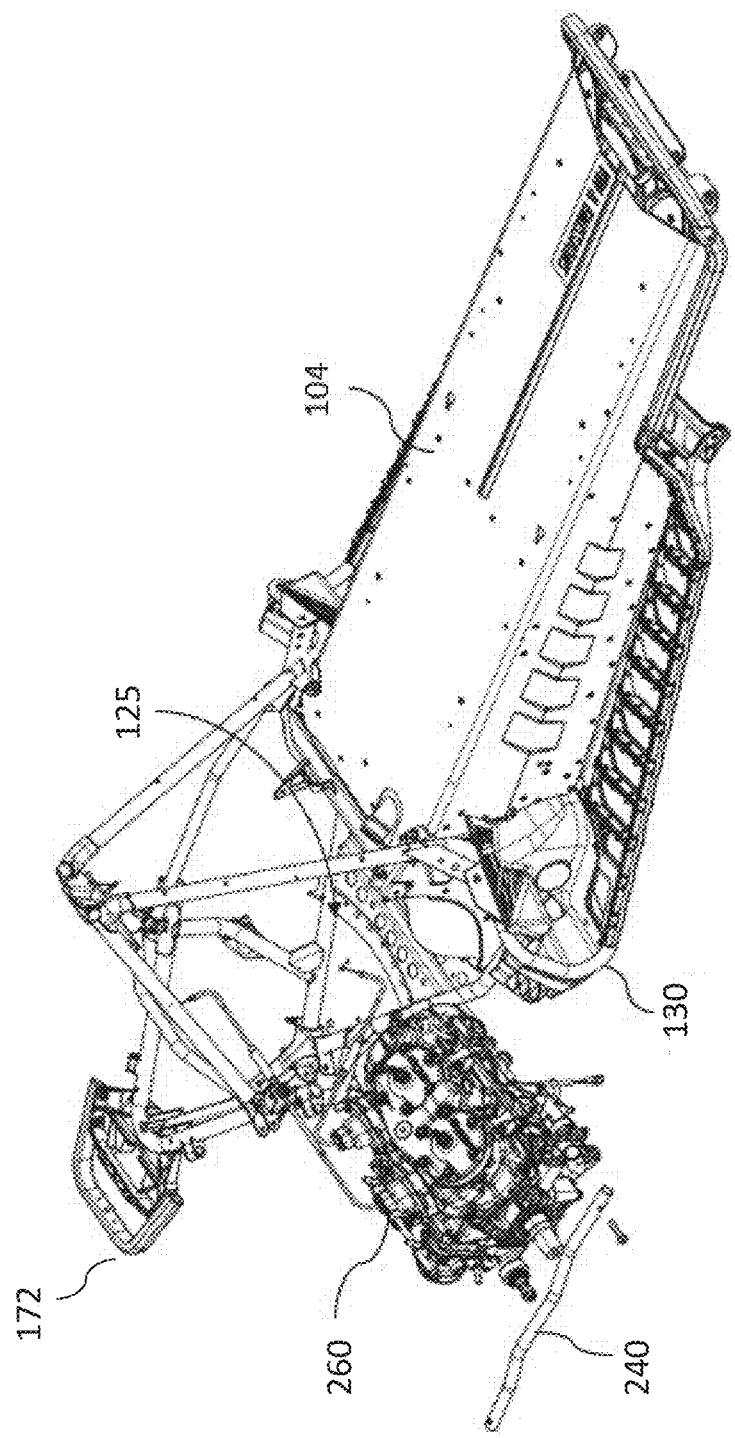
FIG. 53 illustrates an exploded isometric view of an engine being inserted within a front frame of a snow vehicle, according to some embodiments.

In another non-limiting example, the front frame 125 includes a rear side, a closed side 30 (obstructed by welded horizontal member 166), an open side 32 (accessible via removable horizontal member 240), an upper front 44, a lower front 46, and a bottom 48 (see e.g., FIGS. 9-12). The rear of the front frame 125 includes the two rearward legs 142 and the metal plates 154, 156. The closed side 30 of the front frame 125 is at least partially defined by one of the rearward legs 142a, one of the forward legs 140a, the horizontal member 166, and the first metal plate component 154. The open side 32 of the front frame 125 is at least partially defined by the other of the rearward legs 142b, the other of the forward legs 140b, and the second metal plate component 156. In some embodiments, an engine 260 is inserted through the open side 32 of the preassembled front frame 125 before the horizontal member 240 is releasably coupled to the front frame 125 (see e.g., FIGS. 52-53). For example, the horizontal member 240 may be secured to the flange 308 of the second metal plate 156 via a fastener (see FIG. 52). In an illustrative example, the engine is the one described in commonly owned U.S. patent application Ser. No. 18/090,909, filed Dec. 29, 2022, and entitled "Integrated Engine Mount", the contents of which are incorporated by reference in its entirety. Accordingly, the front frame 125 does not have to be built around the engine. The upper front 44 of the front frame 125 includes the two forward legs 140, the upper frame member 138, and the cross-tube 144. The lower front 46 of the front frame 125 includes the upper front member 146, the lower front member 148 and the joint 158*d* (the joint 158*d* may be referred to hereinafter as a pivot mount joint 158*d*). The bottom 48 of the front frame 125 includes the tube members 157, and the bottom plate 168.

In a further non-limiting example, the front frame 125 includes a forward section/lower front and a rear section. For example, a vertical plane bisecting the upright supports 150 may delineate a forward section/lower front 50 and a rear section 52 of the front frame 125 (see e.g., FIG. 9). In this example, the forward section 50 includes the upper front member 146 and the lower front member 148; and the rear section 52 includes the steering column mount component 136, the upper frame member 138, the forward legs 140, the rearward legs 142, the bottom plate 168, the first metal plate component 154, second metal plate component 156, and horizontal member 166. The lower portion 152 is positioned within both the forward and rear sections 50, 52. Depending on the orientation of the cross-tube 144, the cross-tube 144 may form a part of the forward section 50 or the rear section 52. For example, a cross-tube 144 extending rearward would form a part of the rear section 52. In some embodiments, the longitudinal length of the forward section 50 is the distance between the plane bisecting the upright supports 150 and a parallel plane positioned at the apex of the upper front member 146. The horizontal member 240 forms a part of the rear section 52 when coupled to the front frame 125.

Figures 35A, 35B:
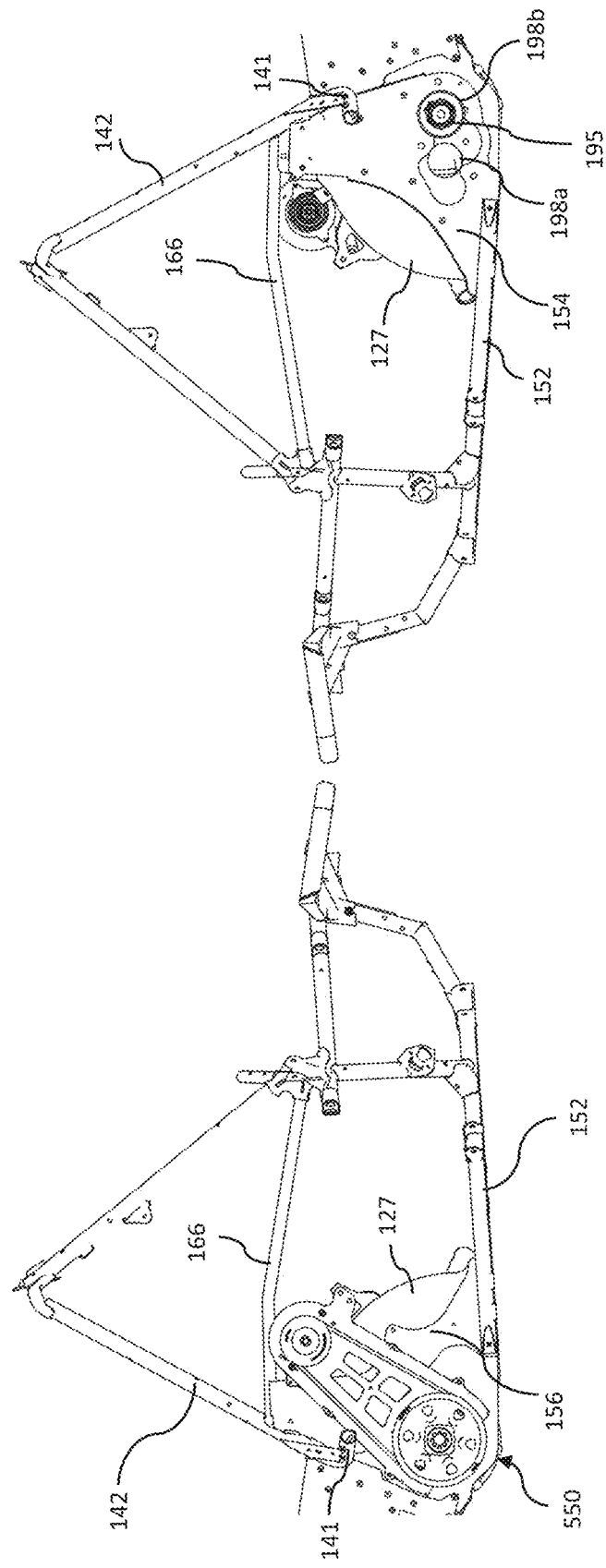
FIG. 35A illustrates a right side view of a belt housing assembly secured to the forward frame in a second position associated with the second snowmobile of FIG. 6B, according to some embodiments.
FIG. 35B illustrates a left side view of FIG. 35A with a track drive shaft positioned in a second position with respect to the forward frame, according to some embodiments.
Figure 36B:
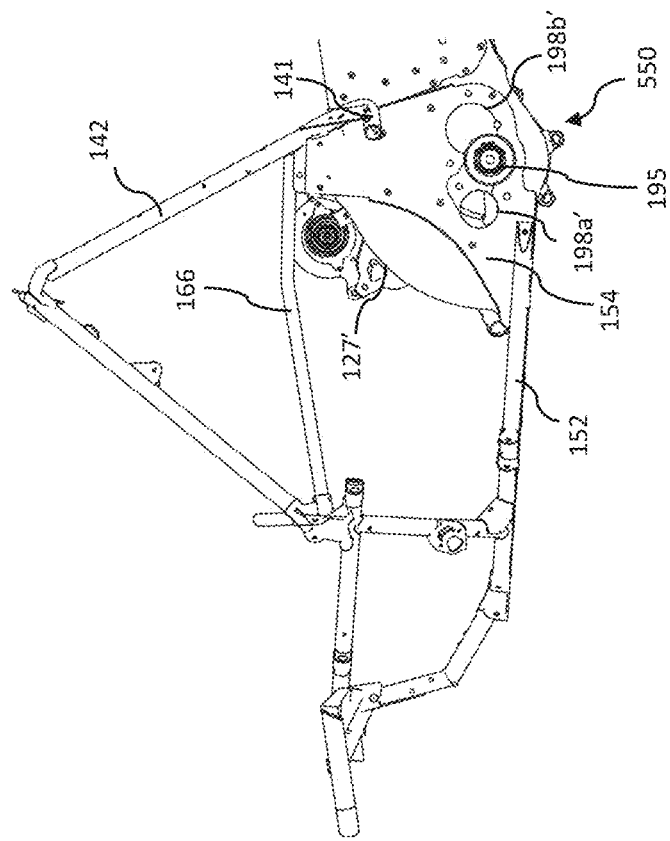
FIG. 36B illustrates a left side view of FIG. 36A with a track drive shaft positioned in a first position with respect to the forward frame, according to some embodiments.
Figure 36A:
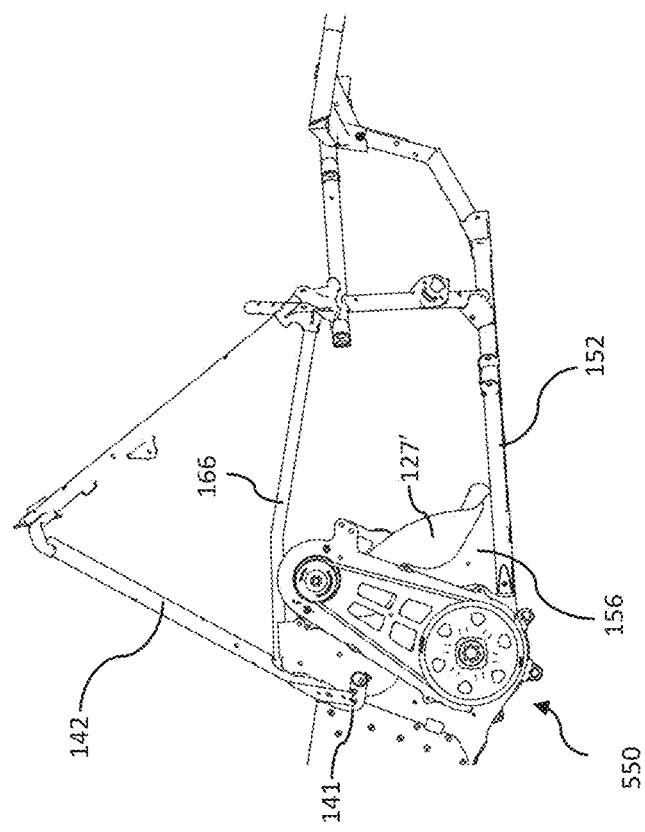
FIG. 36A illustrates a right side view of a belt housing assembly secured to the forward frame in a first position associated with the first snowmobile of FIG. 6A, according to some embodiments.
Figure 49:
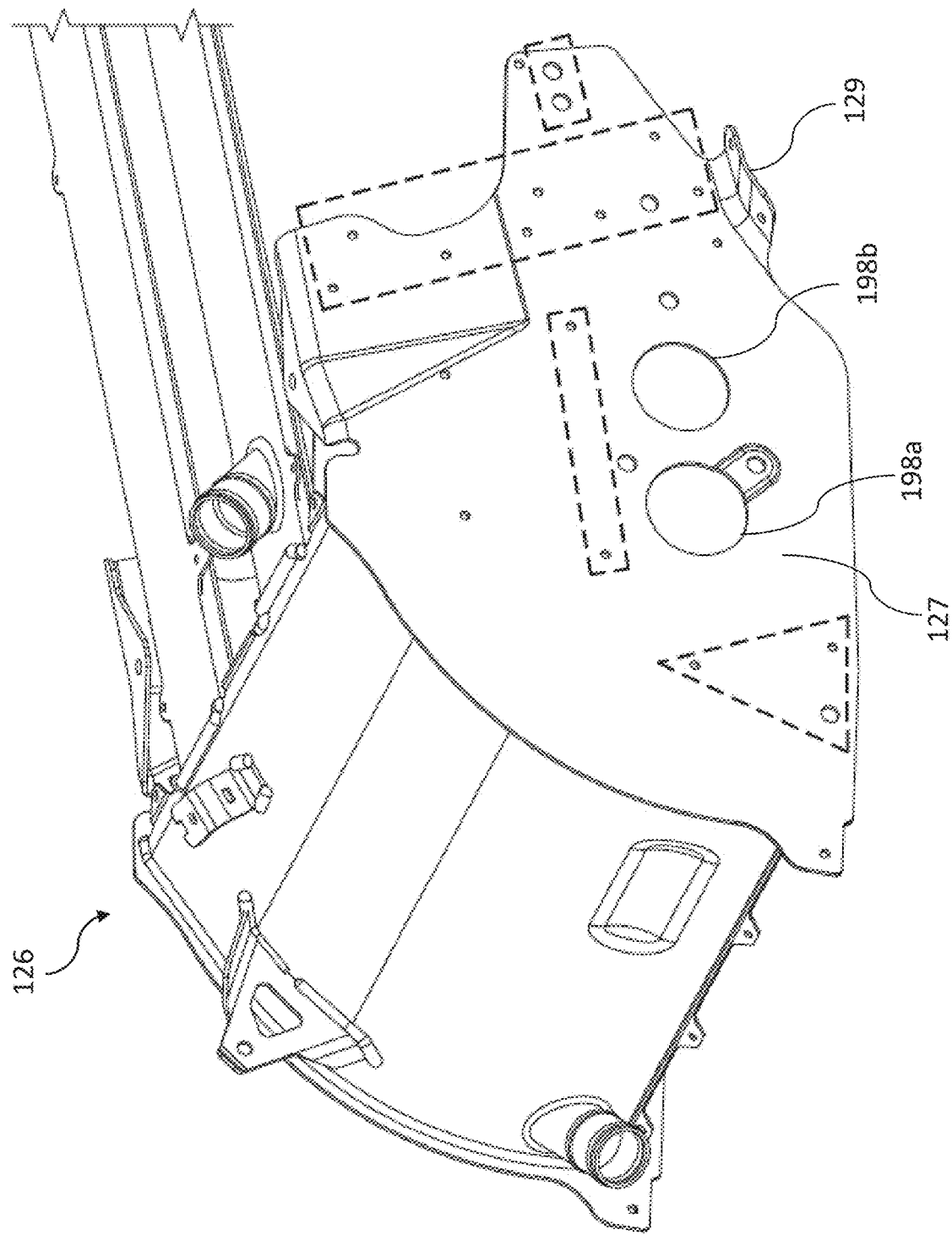
FIG. 49 illustrates an isometric view of a heat exchanger assembly including a first end cap associated with the snowmobile of FIGS. 35B and 6B, according to some embodiments.
Figure 50:
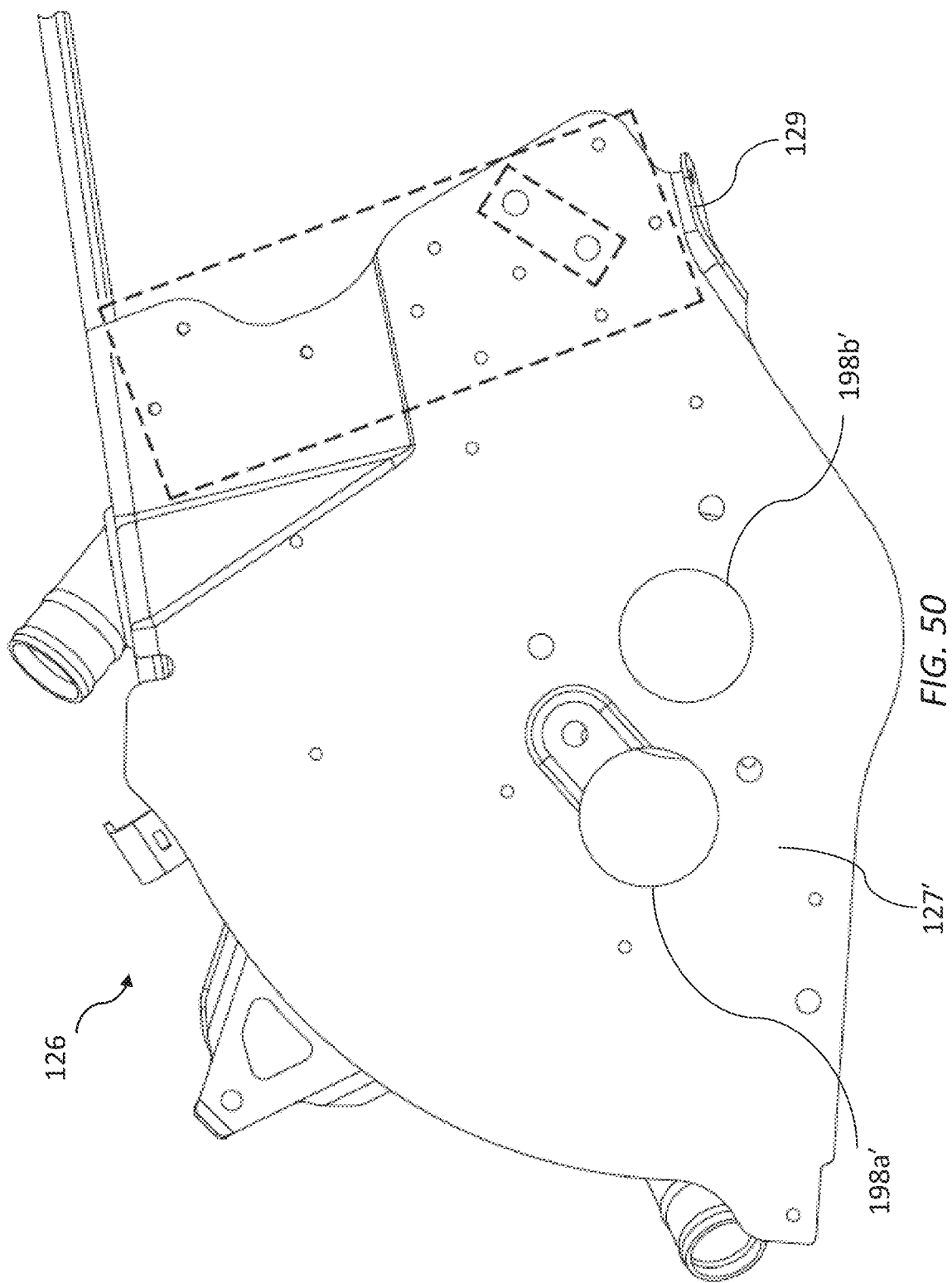
FIG. 50 illustrates a side view of a heat exchanger assembly including a second end cap associated with the snowmobile of FIGS. 36B and 6A, according to some embodiments.
Figure 51:
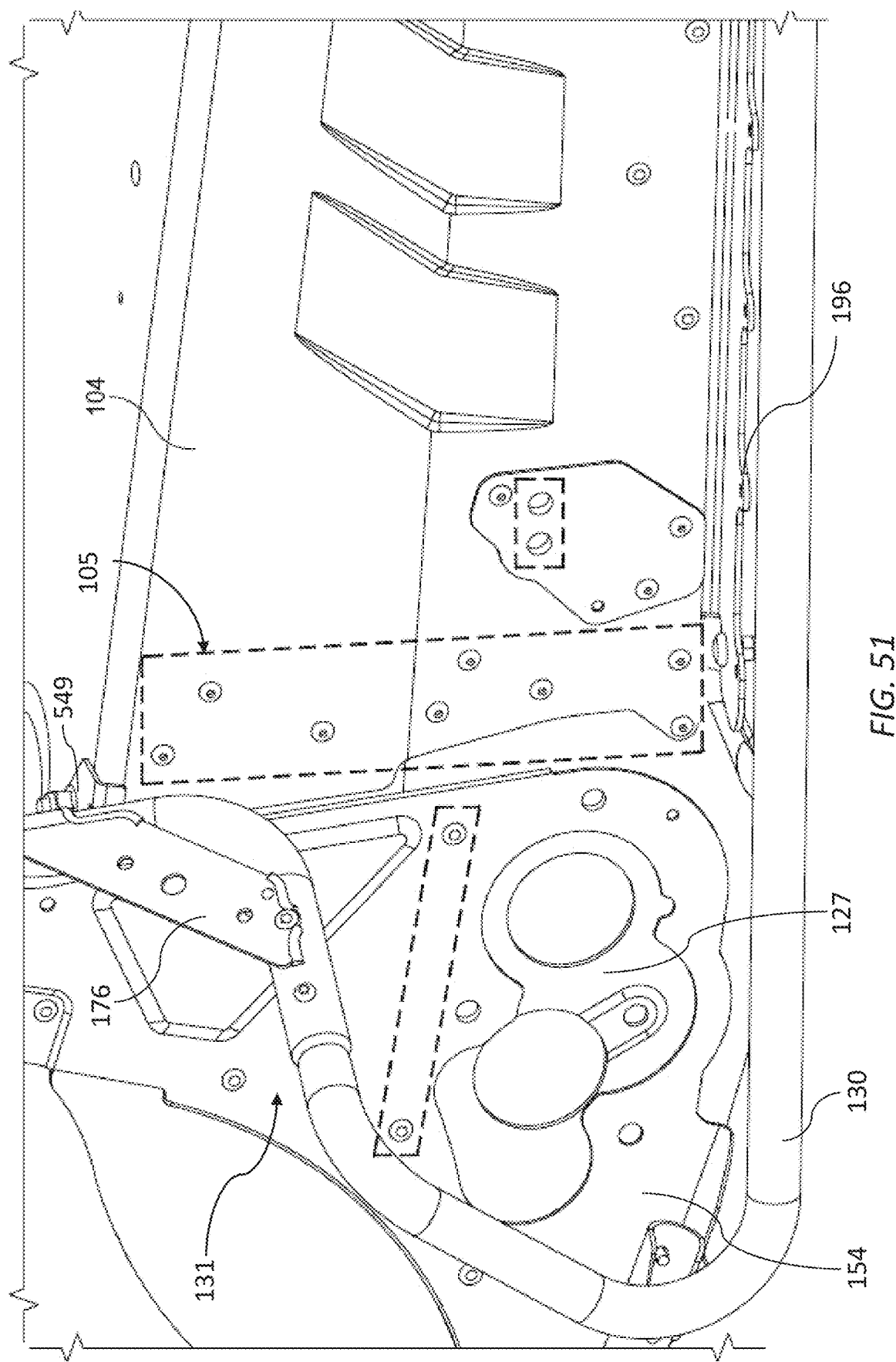
FIG. 51 illustrates an isometric side view of a first end cap of FIG. 49 associated with the snowmobile of FIGS. 35B and 6B, and a metal plate secured to a front frame of a snow vehicle, according to some embodiments.

In another non-limiting example, the front frame 125 includes a lower frame section 54 and an upper frame section 56 (see e.g., FIG. 17). The lower frame section 54 may have a greater longitudinal extent than the upper frame section 56. The lower frame section may include upper front member 146, lower front member 148, upright supports 150, and the lower portion 152. Components of the lower frame section 54 may be coupled by the pivot mount joint 158*d* connecting the tube members 157*a,b*, a weld 158*g*1 joining the tube member 157*a* and the upright support 150*a*, a weld 158*g*2 joining the tube member 157*b* and the upright support 150*b*, a weld 158*h*1 joining the upright support 150*a* to the upper front member beneath the joint 158*a*1, a weld 158*h*2 joining the upright support 150*b* to the upper front member beneath the joint 158*a*2, and a weld 158*i* joining the lower front member 148 to the upper front member 146. Optionally, the pivot mount joint 158*d* is positioned rearward of the weld 158*i*, forward of the welds 158*g*1, 158*g*2, and forward of the welds 158*h*1, 158*h*2. The lower frame section 54 may further include a bottom plate 168. The lower frame section 54 may further include at least one belly pan 188, 200 as shown in FIG. 20. The upper frame section 56 may include forward legs 140, rearward legs 142, steering column mount component 136, cross-tube 144, and horizontal member 166. The upper frame section 56 may further include an upper frame member 138. The upper frame member 138 may couple the forward legs 140 and be positioned closer to the steering column mount component 136 than the cross-tube 144. Components of the upper frame section 56 may be coupled at joint 158*a*1 and joint 158*a*2. Additionally, the upper and lower frame sections 54, 56 may be coupled at the joints 158*a*1, 158*a*2. Optionally, the upright supports 150 extend downward from the joints 158*a*1, 158*a*2. The upper and lower frame sections 54, 56 may be further coupled by a metal plate component 154, 156. The lower frame section 54 may further include a track drive shaft 195, a heat exchanger assembly 126, and an engine. The end caps 127 of the heat exchanger assembly 126 may be coupled to the metal plate component 154, 156. For example, the metal plate components 154, 156 may overlap the end caps 127 and may be secured thereto. In a non-limiting example, the metal plate components are secured to the end caps 127 with removable fasteners to allow the front frame 125 to be removed from the heat exchanger assembly 126. The engine may be positioned forward of the heat exchanger assembly 126. In an illustrative example, different end caps 127 may be used for different snowmobile models or configurations, such as the end caps shown in FIGS. 35A-B, 36A-B, 49-51 and 54-57 and disclosed in commonly owned U.S. Provisional Patent No. 63/405,176, filed on Sep. 9, 2022, and entitled "Recreational Vehicle Heat Exchanger End Caps and Assembly", and U.S. Provisional Patent No. 63/435,879, filed on Dec. 29, 2022, and entitled "Recreational Vehicle Heat Exchanger End Caps and Assembly", the contents of which are incorporated herein by reference. For instance, FIGS. 35A-B illustrate a first end cap 127 having a first configuration of openings 198*a*, 198*b*, whereas FIGS. 36A-B illustrate a second end cap 127' having a second configuration of openings 198*a*', 198*b*' that is different than the first configuration of openings 198*a*, 198*b*. FIG. 49 illustrates the heat exchanger assembly 126 having the end cap 127 with the first configuration of openings 198*a*, 198*b*, while FIG. 50 illustrates the heat exchanger assembly 126 having the end cap 127' with the second configuration of openings 198*a*', 198*b*'. The end cap 127 and the end cap 127' can both be configured to secure to one or more common mounting points on the common forward frame assembly 124 to, for example, provide different snowmobiles with different track drive shaft locations as shown in FIGS. 35 and 36.

Figure 10:
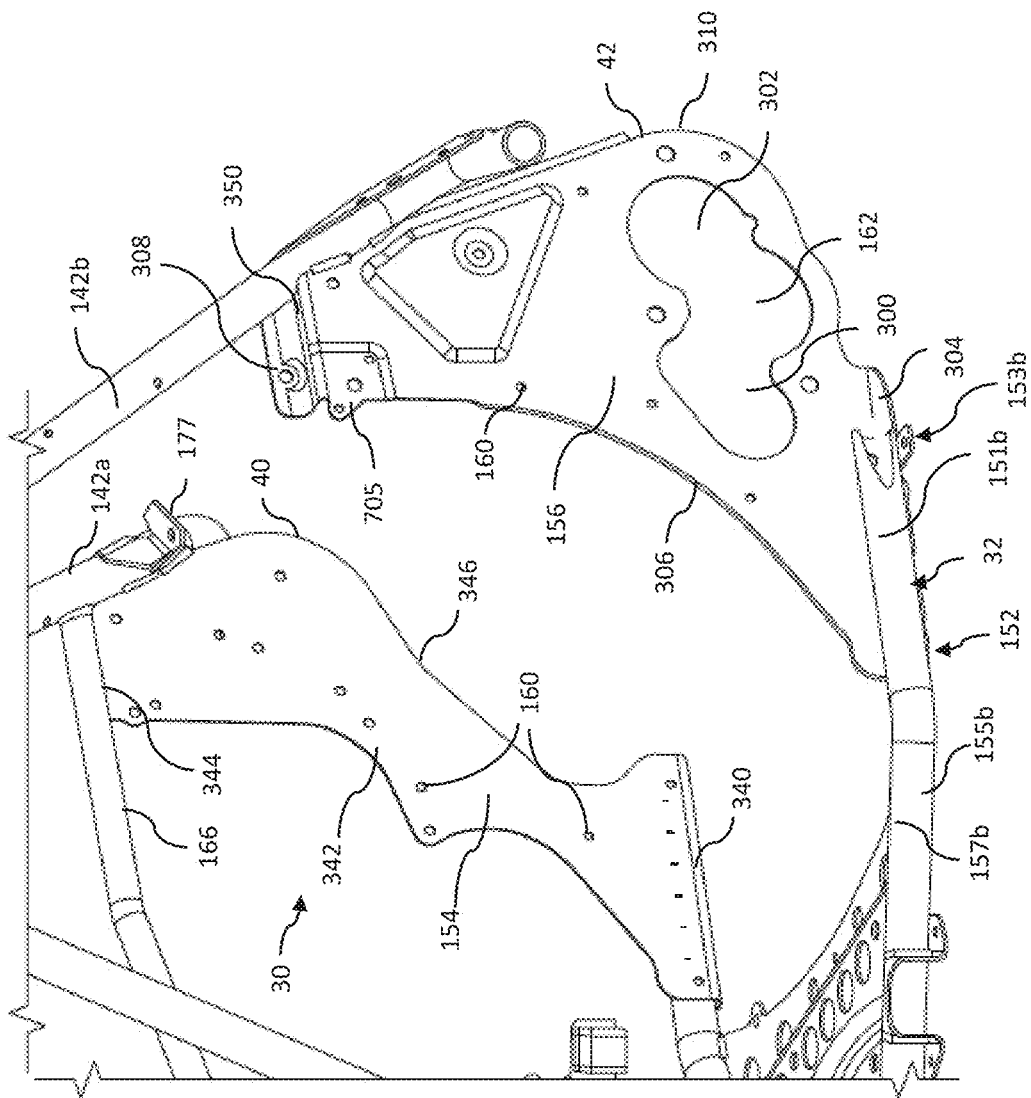
FIG. 10 illustrates a perspective view of metal plate components of a front frame, according to some embodiments.
Figure 46:
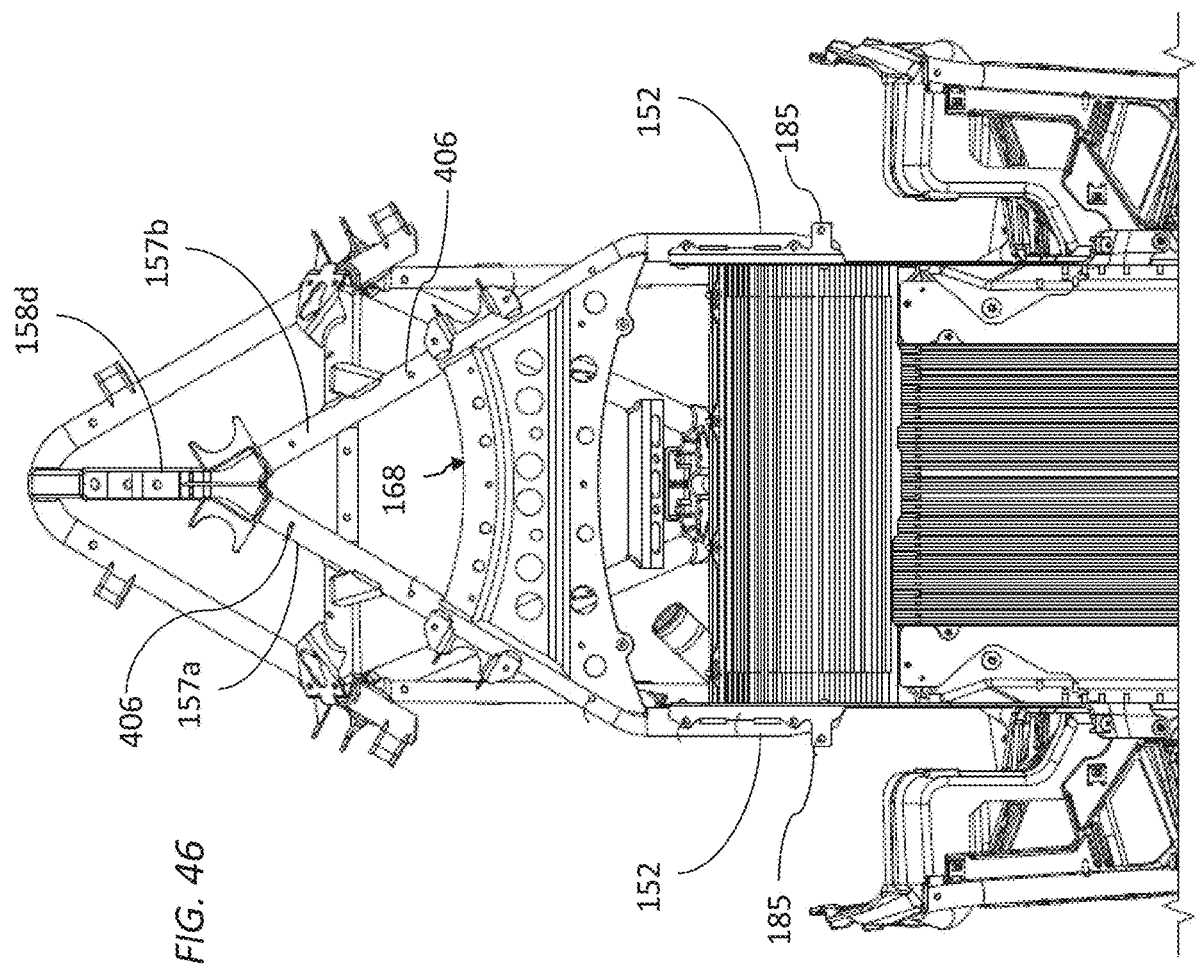
FIG. 46 illustrates a bottom view of the front frame, according to some embodiments.
Figure 54:
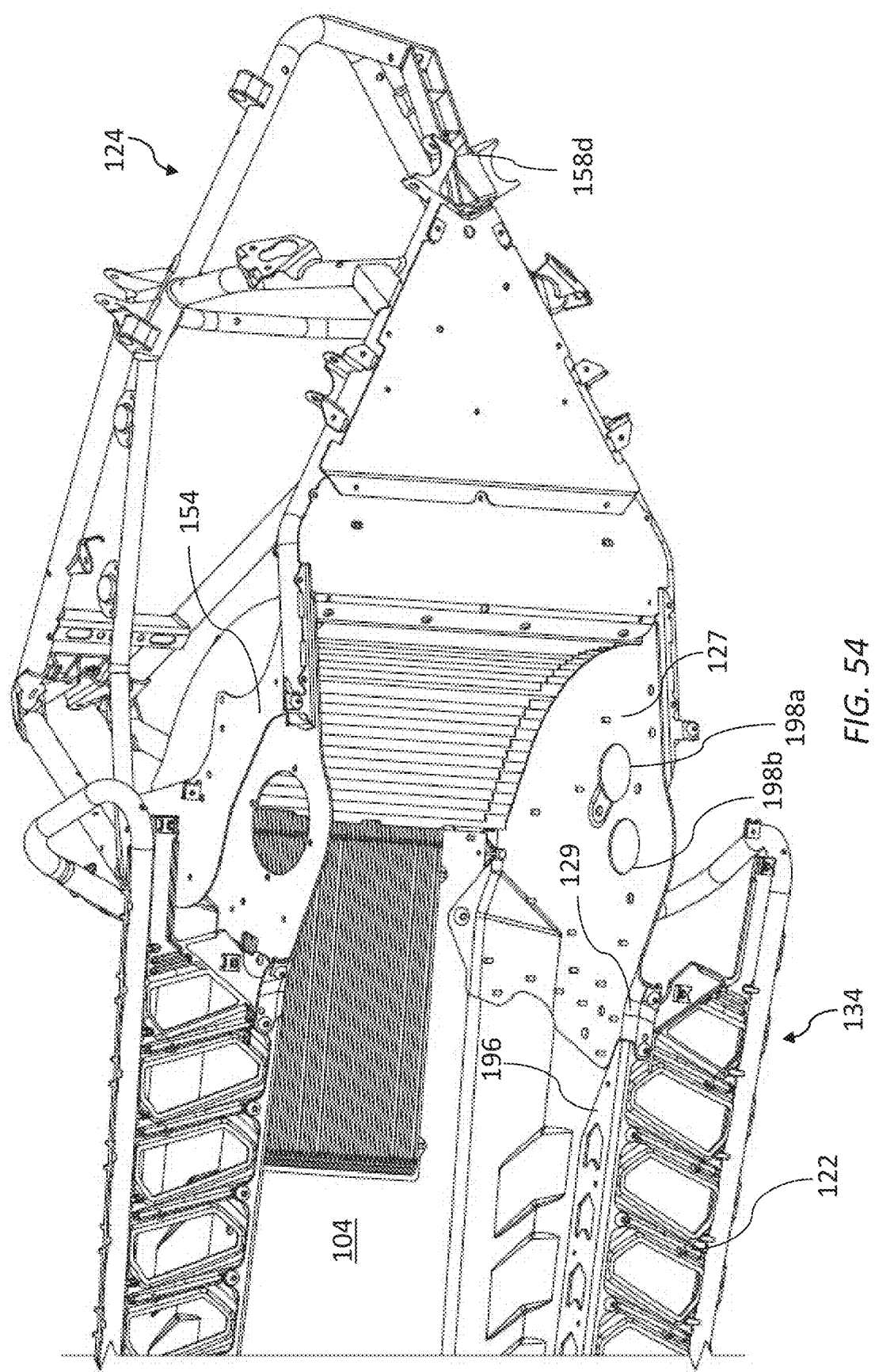
FIG. 54 illustrates a bottom isometric view of a heat exchanger assembly and a forward frame associated with the snowmobile of FIG. 6A, according to some embodiments.
Figure 55:
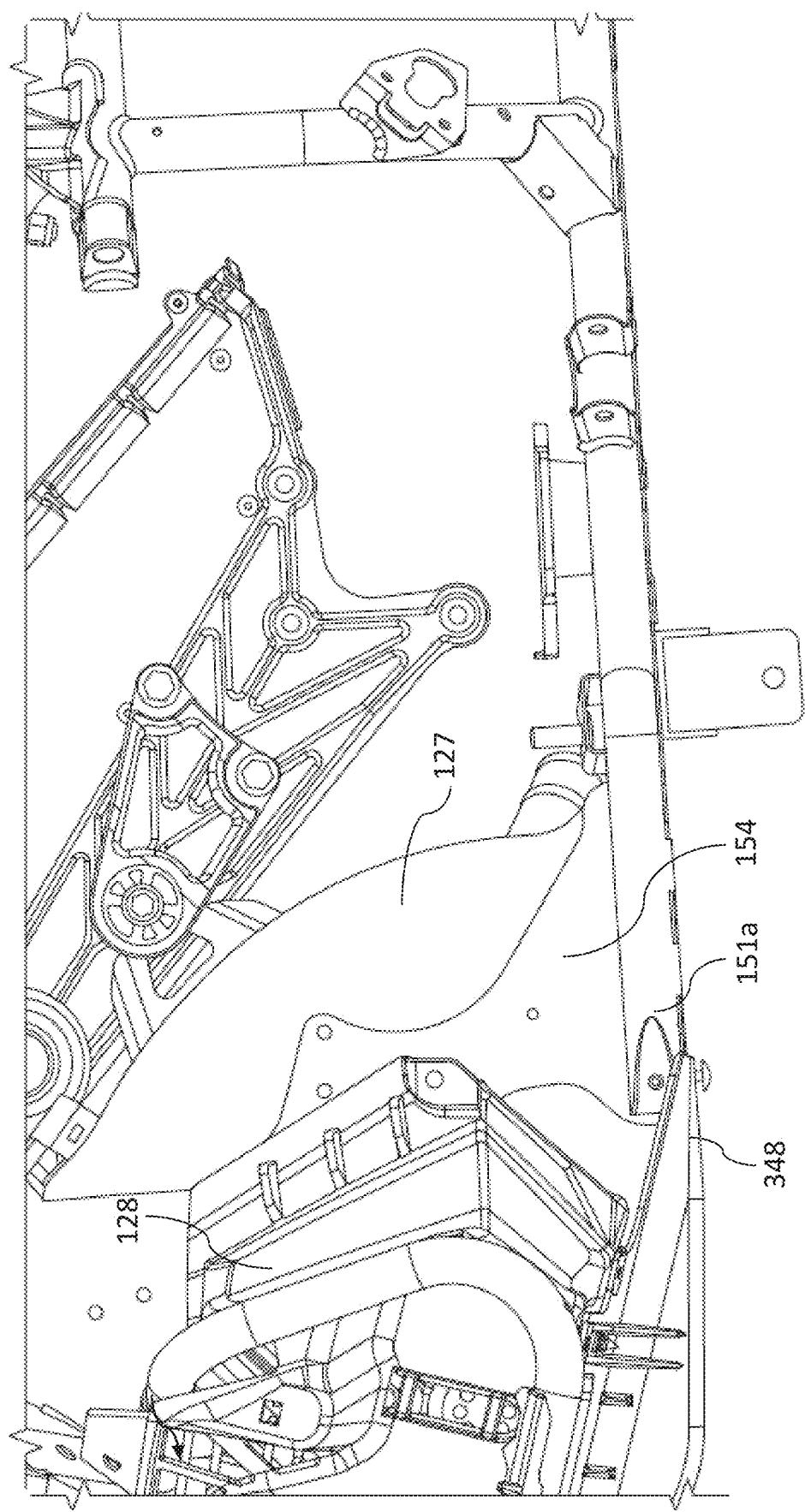
FIG. 55 illustrates a side view of a forward frame secured to a running board assembly, according to some embodiments.

According to one or more aspects of the present disclosure, a forward frame assembly 124 includes a front; a rear; a first side 30 that may be defined by at least a portion of one or more of a plurality of tubes 140*a*/142*a*/150*a*/157*a*/ and a plate component 154; and a second side 32 that may be defined by at least a portion of one or more a plurality of tubes 140*b*/142*b*/150*b*/157*b*/ and a plate component 156 (see e.g., FIGS. 9-10 and 13). The first side 30 includes an inner perimeter 34*a* that defines a first side opening. The second side 32 includes an inner perimeter 34*b* that defines a second side opening. The first side 30 and the second side 32 define a rear opening therebetween at the rear of the forward frame assembly 124 for receiving at least a portion of a heat exchanger assembly 126, a tunnel 104, or both therein (see e.g., FIG. 18). Optionally, a first tube member 157*a* extends forward and inboard from a rearward end 153*a* at a lower portion of the first side 30 and is secured to the pivot mount joint 158*d* that may comprise a casting that may partially define the front of the forward frame assembly 124, and a second tube member 157*b* extends forward and inboard from a rearward end 153*b* at a lower portion of the second side 32 and is secured to the pivot mount joint 158*d* (see e.g., FIGS. 9-10 and 13). Optionally, the first tube member 157*a* and the second tube member 157*b* are secured to the casting 158*d* to define a v-shaped lower forward end of the forward frame assembly 124 (coupling of the lower portion 152 to the casting 158*d* is best shown in FIGS. 13, 46, and 54). Optionally, the pivot mount joint 158*d* defines common lower suspension mounting point 272*a* and 272*b* for a first spindle assembly 228 and a second spindle assembly 228. In addition to, or alternatively, the joint 158*d* defines a common steering column mounting point 275 for a first steering column assembly 112*a* and a second steering column assembly 112*b* (see e.g., FIGS. 21, 22A-B, 23, 25A-B, 26A-B, 27A-B, and 32-33, 46, 54). In other words, the pivot mount joint 158*d* may be assembled on a first snowmobile (e.g., the snowmobile in FIG. 6A) or on a second snowmobile (e.g., the snowmobiles in FIG. 6B), wherein the first and second snowmobiles include different steering columns 112*a*, 112*b*, and/or different spindle assemblies 228*a*, 228*b*. The joint 158*d* may be provided with an aperture 285 to provide an additional steering column mounting position, or allow for the connection of additional steering geometry associated with one or both of the steering column assemblies 112*a,b* that are operably connected to the mounting point 275.

Figure 60A:
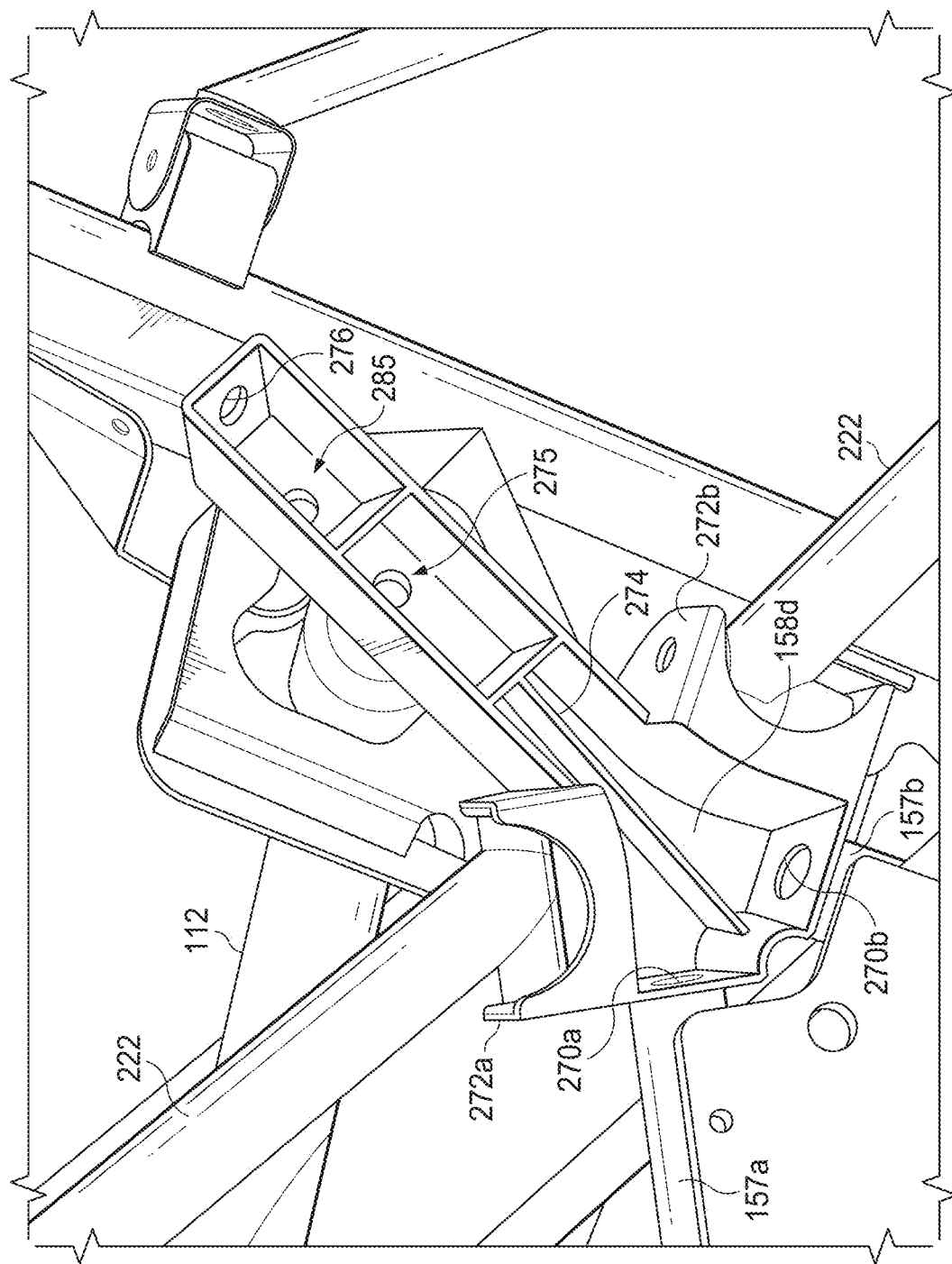
FIG. 60A illustrates an isometric bottom view of the pivot mount joint secured to the forward frame, according to some embodiments.
Figure 60B:
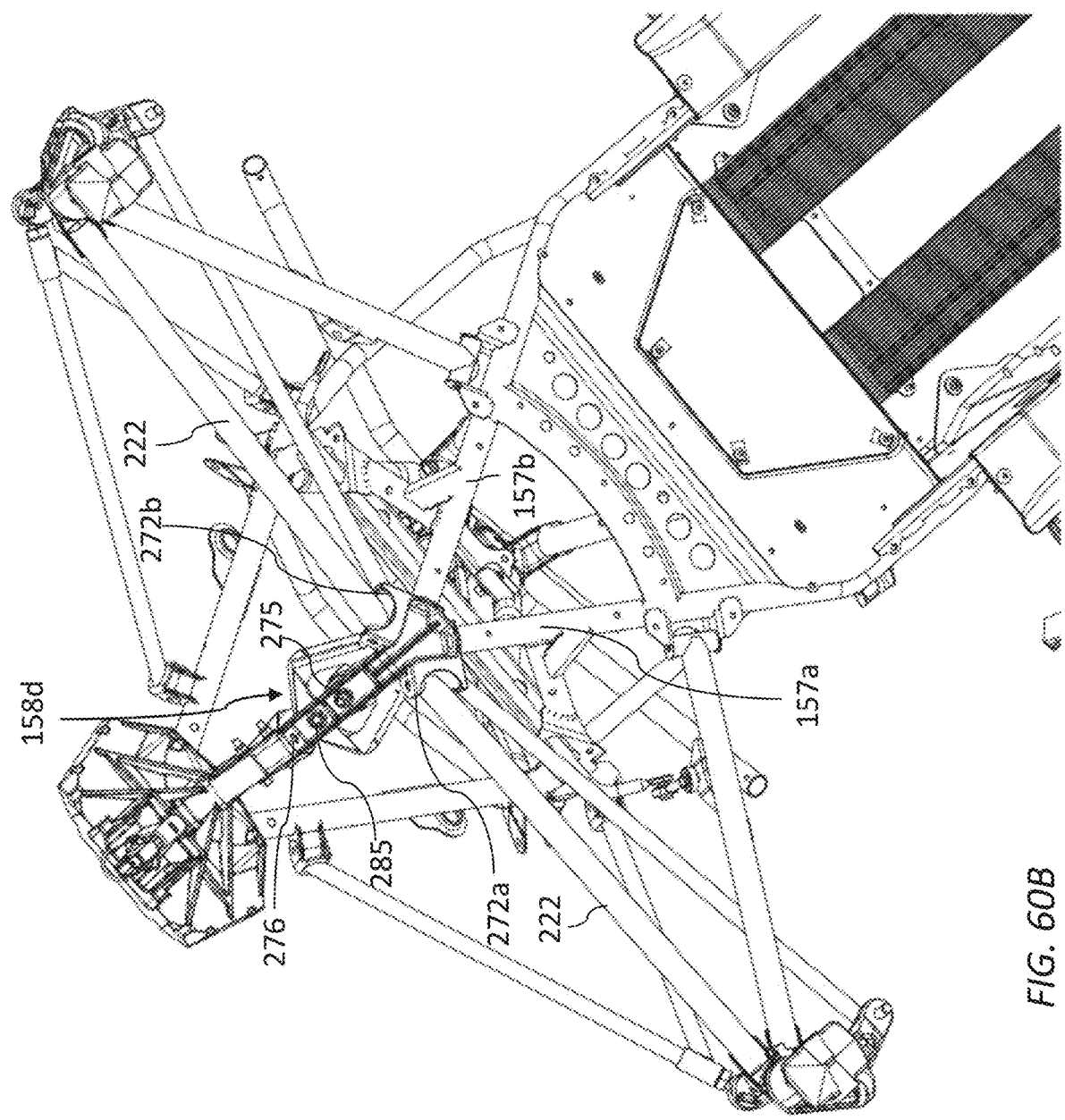
FIG. 60B illustrates an isometric bottom view of the pivot mount joint secured to the forward frame, according to some embodiments.
Figure 61A:
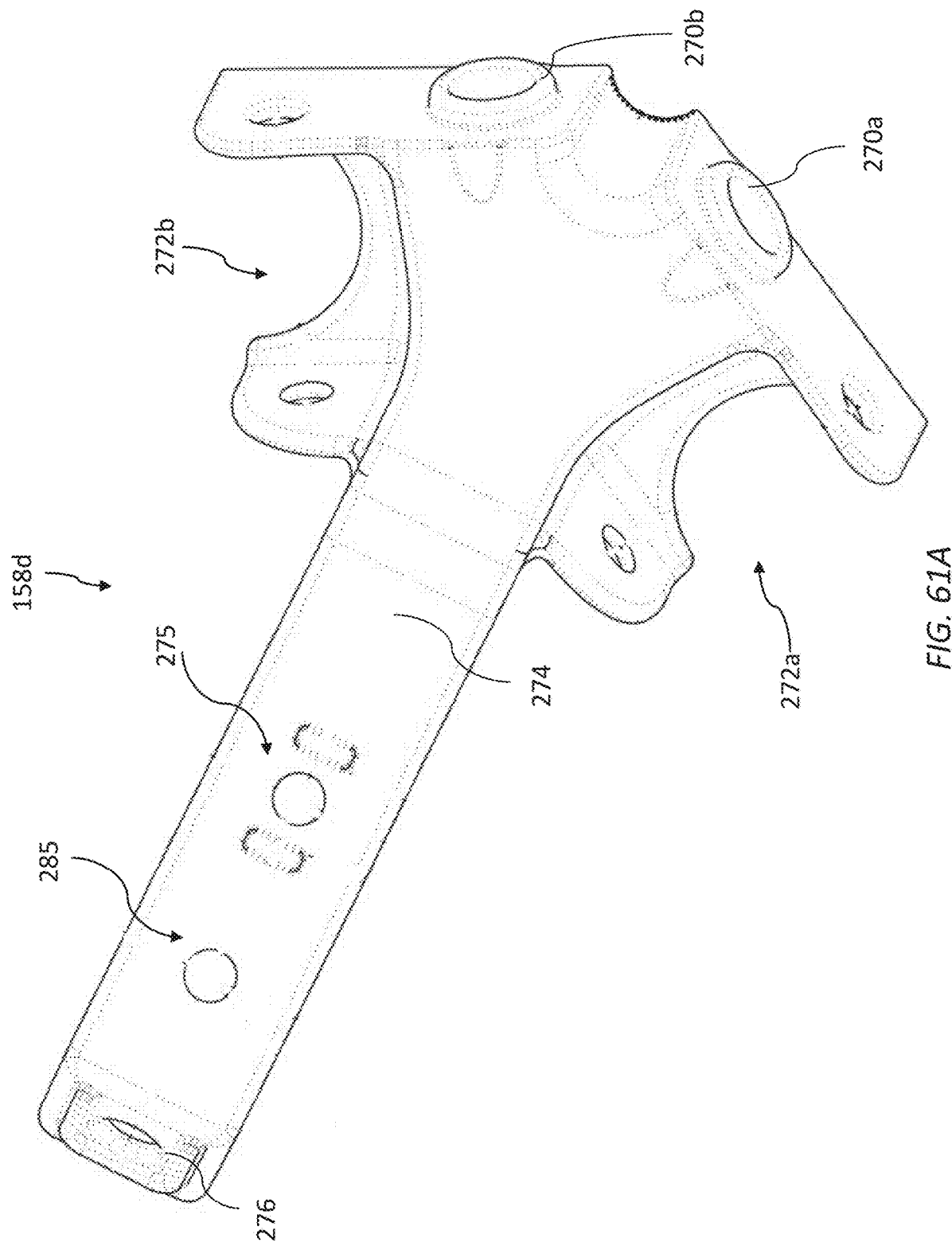
FIG. 61A illustrates a top view of the pivot mount joint of FIG. 60A, according to some embodiments.
Figure 61B:
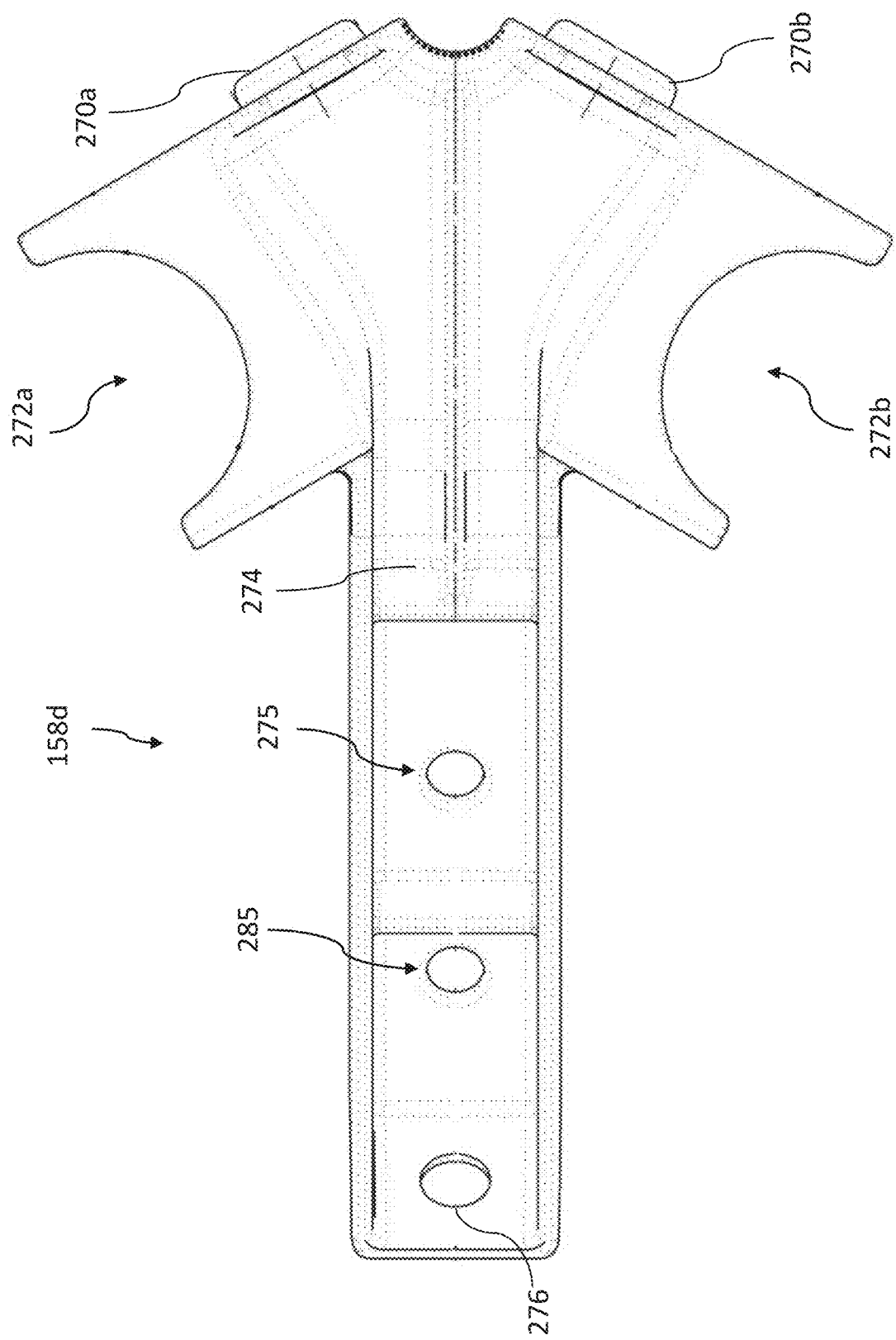
FIG. 61B illustrates a bottom view of the pivot mount joint of FIG. 60A, according to some embodiments.
Figure 62A:
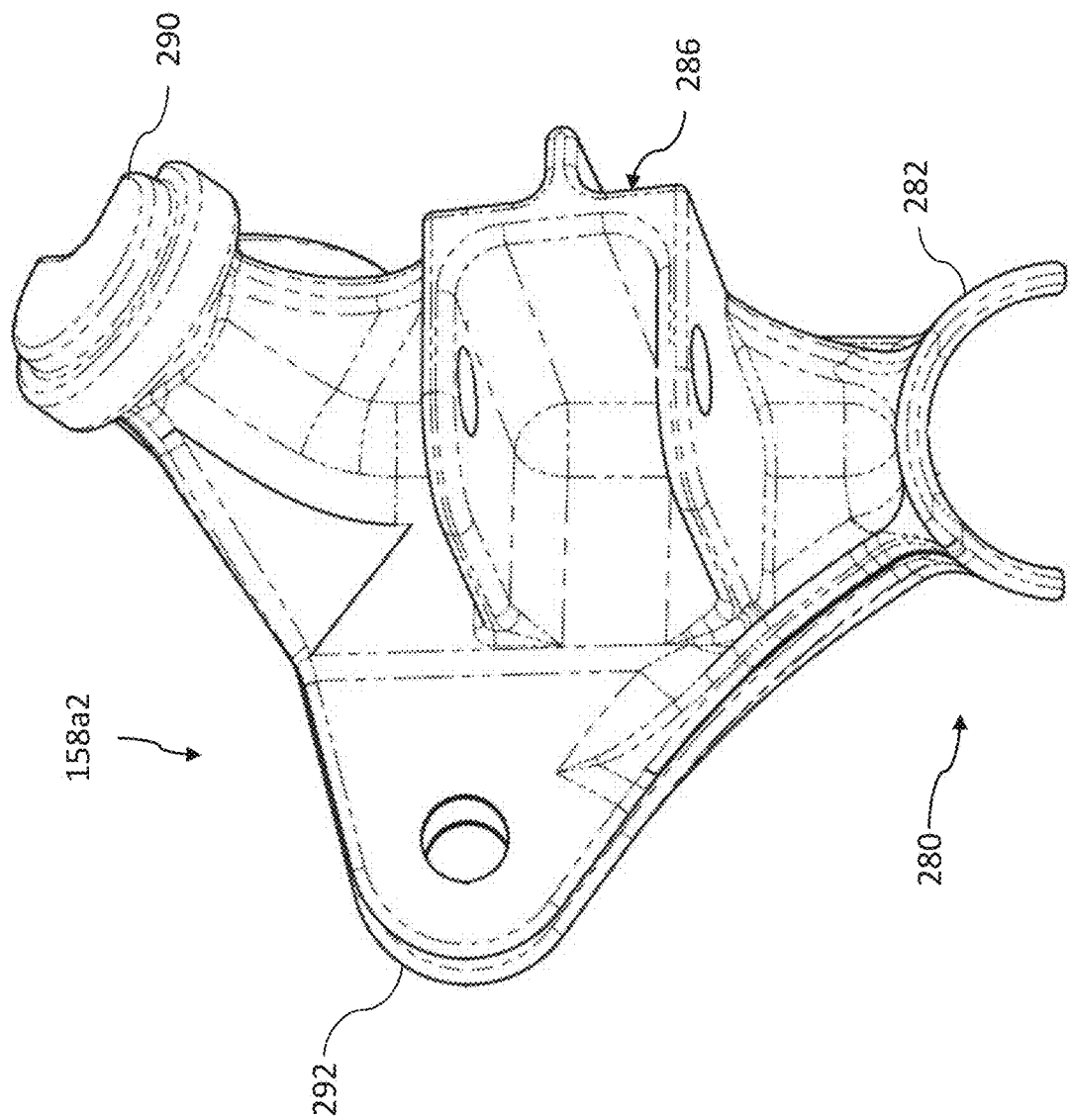
FIG. 62A illustrates an isolated front view of a cast joint, according to some embodiments.
Figure 62B:
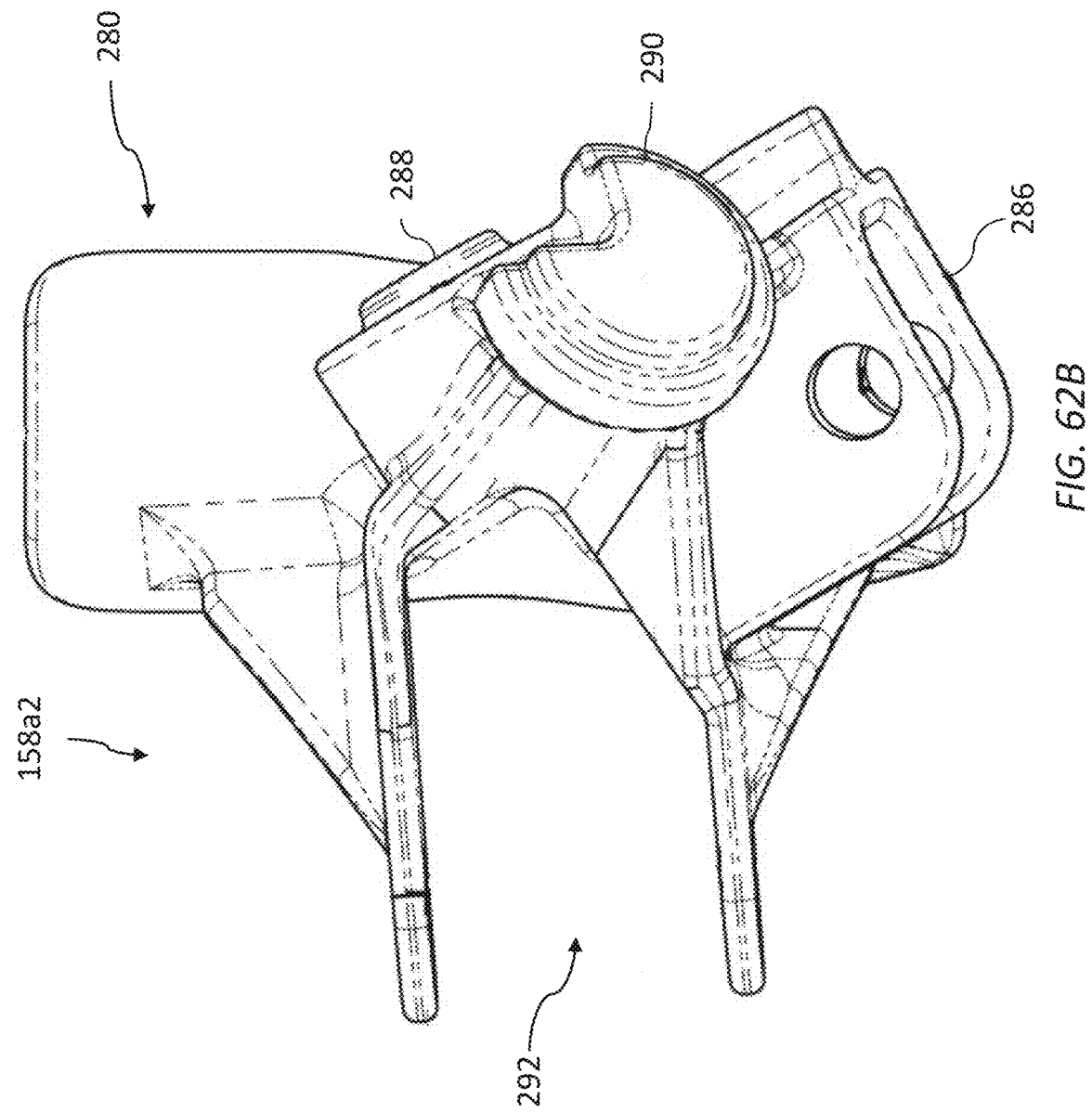
FIG. 62B illustrates an isolated top view of the cast joint of FIG. 62A, according to some embodiments.
Figure 63A:
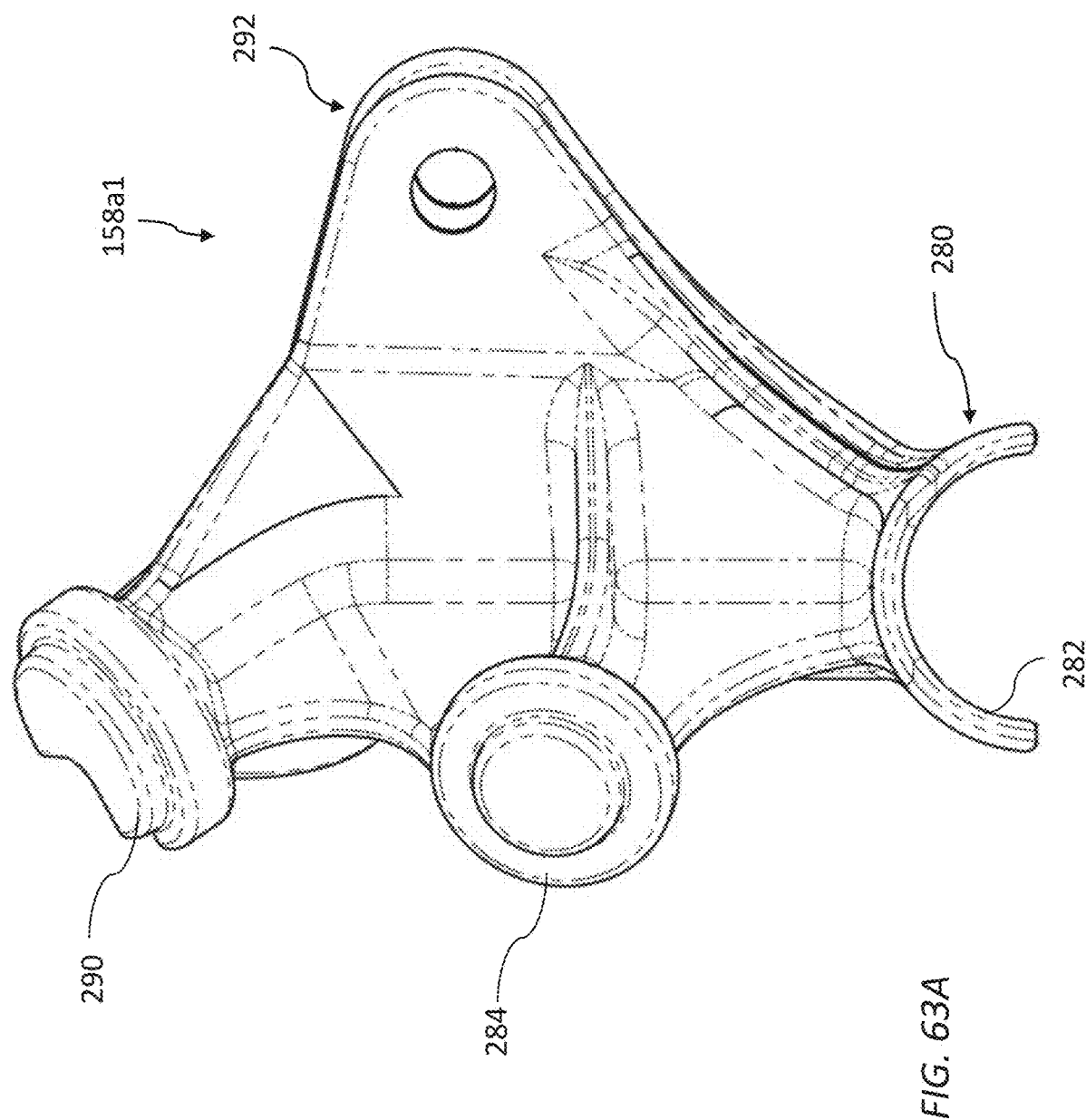
FIG. 63A illustrates an isolated front view of a cast joint, according to some embodiments.
Figure 63B:
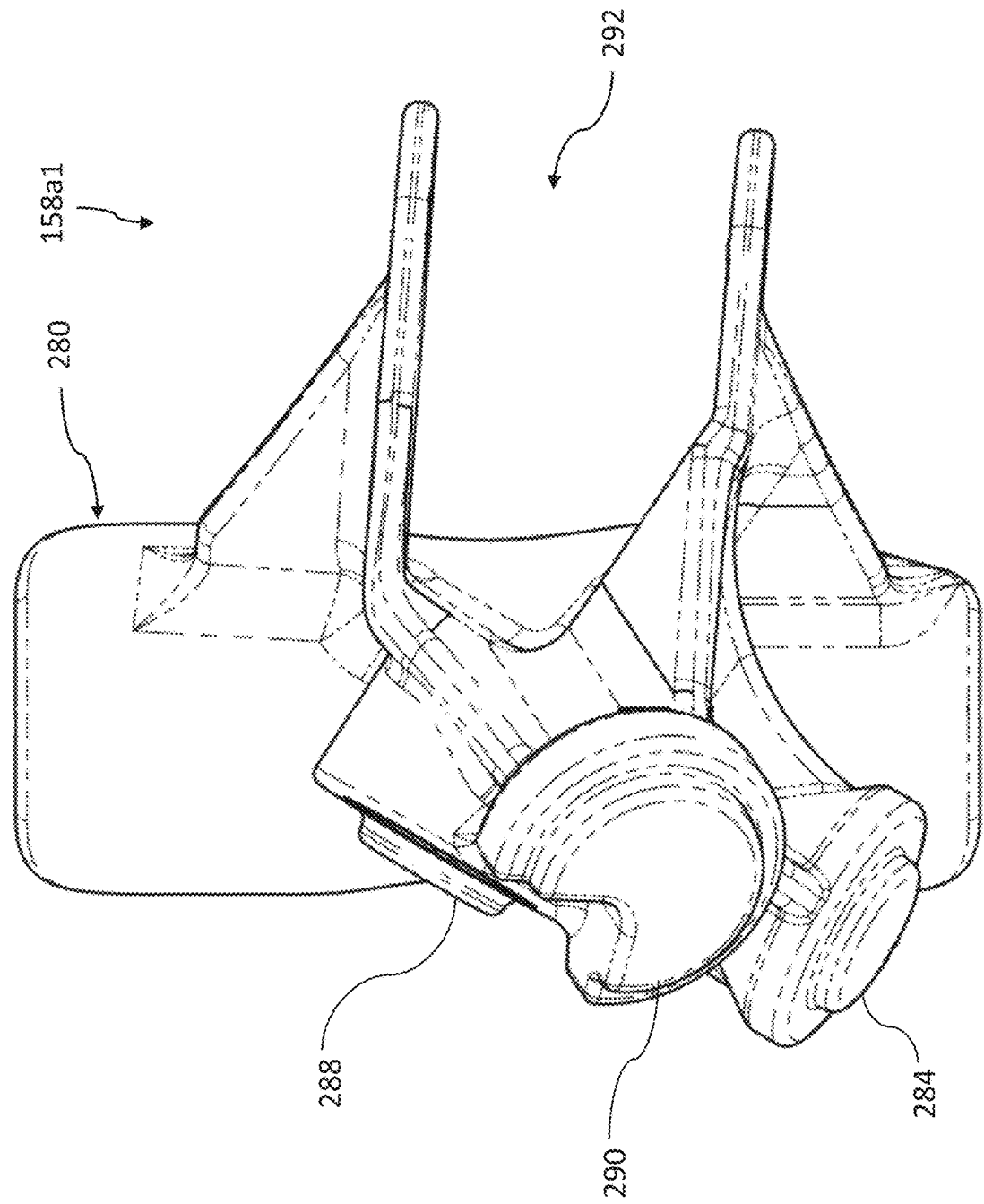
FIG. 63B illustrates an isolated top view of the cast joint of FIG. 63A, according to some embodiments.

FIGS. 60A-61B illustrate the pivot mount joint 158*d*. The pivot mount joint 158*d* may be secured to the lower tube members 157*a*, 157*b* at mounting points 270*a*, 270*b*. In an illustrative example, the mounting points 270*a*, 270*b* may be shaped to facilitate positioning of the lower tube members 157*a*, 157*b* with respect to the joint 158*d* during assembly or welding. The lower A-arms 222 of the spindle assembly 228 may be secured to the pivot mount joint with fasteners at recess 272*a*, 272*b*. In some embodiments, the recesses 272*a*, 272*b* may be configured to allow the lower A-arm 222 to pivot in a vertical direction (e.g., in response to bumps or uneven terrain causing the ski to rise). The pivot mount joint 158*d* includes a body section 274. In some embodiments, the body section 274 may be configured to provide structural support for the forward frame 125 by securing a plurality of tube members. The pivot mount joint 158*d* may include a steering column mounting point 275 and an aperture 285. As illustrated in FIGS. 60A-B, the steering column mounting point 275 may be configured to receive the steering column 112, or more specifically, the ball joint 210 of the steering column (see e.g., the ball joint 210*b* in FIG. 29A). The aperture 285 may be configured to receive the attachment mechanism 208 (see e.g., the attachment mechanism 208*b* in FIG. 29A). In other embodiments, the aperture 285 may be configured to receive the ball joint 210 (see e.g., the ball joint 210*a* in FIG. 28A) and the steering column mounting point 275 may be configured to receive the attachment mechanism 210 (see e.g., the attachment mechanism 208*a* in FIG. 28A). The pivot mount joint 158*d* may include a front member attachment point 276 configured to secure to the front member 148. In some embodiments, the forward attachment mechanism 209*b* may be secured to the front member 148 (see FIGS. 29A and 60A-B).

In an embodiment, the steering column mount component 136 may comprise a structural component of the forward frame 125 that is welded to upper ends of the forward leg 140 and the rearward leg 142. The forward leg 140 extends forward and the rearward leg 142 extends rearward from the steering column mount component 136 (see e.g., FIG. 9). In some embodiments, the vehicle has two forward legs and two rearward legs. The forward leg 140 extends downward in a forward direction from the steering column mount component 136 to joint 158*a*1 where it is welded thereto (see e.g., FIG. 11). The rearward leg 142 extends rearward from the steering column mount component 136 to the tunnel mounting features 177, and optionally extends from the tunnel mounting features 177 to the running board support mounting point 131. In a non-limiting example, the upper ends of the rearward legs 142 are positioned lower than the upper ends of the forward legs 140 (see e.g., FIG. 31). In one example, the upper ends of the rearward legs 142 are rearward of the upper ends of the forward legs 140. In another example, the lower ends of the rearward legs 142 are positioned lower than the lower ends of the forward legs 140 (see e.g., FIG. 13).

Figure 14:
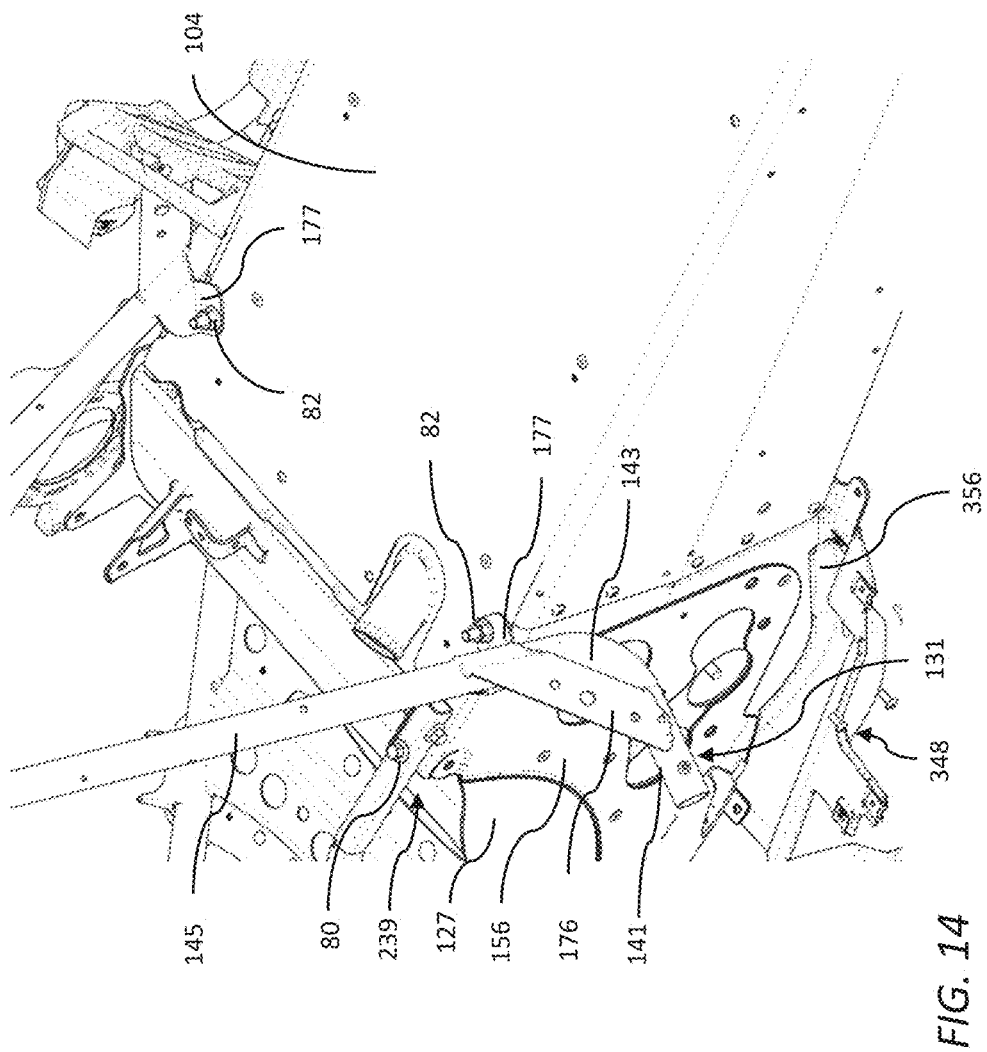
FIG. 14 illustrates a perspective view of a front frame coupled to the tunnel, according to some embodiments.

In some embodiments, the rearward leg 142 has a curved section 143 between a vertical section 145 and a horizontal section 141 that extends outboard from the tunnel mounting features 177 and the side of the snowmobile to the running board support mounting point 131 (see e.g., FIGS. 13-14). As used herein, outboard may refer to a location or direction further from the longitudinal centerline 10 of the snowmobile, and inboard may refer to a location or direction closer to the longitudinal centerline 10 of the snowmobile. The vertical section 145 extends from the upper end to the curved section 143. The horizontal section 141 extends outward from the curved section 143 to the lower end of the rearward leg 142. In a non-limiting example, the horizontal section 141 is positioned below an upper surface of the tunnel 104 (see e.g., FIG. 14). In some embodiments, the forward and rearward legs 140, 142 are unitary—i.e., one piece construction (not shown). In some embodiments, the upper end of the rearward leg 142 is positioned forward of lower end of the rearward leg 142—in other words, the upper end is a forward end and the lower end is a rearward end.

The upper frame member 138 is positioned below the steering column mount component 136 and above the crosstube 144 (see e.g., FIG. 9). The upper frame member 138 may extend between and be coupled to the forward legs 140. In some embodiments, the upper frame member 138 increases the rigidity of the front frame 125. In other embodiments, the upper frame member 138 accommodates torsional strain experienced at the upper portion of the front frame 125, e.g., due to rotation of the steering column 112. The upper frame member 138 may also provide support for one or more components including, but not limited to, one or more of a storage compartment, an upper body panel, and an engine air intake duct.

The horizontal member 166 may extend between the forward leg 140 and the rearward leg 142 (see e.g., FIG. 9). A forward end 165 of the horizontal member 166 may be coupled to joint 158*a*1 (see also FIG. 13). In an illustrative example, the forward end 165 is welded, adhesively bonded, and/or riveted to the joint 158*a*1. In one example, the horizontal member 166 has one or more bends 6 so that the forward end 165 of the horizontal tube 166 extends downward toward the joint 158*a*1 (see also FIG. 17). A rearward end 167 of the horizontal member 166 may be coupled to a rearward leg 142 with a weld, adhesive, and/or a fastener such as a rivet. As one illustrative example, the first metal plate component 154 may include a flange 350 configured to receive the horizontal member 166 thereon. Optionally, the rearward end 167 of the horizontal member 166 may be secured to the first metal plate component 154 with a weld, adhesive, and/or fastener. Opposite the horizontal member 166, the front frame 125 has an open side 32 at least partially defined by the upright support 150*b*, the forward leg 140*b*, the rearward leg 142*b*, the tube member 157*b*, and the second metal plate component 156. An engine may be inserted into the interior of the front frame 125 through the open side 32, and then the horizontal member 240 may then be secured to the front frame 125 with removable fasteners to close the side 32. In an illustrative example, the engine is a 2-stroke engine. In an illustrative example, one or more other components of the front frame 125 may be made removable to allow for insertion of a larger engine, such as a 4-stroke engine, into the front frame 125. In a non-limiting example, the horizontal member 240, the forward leg 140*b*, and optionally the upper frame member 138 are removably securable to the front frame 125 to accommodate the insertion of the larger 4-stroke engine therein. In an illustrative example, the front frame 125 of the 4-stroke engine and the front frame 125 of the 2-stroke engine share the same lower front member 148, the pivot mount joint 158*d*, the upright supports 150, the plate 154, the plate 156, optionally the cross-tube 144, optionally the rearward legs 142a,b, optionally the steering column mount component 136, optionally the joints 158a, and optionally position the suspension mounts 158b, 158e, 158f and the suspension mounts on the joints 158a and 158d at the same position on both front frames 125 for the 2-stroke and the 4-stroke engines. Accordingly, the use of such common components allows for the distance from the front of the lower front member 148 to one or more of the first steering column mounting point, the second steering column mounting point, the running board support mount 131, and the track drive shaft axis of rotation may be the same for a 2-stroke engine snowmobile model and a 4-stroke snowmobile model.

Optionally, a jack shaft 326 (see e.g., FIGS. 34 and 41), such as the jack shaft described in commonly owned, U.S. patent application Ser. No. 17/588,487, filed on Jan. 31, 2022, and entitled "Adjustable Belt Drive Assembly, System, and Method", the contents of which are incorporated by reference in its entirety herein, extends across the front frame 125 and is positioned beneath the horizontal member 166 of the second side 32.

Figure 11:
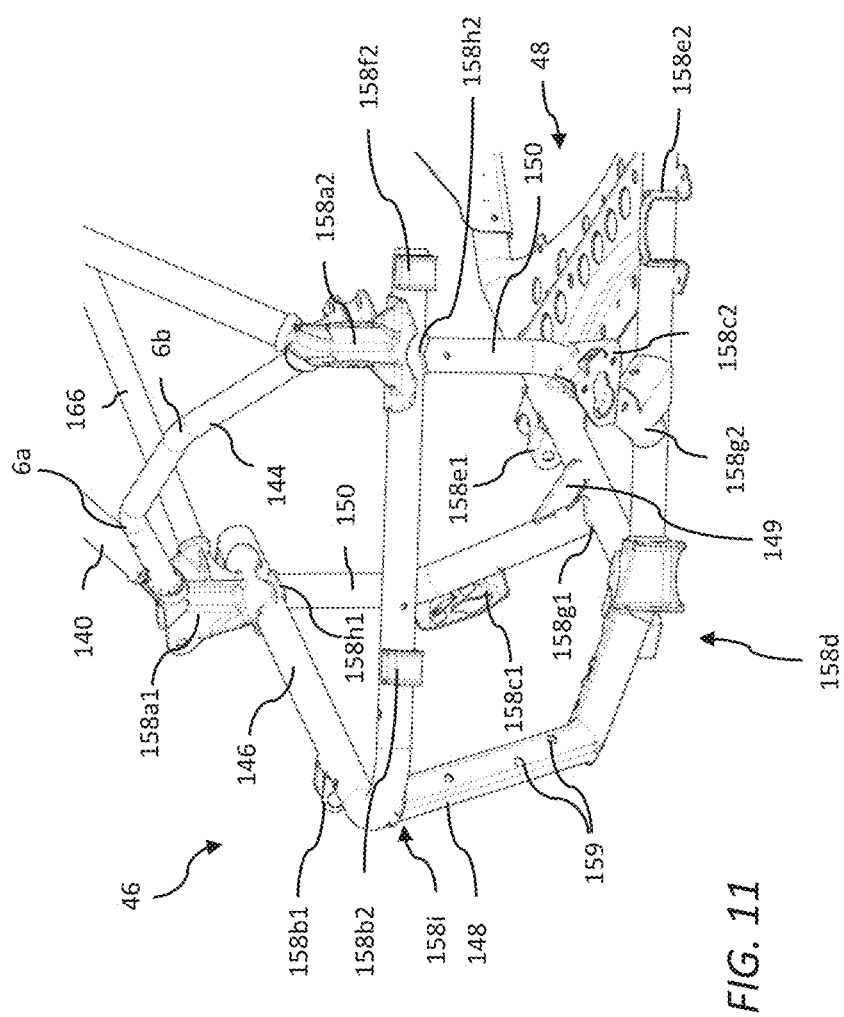
FIG. 11 illustrates a perspective view of the joints of a front frame, according to some embodiments.
Figure 26B:
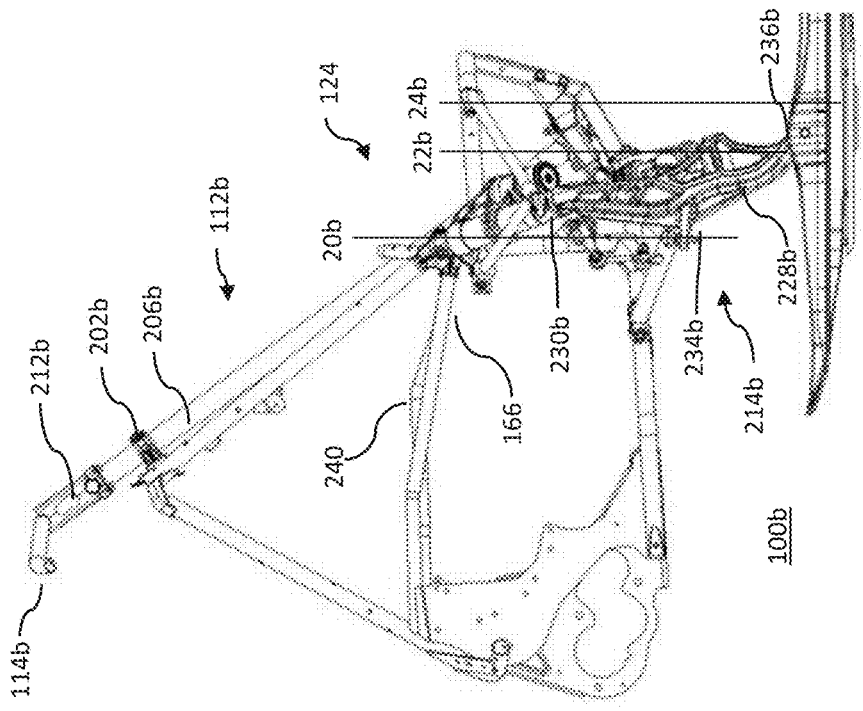
FIG. 26B illustrates a side view of the snowmobile model shown in FIG. 25B, according to some embodiments.

The cross-tube 144 may be coupled to joint 158a1 and joint 158a2 (see e.g., FIG. 11). The cross-tube 144 may be oriented in a plane perpendicular to the centerline 10 or in a plane at an angle to the centerline 10. In some embodiments, the cross-tube 144 includes at least one bend 6 to, for example, accommodate the steering columns 112a, 112b extending along the centerline 10 from the steering column mount component 136 to the pivot mount joint 158d. For example, the cross-tube 144 may include a first linear section, a first bend 6a, a horizontal section, a second bend 6b, and a second linear section, wherein the first and second linear sections extend in an outboard direction downward from the horizontal section. Accordingly, the cross-tube 144 may elevate the horizontal section with respect to the joints 158a1, 158a2 to provide clearance for a steering columns 112a,112b to extend thereunder even when, for example, the steering column 112b is secured to a forward facing side of the steering column mount component 136 as shown in FIG. 26B. As another example, the cross-tube 144 may have a single bend 6 between two sections that may be linear or curved (not shown).

The upper front member 146 may have a first end positioned rearward of the joint 158a1 and a second end positioned rearward of the joint 158a2. The upper front member 146 may be coupled, such as by welding, to the lower front member 148 and the upright supports 150. The upper front member 146 may be coupled to joint 158a1 and joint 158a2 (see e.g., FIG. 11), such as by welding. The upper front member 146 may extend forward from the joints 158a1, 158a2. In some embodiments, the upper front member 146 is oriented parallel to the ground. The upper front member 146 may have a V-shape. In one embodiment, the apex of the upper front member 146 is a forward-most point of the front frame 125, with the apex defined by the pivot mount joint 158d and the tube members 157a, 157b positioned rearward thereof. In some embodiments, the upper front member 146 is coupled to a first joint 158a, a suspension mount 158b, and a suspension mount 158f.

The upright support 150 may be coupled to the upper front member 146 and to the lower member 152 (see e.g., FIG. 9), such as by welding. The upright support 150 may extend between welds 158g and 158h. Optionally, the upright support 150 may include a bend 6 (see e.g., FIG. 12). Optionally, a brace/support member 149 is coupled to the upright support 150 and the lower member 152 (see e.g., FIG. 11), such as by welding.

The lower front member 148 may be coupled to the upper front member 146 and to the lower member 152, such as by welding. In an illustrative example, the lower front member 148 is coupled to the apex of the upper front member 146 and to the pivot mount joint 158d. The lower front member 148 includes an upper end 147a coupled to the upper front member 146 and a lower end 147b (see e.g., FIG. 9). Optionally, the upper end 147a may be positioned further forward than the lower end 147b. The lower front member 148 may extend downward from the upper front member 146 to the lower member 152. In some embodiments, the lower front member 148 extends forward and upward from the pivot mount joint 158d (see e.g., FIGS. 11, 13, 17, and 60A-B). The pivot mount joint 158d may extend downward and rearward from the member 148. In an illustrative example, the member 148 may be a steel tube and the pivot mount joint 158d may be a casting. For example, the member 148 may comprise a tube or bracket, and the joint 158d may comprise a casting. In a non-limiting example, the pivot mount joint 158d and the member 148 may be combined and integrally formed, such as a single casting. As discussed below in greater detail, the pivot mount joint 158d integrally defines lower forward A-arm mounts 272 for each lower A-arm, and the lower mounting point 275, 285 for the steering columns 112a, 112b. In other embodiments, the lower front member 148 is curved (not shown). The lower front member 148 may include at least one hole 159 configured to receive a fastener.

The lower member 152 includes a first rearward end 153a and a second rearward end 153b (see e.g., FIG. 9 and FIG. 13). Optionally, the lower member 152 has a longitudinal extent less than the longitudinal extent of the front frame 125 (see e.g., FIGS. 9-10 and 20). The lower member 152 may have a V-shape formed by a first tube member/arm 157a, the second tube member/arm 157b, and optionally the pivot mount joint 158d. In some embodiments, the arms 157a, 157b of the V include a rearward section 151 positioned along the centerline 10 and a forward section 155 angled towards the centerline 10 (see e.g., FIGS. 10 and 20). In one illustrative example, the apex of a V-shaped lower member 152 is formed by welding the ends of the forward sections 155a, 155b of the first tube member 157a and the second tube member 157b to a rearward side of the pivot mount joint 158d, that may comprise a casting. In some embodiments, the lower member 152 includes two arms 157a, 157b connected together. In one illustrative example, the two arms 157a, 157b are unitary.

The lower member 152 may be coupled to the lower front member 148 and to the upright supports 150, such as by welding. The lower member 152 may be further coupled to the metal plate components 154, 156. The lower member 152 may be coupled to the metal plate components 154, 156 by at least one fastener, an adhesive, and/or by a weld. The lower member 152 is coupled to the pivot mount joint 158d (see e.g., FIG. 11). In some embodiments, the lower member 152 is coupled to the upper front member 146 via the pivot mount joint 158d and the upright supports 150.

The bottom plate 168 extends between and is coupled to the first tube member 157a and the second tube member 157b of the lower member 152 (see e.g., FIG. 9). The bottom plate 168 may be positioned rearward of the upright supports 150 and forward of the metal plates 154, 156. The bottom plate 168 includes a plurality of openings 170. In some embodiments, at least some of the openings 170 are configured to receive a fastener. In one illustrative example, the bottom plate 168 has a raised middle portion (see e.g., FIG. 11). In some embodiments, an engine is coupled to the bottom plate 168. The bottom plate 168 may be welded to the first tube member 157*a* and the second tube member 157*b*, or secured thereto with a mechanical fastener, including removable fasteners.

Optionally, at least one belly pan is coupled to the lower member 152, the bottom plate 168, and/or the heat exchanger assembly 126 by at least one fastener 190 (see e.g., FIGS. 17 and 20). For example, a rear belly pan 188 may be coupled to at least one of the plurality of openings 170 of the bottom plate 168 and extend rearward from a rear end of the bottom plate 168. As another example, an additional belly pan, a front belly pan 200, may be coupled to at least one of the plurality of openings 170 of the bottom plate 168 and extend forward from a front end of the bottom plate. An embodiment with two belly pans 188, 200 is more clearly shown in FIG. 20. The fastener 190 may be a rivet.

Figure 56:
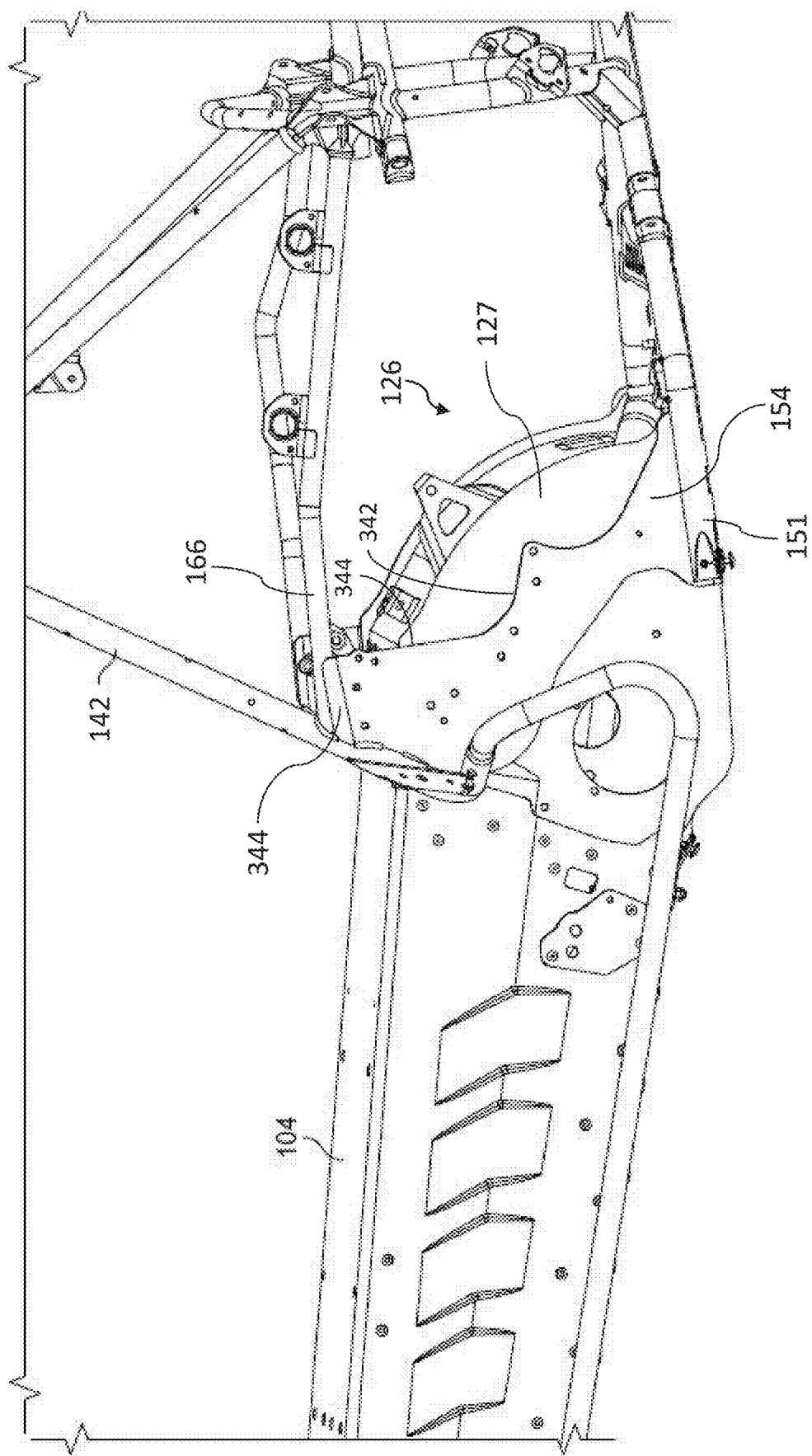
FIG. 56 illustrates an isometric side view of a heat exchanger assembly secured to a forward frame, according to some embodiments.
Figure 57:
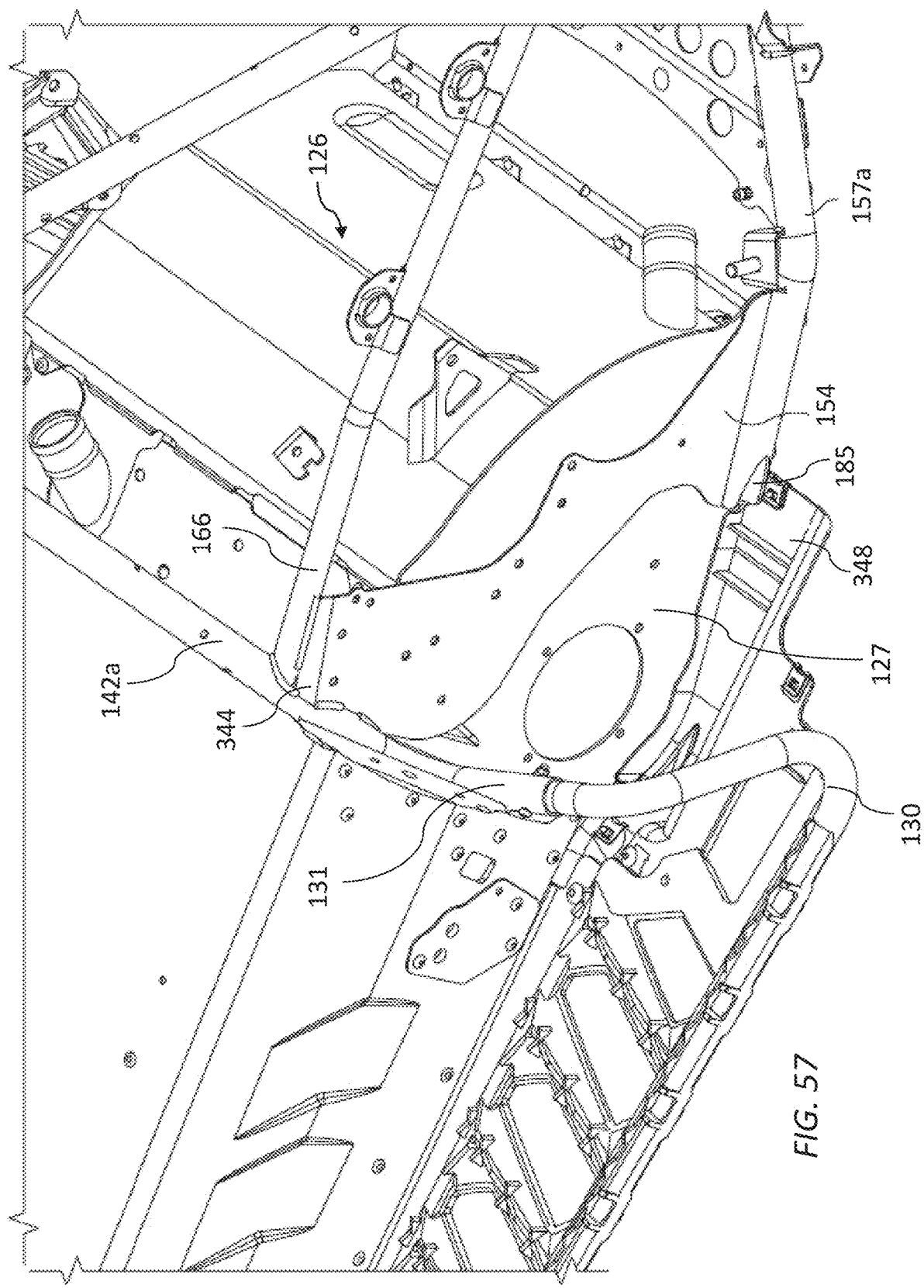
FIG. 57 illustrates an isometric view of a heat exchanger assembly and running board assembly secured to a forward frame associated with the snowmobile of FIG. 6B, according to some embodiments.

The first metal plate component 154 includes two vertical edges 342, 346 extending between the two linear horizontal edges or flanges 340, 344 (see e.g., FIGS. 10 and 56-57). Although described herein as a metal plate, the first metal plate component 154 is not limited to a specific shape or material, as the first metal plate component 154 may comprise any shape or material that is positionable adjacent the heat exchanger end cap 127 to be secured thereto. In a non-limiting example, the vertical edges 342, 346 are curvilinear. In some embodiments, the bottom horizontal edge 340 extends inboard or outboard therefrom to define a shelf 191 that receives the rearward section 151*a* of the tube member 157*a* thereon, so that the tube member 157*a* may be coupled to the bottom horizontal edge 304 with a weld and/or fasteners (see e.g., FIG. 57). The shelf 191 may include a projecting tab 185 configured to receive a fastener to secure the rearward section 151*a* of the tube member 157*a* and/or a running board assembly component (e.g., a bottom-out protector). The first metal plate component 154 may also be coupled to the horizontal member 166 and/or the rearward leg 142*a* with a weld and/or fasteners (see e.g., FIGS. 56-57). In a nonlimiting example, an upper horizontal edge 344 extends inboard or outboard therefrom to support a rearward end of the horizontal member 166 positioned thereon. The first metal plate component 154 is also coupled, such as by a weld, to the rearward leg 142*a*. Accordingly, the first metal plate component 154 may overlap with and be secured to the heat exchanger end cap 127 on the side of the snowmobile assembly (see e.g., FIG. 18). The first metal plate component 154 may be secured to the heat exchanger end cap 127 with removable fasteners to allow the front frame 125 to be removed from the heat exchanger assembly 126. In some embodiments, the heat exchanger end cap 127 may include a bottom tab 129 configured to secure to the bracket 196 (see e.g., FIG. 57). In some embodiments, the bottom tab 129 may secure to a running board assembly 134, namely, a running board 122, a toe stop 128, and/or a bottom out protector 348 (see e.g., FIG. 54). The heat exchanger end cap 127 may be secured to the tunnel 104 via a plurality of fasteners (e.g., rivets) disposed on the side panel of the tunnel 104 in an area 105 (see FIG. 51).

The second metal plate component 156 includes two vertical edges 306, 310 extending between the two linear horizontal edges or flanges 304, 308 (see e.g., FIGS. 10 and 56-57). The second metal plate component 156 may further include a shelf or flange 350 configured to receive the horizontal member 240. In a non-limiting example, the vertical edges 306, 310 are curvilinear. In some embodiments, the bottom horizontal edge 304 of the second metal plate component 156 extends inboard or outboard therefrom to define a shelf that receives the rearward section 151*b* of the tube member 157*b* thereon, so that the tube member 157*b* may be coupled to the bottom horizontal edge 304 with a weld or fasteners. The second metal plate component 156 is also coupled, such as by a weld, to the rearward leg 142*b*. The second metal plate component 156 may include an aperture/opening 162. The second metal plate component 156 may further include an embossed region 164. Optionally, the second side 32 comprises a metal plate 156 defining an aperture 162/300 for receiving a portion of the brake caliper therethrough when the metal plate 156 is positioned to overlap a heat exchanger end cap 127 of the heat exchanger assembly 126 or a side of the tunnel 104. In addition to, or alternatively, the second side 32 comprises a metal plate 156 defining an aperture 162/302 for receiving the track drive shaft 195 therethrough when the metal plate 156 is positioned to overlap a heat exchanger end cap 127 of the heat exchanger assembly 126 or a side of the tunnel 104. Optionally, as shown in FIGS. 10, 35B, and 36B, the metal plate 156 of the second side 32 defines a first aperture 162/300 therein for receiving the caliper in a first position (FIG. 35B) or a second position (FIG. 36B) that is different than the first position. Optionally, as shown in FIG. 10, the metal plate 156 of the second side 32 defines a second aperture 162/302 therein for receiving the track drive shaft 195 in a first position (FIG. 35B) or a second position (FIG. 36B) that is different than the first position. Accordingly, the common front frame 125 can be used on different snowmobile models having different track drive shaft locations by changing between a first heat exchanger end cap 127 with a first set of openings, and a second heat exchanger end cap 127 with a second set of openings that are configured differently than the first set of openings.

The metal plate components 154, 156 may be metal sheets or metal plates, but are not limited to such shapes or materials, as the metal plate components 154, 156 may comprise any shape or material that is positionable adjacent the heat exchanger end cap 127 to be secured thereto. In a non-limiting example, the metal plate components 154, 156 may comprise a metal casting or a polymeric composite material. The metal plate components 154, 156 may include at least one opening 160 configured to receive a fastening device for securing components thereto (see e.g., FIG. 10). In some embodiments, the fastening device is a rivet, but may also be a removable fastener to allow the front frame 125 to be removed from the heat exchanger assembly 126. Accordingly, the second metal plate component 156 may overlap and be secured to the heat exchanger end cap 127 on the side of the snowmobile assembly (see e.g., FIG. 14). In some embodiments, at least some of the openings 160 may be used to attach a belt case/belt housing assembly and/or track drive shaft 195 and associated components in different positions/angles on or along the metal plate components 154, 156.

Optionally, the metal plate 154 of the first side 30 defines a first aperture 198*b* therein for securing the belt housing assembly in a first position or a second position that is different than the first position, as shown in FIGS. 35A, 35B and 36A, 36B.

As described above, the horizontal member 240 is removably securable to the front frame 125 to allow for the insertion of the engine (with or without a transmission secured thereto) into the pre-assembled front frame 125. Accordingly, the front frame 125 can be assembled in advance, rather than building the front frame 125 around the engine. The horizontal member 240 has a forward end 241*a* and a rearward end 241*b*. (see e.g., FIG. 19). Optionally, the horizontal member 240 includes at least one bend 6. The rearward end 241b may be positioned forward of the rearward leg 142. As noted above, the horizontal member 240 is releasably coupled to the front frame 125 to form a forward frame assembly 124. The horizontal member 240 may be releasably coupled to joint 158a2 of the front frame 125. In an illustrative example, the joint 158a2 is provided with a pair of projections that define a channel for receiving the forward end 241a therein, and a removable fastener may be inserted through the projections and the forward end 241. The rearward end 241b of the horizontal member 240 may also be releasably coupled to a rearward joint 239 configured to receive the horizontal member 240 (see e.g., FIG. 14). In some embodiments, the rearward joint 239 includes the flange 350 that provides a flat surface that supports the horizontal member 240 thereon. For example, the metal plate component 156 may include the flange 350 that serves as the rearward joint to releasably couple the horizontal member 240 to the front frame 125 (see e.g., FIG. 10). The flange 350 may couple the second metal plate component 156 to the horizontal member 240, the rearward leg 142, and/or the tunnel 104. At least one fastener 80 may be used to removably couple the horizontal member 240 to the front frame 125 and/or tunnel 104 (see e.g., FIG. 19). In an illustrative example, the horizontal member 240 is secured to the metal plate component 156 with one or both of a vertically extending removable fastener 80 and a horizontally extending removable fastener 80. In some embodiments, a removable horizontal member 240 may allow for easier assembly and removal of the engine to and from the front frame 125.

Figure 12:
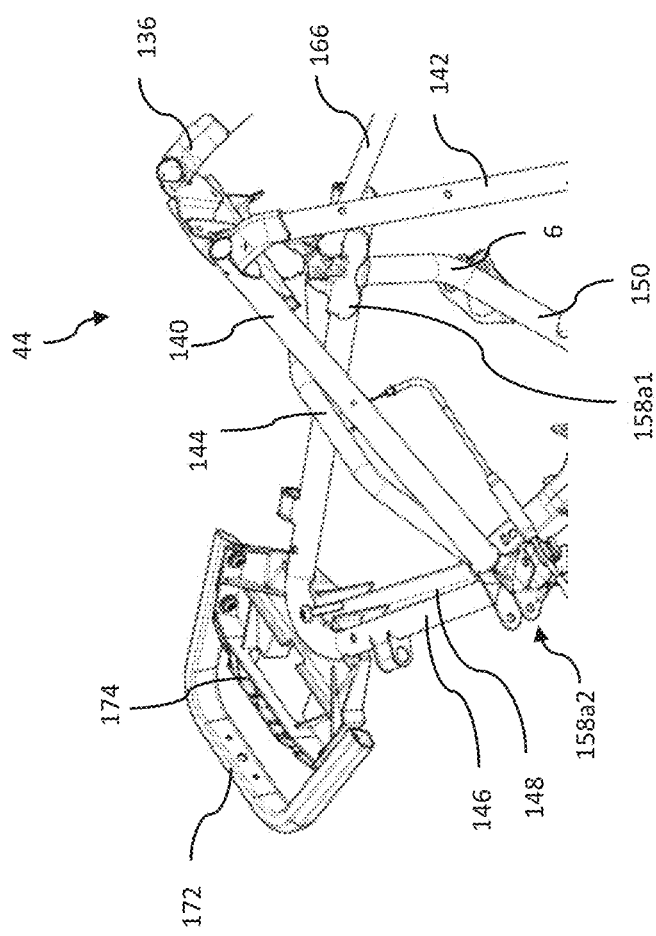
FIG. 12 illustrates a perspective view of a front bumper assembly, according to some embodiments.

Optionally, a bumper assembly is coupled to the front frame 125 (see e.g., FIG. 12). The bumper assembly includes a front bumper 172. In some embodiments, the bumper assembly further includes a bumper mount 174 that may comprise a composite material including a polymer matrix reinforced with fibers. In some embodiments, the front bumper 172 and/or the bumper mount 174 is molded. In further embodiments, the front bumper 172 comprises a metal or metal alloy and the bumper mount 174 is a composite material or a plastic material. In a non-limiting example, the bumper assembly is that described in commonly owned U.S. patent application Ser. No. 17/983,968, filed on Nov. 9, 2022, and entitled "Bumper Mount for Snowmobile", the contents of which are incorporated herein by reference in their entirety.

The front bumper 172 may be coupled to the bumper mount 174 by at least one fastener. In some embodiments, the bumper mount 174 is coupled to an interior side of the front bumper 172. The front bumper 172 and/or the bumper mount 174 may include at least one opening to receive a fastener. The bumper assembly may be coupled to the front frame 125 by the front bumper 172 and/or by the bumper mount 174. For example, the bumper mount 174 of the bumper assembly may be shaped to receive the apex of the upper front member 146 and may be coupled to the upper front member 146. The bumper mount 174 may also define a vertical channel below the apex of the upper front member 146 for receiving an upper portion of the lower front member 148 and may be fastened thereto.

A steering column mount component 136 may be provided that also functions as a structural component of the front frame 125. In some embodiments, the steering column mount component 136 includes an arch-like/first concave portion 178, a forward facing channel/second concave portion 180, a front side/face 181, a rear side/face 183, a body 184, and at least one hole 186, 187 (see e.g., FIGS. 15A-C, 16A-B). In at least one embodiment, the steering column mount component 136 is formed of a cast metal, such as steel, although other metallic or composite materials may be employed. In a non-limiting example, the steering column mount component 136 is a steel casting that integrally defines the features shown in FIGS. 15A-C—in other words the steering column mount component 136 is an as cast component.

The steering column mount component 136 may be coupled to the rearward legs 142 and the forward legs 140 (see e.g., FIGS. 9, 12, 13, and 16A-B). In some embodiments, the steering column mount component 136 is welded to the forward and rearward legs 140, 142. In some embodiments, arch-like/concave portions 178 are positioned rearward of concave portions 180. In other embodiments, the arch-like members 178a and 178b extend rearward of the forward facing channels 180a and 180b. The arch-like/concave portions 178, 180 may be configured to mate with the forward and rearward legs 140, 142. In some embodiments, the arch-like members 178a and 178b extend outboard from the longitudinal centerline of the vehicle and may include an end 175 defining a channel 179 for receiving the rearward legs 142, and a curved portion 173 extending from the end 175 toward the forward facing channels 180 (see e.g., FIGS. 15B and 16B). In other embodiments, the forward facing channels 180a and 180b are configured to receive the upper portions of the forward legs 140 and provide surfaces for welding the forward legs 140 thereto, and the arch-like members 178a and 178b are configured to receive the upper ends of the rearward legs 142 thereunder for welding thereto. For example, the forward facing channels 180 extend over a lower rear surface of the end of the forward legs 140 and the arch like members 178 extend over an upper rear surface of the end of the rearward legs 142 (see e.g., FIGS. 16A-B and 31). In a non-limiting example, the upper ends of the forward legs 140 are positioned higher than the upper ends of the rearward legs 142.

Figure 26A:
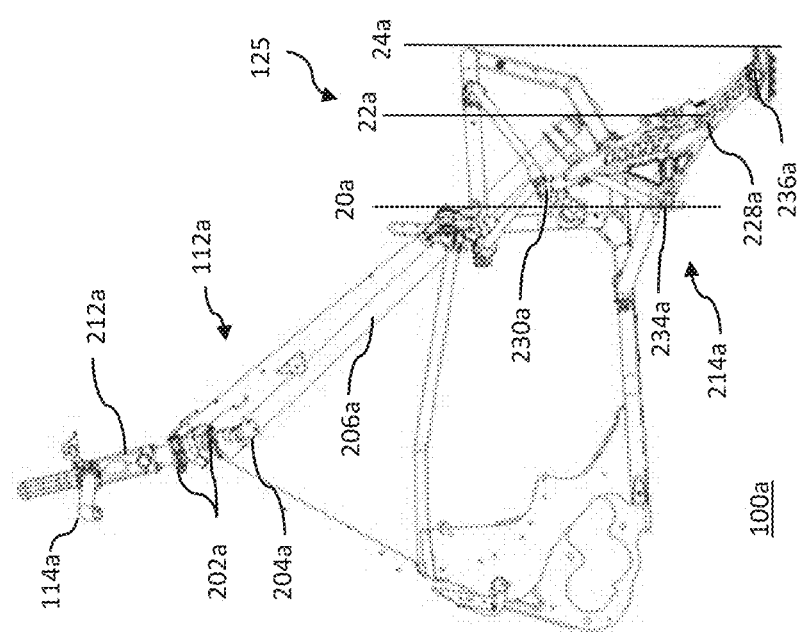
FIG. 26A illustrates a side view of the snowmobile model shown in FIG. 25A, according to some embodiments.

The rearward facing surface 183 may include at least one hole 186 configured to receive a fastener for securing a steering column (see e.g., FIG. 16A) along the rearward facing surface 183. For example, as shown in FIGS. 26A and 27A, the rearward facing surface 183 defines a first steering column mounting point for connecting a steering column 112a that is positioned rearward of the body 184. The rearward facing surface 183 defines a channel or concave portion 182 that is shaped to receive the upper portion of the steering column 112a. The at least one hole 186 may include a pair of upper apertures 186a and a pair of lower apertures 186b. The at least one hole 186 may include a pair of holes along each side of the channel 182.

The forward facing surface 181 may include at least one hole 187 configured to receive a fastener for securing a steering column 112 (see e.g., FIG. 16B) along the forward facing surface 181. For example, as shown in FIGS. 26B and 27B, the forward facing surface 181 of the body 184 defines a second steering column mounting point for connecting a steering column 112b that is positioned forward of the body 184. In an illustrative example, the forward mount includes holes 187 and the rearward mount includes holes 186 (see e.g., FIGS. 16A-B). In one embodiment, the holes 187 of the forward mount are vertically positioned between a pair of upper holes 186a and a pair of lower holes 186b of the rearward mount.

In at least one embodiment, the steering column mount component 136 is a common mount to which different models of steering columns 112 may be attached. For example, the steering column mount component 136 includes a first steering column mount and a second steering column mount. In a non-limiting example, the first steering column mount is positioned rearward to the second steering column mount (see e.g., FIG. 31). A steering column mount may include at least one hole 186, 187, and/or a channel/concave portion.

Optionally, the steering column mount component 136 extends between the first side 30 and the second side 32. The first side 30 and the second side 32 each includes a rearward leg 142 extending upward and forward from the rear of the front frame 125/forward frame assembly 124 to the steering column mount component 136.

Figure 31:
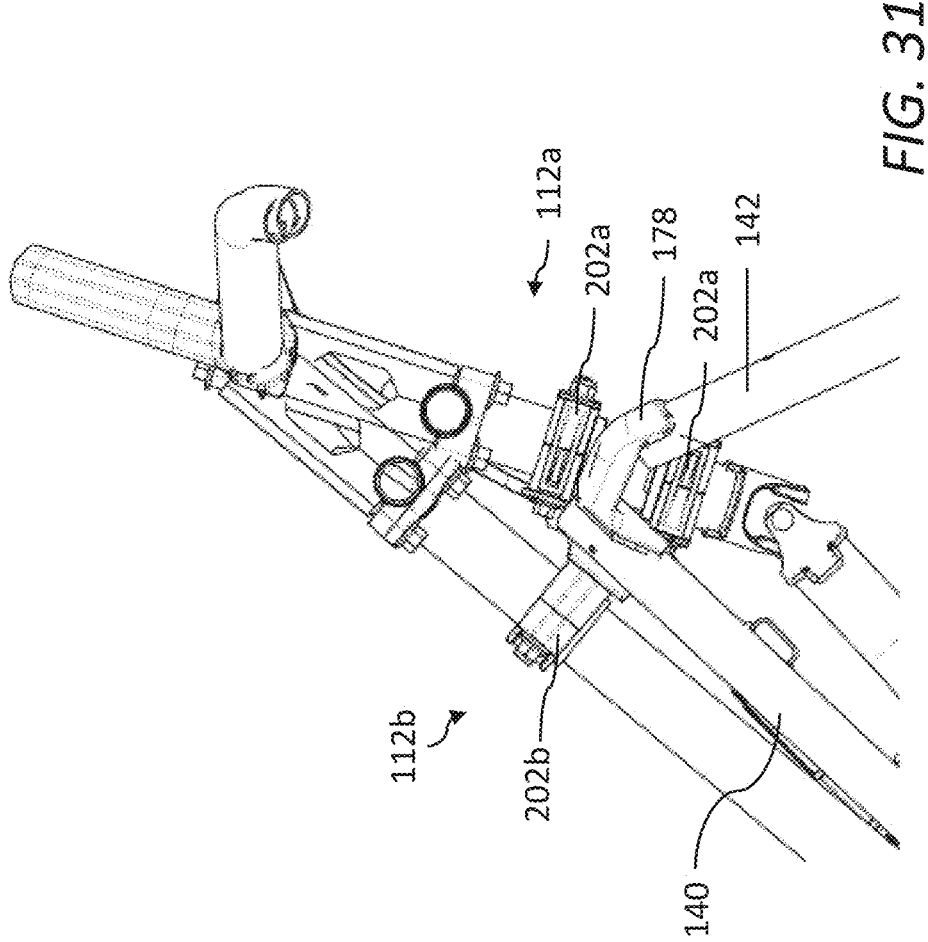
FIG. 31 illustrates an enlarged view of the first steering column mounted to a first steering column mounting point and the second steering column mounted to a second steering column mounting point, according to some embodiments.
Figure 32:
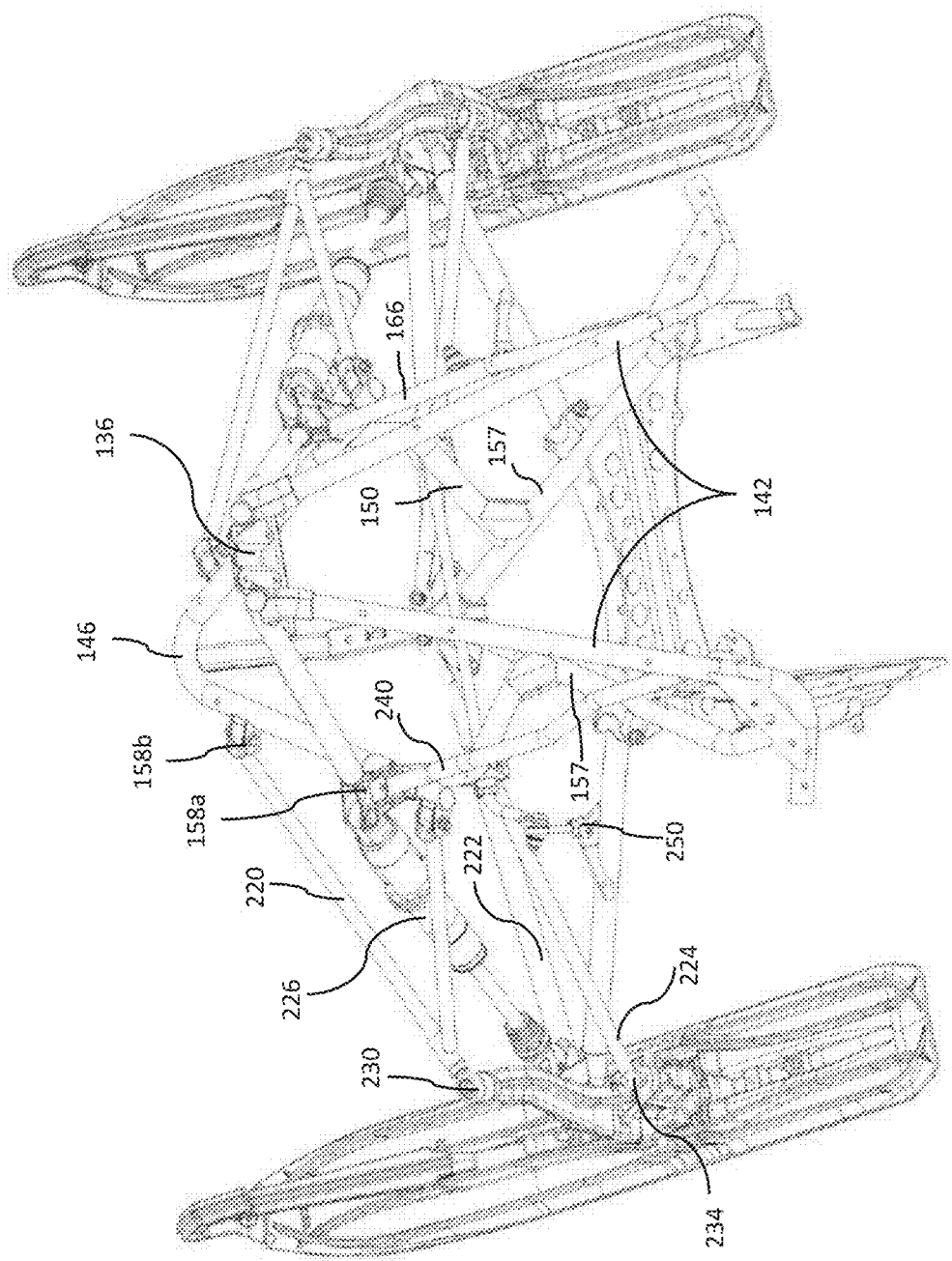
FIG. 32 illustrates a top isometric view of the second suspension assembly coupled to the forward frame assembly, according to some embodiments.
Figure 33:
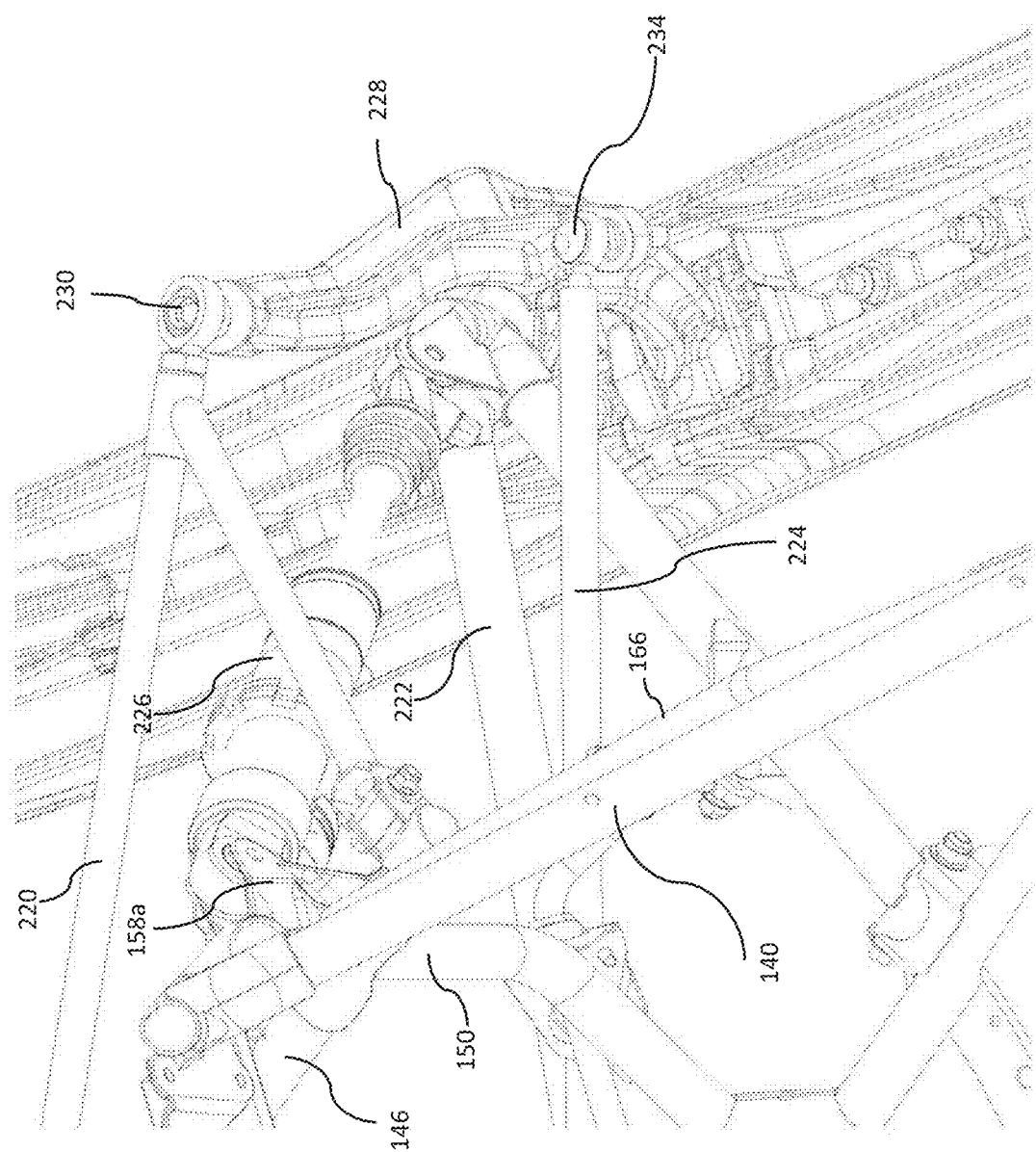
FIG. 33 illustrates an enlarged isometric view of a spindle of the second suspension assembly connected to an A-arm and steering tie rod, according to some embodiments.

Optionally, the steering column mount component 136 includes a first/forward side 181 including a first steering mount and a second side 183 that includes a second steering mount, wherein the second side 183 is positioned rearward of the first side 181 along the longitudinal centerline 10. For example, as illustrated in FIG. 31, steering column 112b is coupled to the first/forward steering mount and steering column 112a is coupled to the second/rearward steering mount.

Optionally, the first steering mount is positioned forward along the longitudinal centerline of the front frame 124/forward frame assembly of one or both of the heat exchanger assembly 126 and the tunnel 104.

In some embodiments, a steering mount component 136 includes: a pair of forward facing channels 180 for receiving a pair of forward frame members 140; a pair of arches 178 extending rearward from the forward facing channels 180 for receiving a pair of rearward frame members 142 thereunder (see e.g., FIGS. 15A-C, 16A-B, and 31). Optionally, the steering mount component 136 is positionable along a longitudinal centerline 10 of a snowmobile, and the pair of arches 178 extend rearward from the pair of channels 180 in a direction outboard of the longitudinal centerline 10 (see also FIGS. 25A-B). Optionally, the pair of arches 178 each include an end defining a channel 179 for receiving the rearward frame members 142, and a span extending from the end to the forward channel 180. Optionally, the steering mount 136 defines a first steering column mounting point (on front face 181) that is positioned forward of the forward facing channels 180. Optionally, the steering mount 136 defines a channel 182 for receiving a steering column 112.

In at least one aspect of the present disclosure, a forward frame assembly 124 includes a rear; a first side 30 extending between the front and the rear, the first side 30 includes a first leg 140 including an end extending upward and rearward and a second leg 142 including an end extending upward and forward; a second side 32 extending between the front and the rear, the second side 32 includes a first leg 140 including an end extending upward and rearward and a second leg 142 including an end extending upward and forward; and a steering mount component 136 positioned between the first side 30 and the second side 32, wherein the steering mount component 136 connects the end of the first leg 140 of the first side 30 to the end of the second leg 142 of the first side 30, and connects the end of the first leg 140 of the second side 32 to the end of the second leg 142 of the second side 32. Optionally, the end of the first leg 140 of the first side 30 is positioned higher than the end Of the second leg 142 of the first side 30 when secured to the steering mount component 136. Optionally, the steering mount component 136 defines an arch 178 extending over one or both of the ends of the second legs 142 of the first side 30 and the second side 32. Optionally, the steering mount component 136 is a casting that integrally defines a channel 180 for receiving a first steering column 112 therethrough when mounted thereto. Optionally, the steering mount component 136 comprises a steering column mounting point (on front face 181) positioned forward of the end of the first leg 140 of the first side 30 and the end of the first leg 140 of the second side 32.

The steering column 112 includes a handle 114, and a steering post 206 (see e.g., FIGS. 28A-B and 29A-B). The handle 114 may have different configurations. For example, handle 114a may have a different configuration than handle 114b (see e.g., FIGS. 28B and 29B). In some embodiments, the handle 114 has a generally horizontal orientation. The steering column 112 may optionally include a riser block 212. In some embodiments, the riser block 212 couples the handle 114 and the steering post 206. The riser block 212 may have different configurations. For example, riser block 112a has a different configuration than riser block 112b (see e.g., FIGS. 28A-B and 29A-B).

The steering column 112 may further include at least one mounting block 202 for coupling the steering column 112 to the steering column mount 136. The mounting block 202 may be positioned below the riser block 212. In one example, the steering column 112a has a single mounting block 202 (see e.g., FIGS. 29A-B) that is secured to the forward facing surface 181 of the steering column mount component 136. In another example, the steering column 112b has two mounting blocks 202 (see e.g., FIGS. 28A-B) that are secured to the rearward facing surface 183 of the steering column mount component 136. In a further embodiment, the mounting block 202a, 202b surrounds the steering post 206a, 206b. In some embodiments, the mounting block 202 and the riser block 212 are unitary.

In some embodiments, a fastener couples a mounting block 202 to the steering column mount component 136. For example, the mounting block 202 includes at least one hole for a bolt that extends through a hole 186, 187 of the steering column mount component 136. The steering column 112a illustrated in FIG. 28A is configured so that the upper mounting block 202a aligns with an upper set of holes 186a in the steering column mount component 136 and the lower mounting block 202 aligns with a lower set of holes 186b in the steering column mount component 136. Optionally, when the steering column 112a is coupled to the steering column mount 136, the upper and lower mounting blocks 202a may be positioned vertically above and below the arch-like members 178 of the steering column mount 136 (see e.g., FIG. 31). Although this embodiment has two separate mounting blocks 202a, a single mounting block with an upper and lower fastening assemblies may be employed. The steering column 112b illustrated in FIG. 29B is configured so that the mounting block 202b aligns with the holes 187 in the steering column mount component 136. When the steering column 112 is coupled to the steering mount, the steering post 206 may be positioned behind or in front of the upper frame member 138.

The steering column 112 may further optionally include a U-joint 204. For example, steering column 112a has a U-joint 204a while steering column 112b does not have a U-joint. In some embodiments, the U-joint 204a provides the steering column 112a with a bend. The U-joint 204 may be positioned below the mounting block 202.

In some embodiments, a steering column 112a includes a handle 114a, two mounting blocks 202a, a U-joint 204a, a steering post 206a, and an attachment mechanism 208a (see e.g., FIGS. 24A, 25A, 26A, 27A, 28A-B, and 31). In other embodiments, a steering column 112b includes one mounting block 202b, a steering post 206b, an attachment mechanism 208b, and a forward attachment mechanism 209b (see e.g., FIGS. 24B, 25B, 26B, 27B, 29A-B, and 3). In a non-limiting example, forward attachment mechanism 209b couples the steering column 112b to at least one hole 159 of the lower front member 148.

Figure 24B:
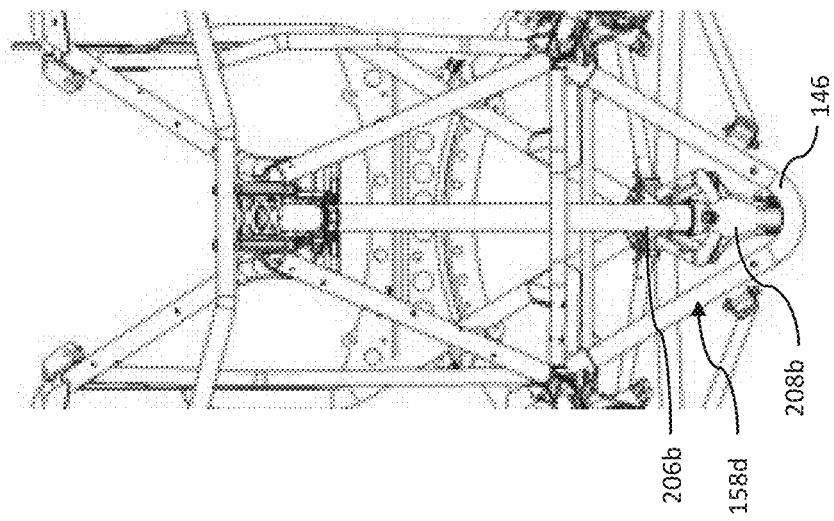
FIG. 24B illustrates a second steering column coupled to a common front frame with the front suspension of FIG. 22B according to some embodiments.
Figure 24A:
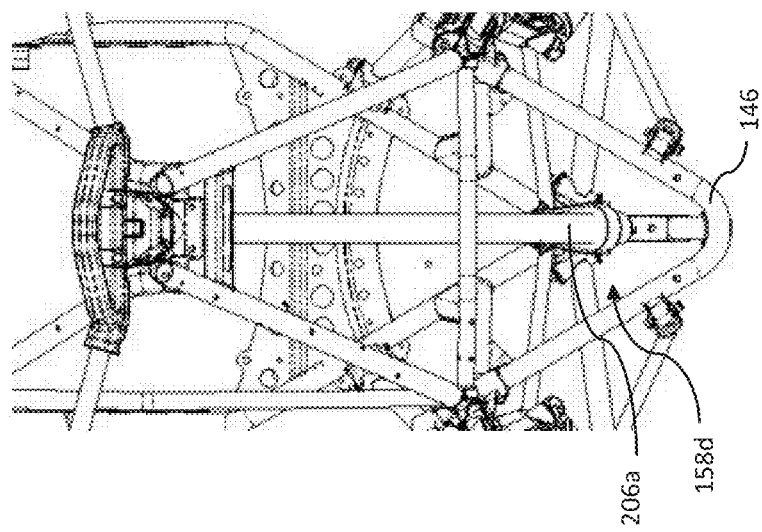
FIG. 24A illustrates a top view of a first steering column coupled to a common front frame with the front suspension of FIG. 22A, according to some embodiments.

The steering column 112 may be coupled to the front frame 125/forward frame assembly 124. In at least one embodiment, the steering column 112 is positioned/oriented along the longitudinal centerline 10, as illustrated in FIGS. 24A-B. A bottom/lower end of the steering post 206 may be coupled to the pivot mount joint 158d (see e.g., FIGS. 24A-B and 60A-B). In some embodiments, the pivot mount joint 158d is a common mount to which different steering column models may be mounted to the front frame 125. In one example, the pivot mount joint 158d is configured to receive a ball joint 210 located at the end of the steering post 206. In at least one embodiment, the pivot mount joint 158d includes a common ball joint receptacle so that different steering post embodiments, such as those shown in FIGS. 28A and 29A, may be coupled to the common front frame 125 using the same mounting point on the pivot mount joint 158d. Therefore, the common forward frame 125 can be used for snowmobiles with different steering column configurations, i.e., the pivot mount joint 158d may secure to ball joint 210a of steering column 112a and/or ball joint 210b of steering column 112b. In some embodiments, the pivot mount joint 158d may include a first steering column mounting point (e.g., to secure the steering column 112a) and a second steering column mounting point (e.g., to secure to the steering column 112b).

The steering column 112 may also be coupled to the front frame 125 by an additional fastening assembly 208. In some embodiments, the additional fastening assembly 208a extends rearward from the steering post 206a (see e.g., FIG. 28A). In other embodiments, the additional fastening assembly 208b extends rearward and forward from the steering post 206b (see e.g., FIG. 29A). As a non-limiting example the forward fastening assembly 209b of the additional fastening assembly 208b may be coupled to at least one of the holes 159 in the lower front member 148 by a fastener (see e.g., FIG. 24B). The pivot mount joint 158d is another example of how a common front frame 125 may be utilized with different component models.

Different models/configurations of the steering column 112 may have different steering attributes. For example, steering columns 112 may have different pivot axes. For example, as illustrated in FIGS. 27A-B, the steering columns 112a, 112b extend upward at different angles from a common column steering mount on joint 158d to different mounting positions on the steering column mount component 136. The pivot axis of a steering column 112 may depend on the intended use for the snowmobile. For example, a snowmobile model constructed for side hilling may steer "flatter" or have vertical steering. In some embodiments, the angle of the upper portion of the steering column 112 affects the steering. For example, the upper portion of the steering column 112, e.g., the portion that includes the riser block 212, may extend downward from the handle 114 at different angles, as shown in FIG. 30A. In some embodiments, an upper portion of the steering column 112 is oriented in a generally vertical orientation, such as shown in FIG. 26A provides vertical steering. In some embodiments, the orientation of the upper portion of the steering column 112 affects the rotation of the handles 114. For example, the generally vertical orientation of the upper portion of the steering column 112a may cause the handles 114a to swing down.

Figure 18:
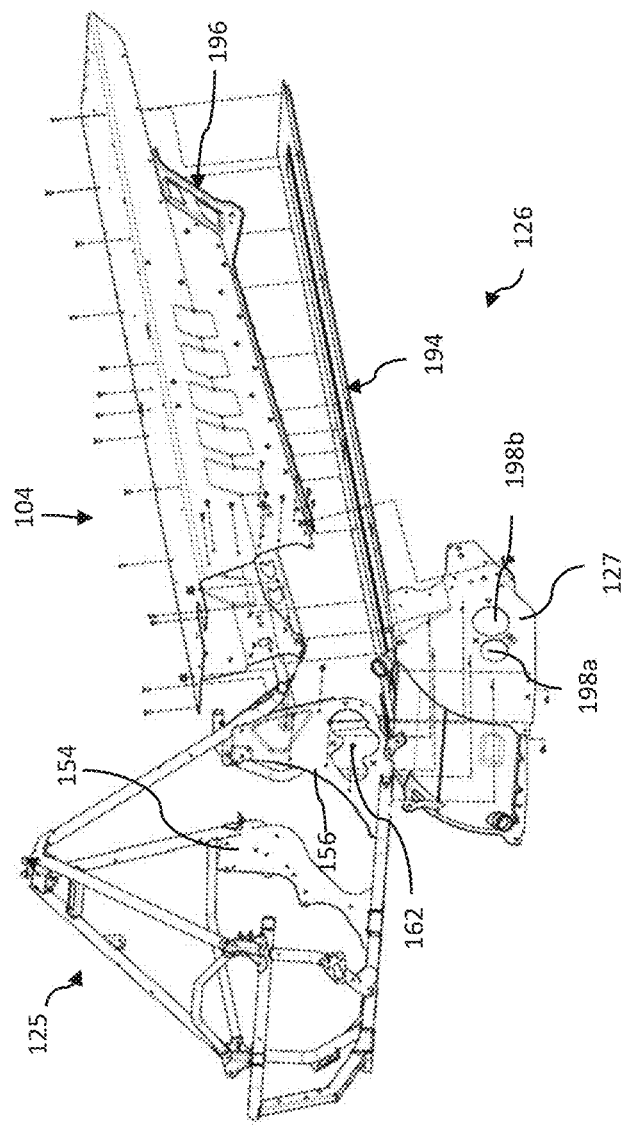
FIG. 18 illustrates an exploded view of components of the chassis and how the chassis components may be connected, according to some embodiments.
Figure 19:
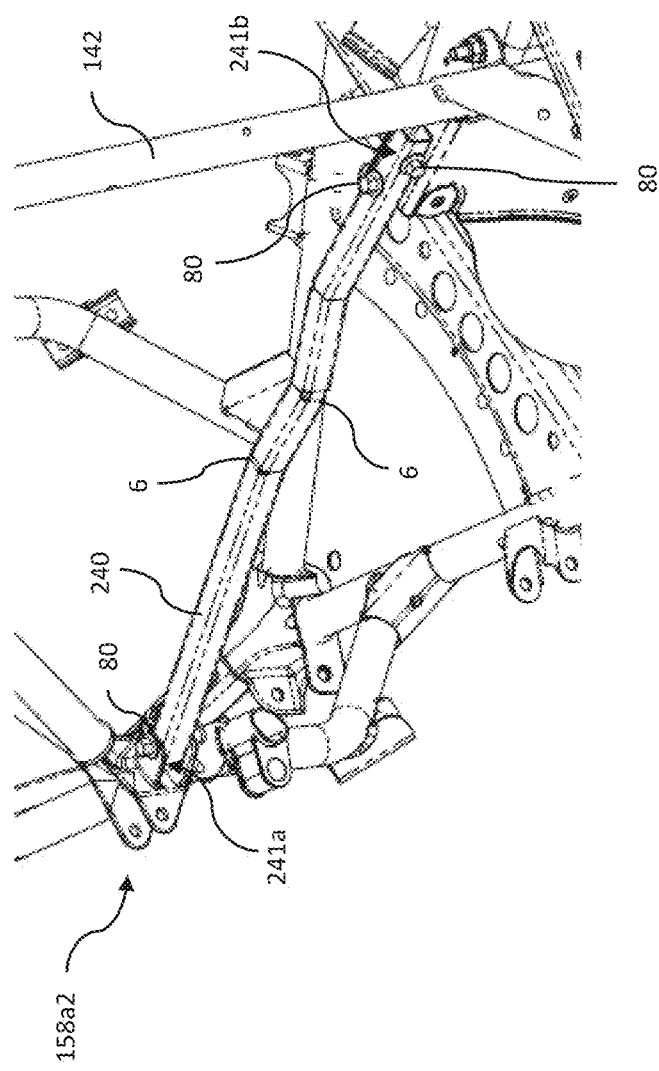
FIG. 19 illustrates a perspective view of a removable horizontal member coupled to a common front frame, according to some embodiments.

FIG. 14 is a perspective view of the chassis and FIG. 18 is a partially exploded view illustrating how components of the chassis may be coupled, according to some embodiments. In some embodiments, a forward portion of the heat exchanger assembly 126 is positioned between the metal plate components 154, 156 and an elongate rearward extending portion 194 is coupled to the underside of the tunnel 104. In at least one embodiment, the heat exchanger assembly 126 is coupled to at least one of the metal plate components 154, 156 by at least one fastener (see e.g., FIG. 18). For example, a heat exchanger end cap 127 is coupled to a metal plate component 154, 156 by at least one fastener. Rivets are an illustrative example of a fastener that may be used to couple the rearward extending portion 194 of the heat exchanger assembly 126 to the tunnel 104, although removable fasteners may also be used.

In some embodiments, a heat exchanger end cap 127 of the side of the heat exchanger assembly 126 has at least one opening 198 (more clearly shown in FIG. 18). Opening 198a may be configured to receive a caliper 330 (see e.g., FIG. 59) and opening 198b may be configured to receive a track drive shaft 195. Opening 198a may be aligned with a first region/aperture 300 of aperture 162 when the metal plate component 156 is positioned to overlap a heat exchanger end cap 127 of the heat exchanger assembly 126 or a side of the tunnel 104. Opening 198b may be aligned with a first region/aperture 302 when the metal plate component 156 is positioned to overlap a heat exchanger end cap 127 of the heat exchanger assembly 126 or a side of the tunnel 104. In some embodiments, the openings 198a, 198b for different models of heat exchanger assemblies 126 (or tunnels 104) may have different locations, as shown in FIGS. 35B and 36B. In some embodiments, the shape of the aperture 162 accommodates different models of the heat exchanger assembly 126. An engine mount 192 may be coupled to a front face of the heat exchanger assembly 126.

Figure 8B:
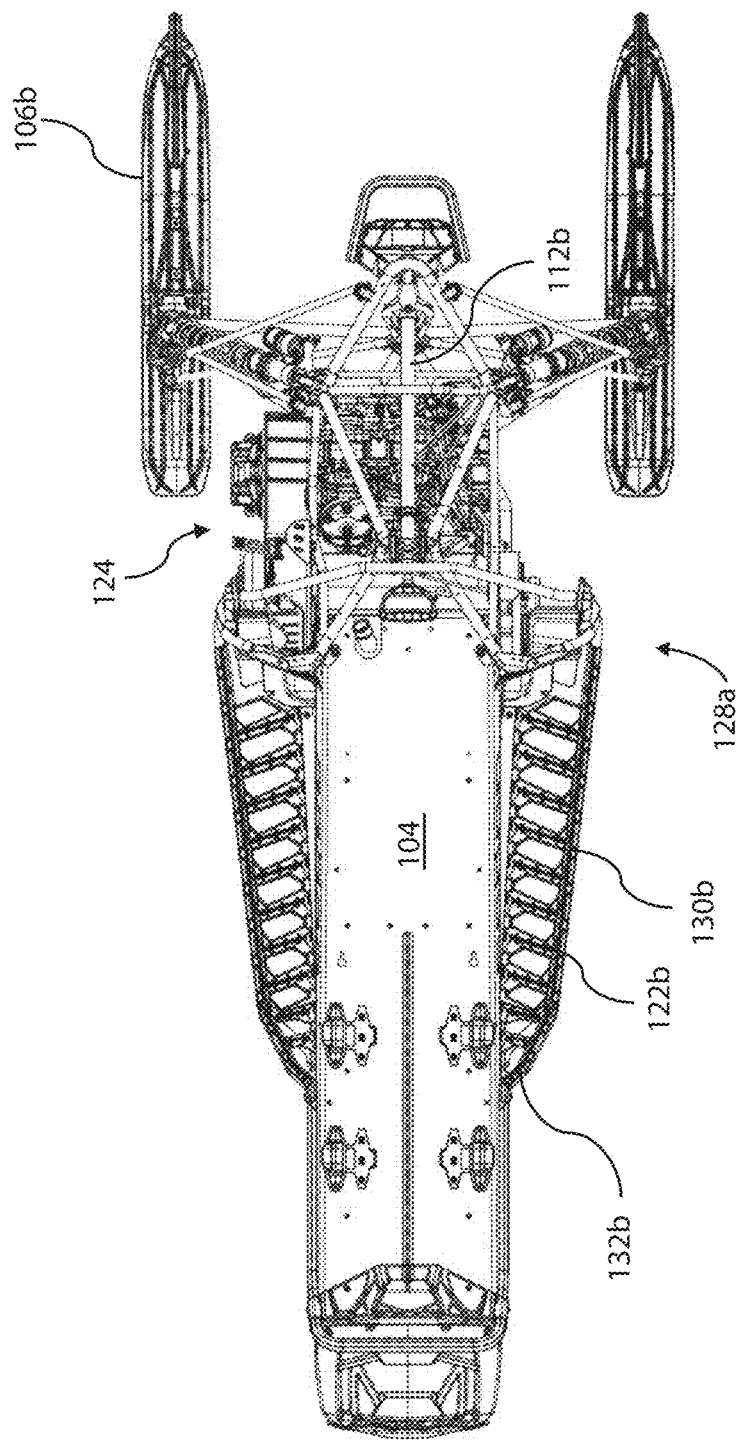
FIG. 8B illustrates a top view of the frame of the second snowmobile of FIG. 6B, according to some embodiments.

The snowmobile 100 may further include at least one running board 122 configured to support a rider's foot (see e.g., FIGS. 4-5). Thus, the running board 122 may be referred to as a foot support member. In some embodiments, the running board 122, front toe stop 128, support member 130, and rear kick-up panel 132 are coupled together to form the running board assembly 134. In some embodiments, the running board 122 may be a running board described in commonly owned U.S. patent application Ser. No. 18/086,721, filed on Dec. 22, 2022, and entitled "Composite Running Board", the contents of which are incorporated by reference in their entirety. The front toe stop 128 may be a toe stop described in commonly owned U.S. patent application Ser. No. 18/089,126, filed on Dec. 27, 2022 and entitled "Recreational Vehicle Toe Stop, Toe Stop Assemblies, and Methods of Assembling a Recreational Vehicle", the contents of which are incorporated by reference in their entirety. The support member 130 may be a running board support member described in commonly owned U.S. patent application Ser. No. 18/090,074, filed on Dec. 28, 2022, and entitled "Running Board Support Member", the contents of which are incorporated by reference in their entirety. The rear kick up panel 132 may be a rear kick up panel described in commonly owned U.S. patent application Ser. No. 18/089,165, filed on Dec. 27, 2022, and entitled "Running Board Rear Kick-Up", the contents of which are incorporated by reference in their entirety. As shown in FIGS. 8A-B, the common forward frame assembly 124 may be configured to secure a first running board 122a and a second running board 122b, a first toe stop 128a and a second toe stop 128b, a first support member 130a and a second support member 130b (see also FIG. 37), and a first bottom-out protector and a second bottom out protector. In a non-limiting example, the first running board 122*a* and the second running board 122*b* have a common shape and mounting features, the first toe stop 128*a* has a shape and/or a mounting feature that is different than the second toe stop 128*b*, the first support member 130*a* has a shape and/or a mounting feature that is different than the second support member 130*b*, and the first bottom-out protector has a shape and/or mounting feature that is different than the second bottom-out protector. In a non-limiting example, the first toe stop 128*a* has a running board mounting feature positioned a first distance from a frame mounting feature and the second toe stop 128*b* has a running board mounting feature positioned a second distance from a frame mounting feature that is different than the first distance, and the first bottom-out protector has a running board mounting feature positioned a first distance from a frame mounting feature, and the second bottom-out protector has a running board mounting feature positioned a second distance from a frame mounting feature that is different than the first distance.

The running board assembly 134 may be attached to one or more of the forward frame assembly 124, the tunnel 104, the heat exchanger assembly 126, or one or more components extending from the forward frame assembly 124 and the tunnel 104. For example, a component of the running board assembly 134 may be coupled to the front frame 125 at a running board support mount 131 (see e.g., FIG. 9). In one example, the running board support mount 131 is a region of the rearward leg 142. As one illustrative example, the support member 130 and the rearward leg 142 may be coupled by inserting the forward end of the support member 130 into or over the end of the rearward leg 142. A removable fastener may be used to secure the support member 130 and the rearward leg 142 together. In one example, a forward end of the support member 130 is coupled to a rearward leg 142 and a rearward end of the support member 130 is coupled to a running board support bracket 196 extending from the tunnel 104. In some embodiments, the running board support bracket 196 may be a running board support bracket described in commonly owned U.S. patent application Ser. No. 18/089,643, filed on Dec. 28, 2022, and entitled "Snow Vehicle Support Bracket", the contents of which are incorporated by reference in their entirety. In some embodiments, at least one end of the support member 130 of different snowmobile models may be positioned at different lateral distances away from the centerline 10 and/or the tunnel 104. In other words, the lateral distance between the centerline 10 or tunnel 104 and the outer/outboard edge of at least a forward end of the running board assembly 134 may vary for different snowmobile models (see e.g., FIGS. 8A-B and 37).

Figure 59:
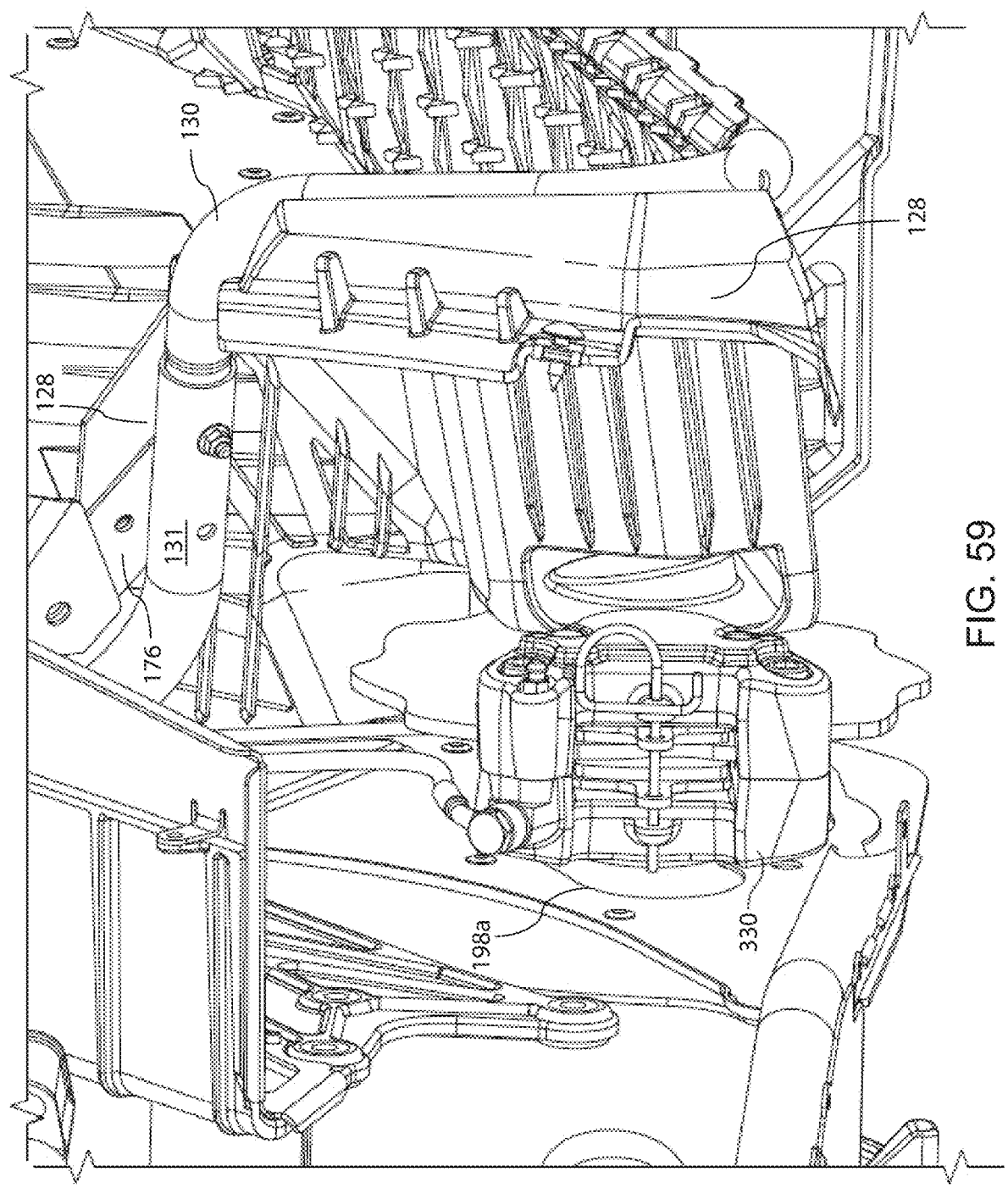
FIG. 59 illustrates an isometric view of a brake caliber extending through an opening in the heat exchanger assembly, according to some embodiments.

The front frame 125 further includes a front toe stop mounting point 176 (see e.g., FIGS. 14 and 59). The front toe stop mounting point 176 may be coupled to the rearward leg 142. As an illustrative example, an upper end of the front toe stop mounting point 176 may surround at least a portion of the rearward leg 142. In some embodiments, an upper end of the front toe stop mounting point 176 is coupled adjacent to an upper end of the curved section 143 of the rearward leg 142, and a lower end of the front toe stop mounting point 176 is coupled to a lower end of the curved section 143. The front toe stop mounting point 176 may be welded to the rearward leg 142. Optionally, the front toe stop mounting point 176 extends outward and forwardly from the rearward leg 142. In some embodiments, a front toe stop 128 is coupled to the front toe stop mounting point 176. Optionally, the front toe stop mounting point 176 is positioned below an upper surface of a portion of the tunnel 104. Optionally, an upper end of the front toe stop mounting point 176 is positioned along an upper surface of the tunnel 104 and a lower end of the front toe stop mounting point 176 is positioned alongside a side of the tunnel.

In some embodiments, the front frame 125 includes one or more tunnel mounting features 177 securable to the tunnel 104. As shown in FIG. 14, the tunnel mounting features 177 may couple the rearward legs 142 to the tunnel 104. The tunnel mounting features 177 may include one or more fasteners 82, which may be removable fasteners to allow for the removal of the front frame 125 from the tunnel 104. Optionally, the tunnel mounting features 177 are securable to the upper horizontal surface of the tunnel 104 (see e.g., FIGS. 10 and 14). Accordingly, the tunnel mounting features 177 may be secured to the forward end of the upper horizontal surface of the tunnel 104. It is to be understood, however, that the front frame 125 may be secured to one or both side panels of the tunnel 104.

In some embodiments, the side 30, 32 includes a rearward leg 142. The rearward leg 142 includes a first end extending upward and forward from the metal plate component 154, 156 to a steering column mount component 136, and a second end extending outward from the side 30, 32. A running board support member 130/130*a*/130*b* is provided that includes a tube with a forward end that is mated with the second end of the rearward leg 142 (e.g., horizontal section 141) and a rearward end extending toward a rearward portion of the tunnel 104 or a component extending from the tunnel 104. In an illustrative example, the rearward end may be secured to a component of a rear suspension as described in commonly owned U.S. patent application Ser. No. 18/090,074, filed on Dec. 28, 2022, and entitled "Running Board Support Member", the contents of which are incorporated herein by reference in their entirety. Thus, the horizontal section 141 of the rearward leg 142 may be sized to surround the forward end of the running board support member 130 or the forward end of the running board support member 130 may be sized to surround the horizontal section 141 of the rearward leg 142. The rearward leg 142 of the side 30, 32 and the tube of the running board support 130 define a continuous tubular length extending from the steering column mount component 136 toward a rearward portion of the tunnel 104.

In at least one embodiment, the frame 125 includes a common running board mount 131 that accommodates at least two different running board assemblies or configurations. In some embodiments, a method for attaching a running board assembly to a common running board mount 131 includes providing a first running board assembly comprising a support member 130*a* and an outboard edge; providing a second running board assembly comprising a support member 130*b* and an outboard edge; securing the support member 130*a*, 130*b* of either the first running board assembly or the second first running board assembly to the running board mount 131; where the outboard edge of the first running board assembly is positioned at an angle with respect to the centerline 10 than the outboard edge of the second running board assembly when the respective running board assembly is secured to the common forward frame.

The common front frame 125/front frame assembly 124 may be configured to be operably connected to at least two different front suspensions. In some embodiments, the spindle 228 is connected to the upper A-arm 220 by a top mount 230, to the lower A-arm 222 by a front mount 232, to the steering tie rod/arm 224 by a rear mount 234, and to the ski 106 by a bottom mount 236. In some embodiments, at least one of the mounts 230, 232, 234, 236 includes a ball joint. In some embodiments, the top mount 230, the front mount 232, and the rear mount 234 each include a ball joint.

Different snowmobile models may utilize different spindles 228, different upper A-arms 220, different lower A-arms 222, different tie rods 224, and/or different vibrational dampeners 226. FIGS. 22-23, 25A-B, 26A-B, and 27A-B illustrate front suspensions 214a, 214b that have different spindles 228a, 228b, different upper and lower A-arms 220, 222, and optionally different vibrational dampeners 226a, 226b coupled to common mounting points on the front frame 125. The spindle 228b and front suspension are described in commonly owned U.S. patent application Ser. No. 17/982,748, and entitled "Recreational Vehicle Spindle", the contents of which are incorporated by reference in their entirety. The spindle 228a and front suspensions are described in commonly owned U.S. patent application Ser. No. 17/988,304, and entitled "Spindle for a Recreational Vehicle", the contents of which are incorporated herein by reference in their entirety. In some embodiments, the steering post 206 extends from the steering column mount component 136 over the top of the top mount 230 of the spindle 228 as shown in FIGS. 26A and 26B, when the snowmobile 100 is positioned on a flat surface without a rider. In some embodiments, the spindle 228 is positioned between a front and rear of the lower front 50 of the front frame 125. For example, the spindle 228 may be positioned between a plane bisecting the upright supports 150 and a parallel plane positioned at the apex of the upper front member 146. In other words, the forward section 50 of the front frame 125 is flanked by the spindles 228. In at least one embodiment, an orientation of the spindle 228 varies between front suspensions 214, as best shown in FIGS. 26A-B. For example, in some embodiments, the position of the front mount 232 along the centerline 10 varies between spindle models. For example, as illustrated by lines 12a and 12b in FIGS. 25A-B and by lines 22a, 22b in FIGS. 26A-B, front mount 232a is positioned further forward along the centerline 10 compared to front mount 232b. In one example, the ball joint of the front mount 232a is positioned further forward relative to the running board mounting point 131 than the ball joint of the front mount 232b. In some embodiments, the position of the rear mount 234 along the centerline 10 varies. For example, as illustrated by lines 14a and 14b in FIGS. 25A-B and by lines 20a and 20b in FIGS. 26A-B, rear mount 234a is positioned further forward along the centerline 10 compared to front mount 232b (note relative positions of lines 14a, 14b relative to the cross-tube 144).

In some embodiments, the position of a front edge of the bottom mount 236 relative to a centerline 10 of the front frame 125 varies between spindle models. This is illustrated for example in by lines 16a, 16b in FIGS. 25A-B and by lines 24a, 24b in FIGS. 26A-B. The front edge of bottom mount 236a is aligned with the apex of the upper front member 146, while the front edge of spindle 228b is positioned behind the apex of the upper front member 146. In other words, the front edge of bottom mount 236a is positioned further forward than the front edge of bottom mount 236b. In some embodiments, the distance between the front and bottom mounts 232, 236 differs between spindle models 228a, 228b— as illustrated by the different in the distance between lines 12a and 16a compared to the distance between lines 12b and 16b.

In other embodiments, the orientation of the front arm of the lower A-arm 222, extending from the front mount 232a to the suspension mount on joint 158d, may vary. For example, as illustrated by lines 12a, 12b, the orientation of the front arms of the lower A-arms 222 of snowmobiles 100a, 100b differ with the front arm of the lower A-arm 222 of snowmobile 100b oriented generally perpendicular to the centerline compared to the front arm of the lower A-arm 222 of snowmobile 100a, even though both are secured to the front frame 125 at the same suspension mount on joint 158d. In other words, the angle between a longitudinal axis of the front arm of the lower A-arm 222 and line 12 is greater for snowmobile 100a than for snowmobile 100b.

In some embodiments, the lateral distance of the ball joint of the front mount 232 differs between snowmobile models. For example, the ball joint of the front mount 232 of one snowmobile model may be positioned outward from the centerline 10 a greater distance than the ball joint of the front mount 232 of another snowmobile model. In other embodiments, the ball joint of the front mount 232 of one snowmobile model is positioned further forward along the centerline 10 and further outward from the centerline 10 than the ball joint of the front mount 232 of another snowmobile model. In an illustrative example, the ball joint of the front mount 232 of the snowmobile of FIG. 25B is positioned further forward along the centerline 10 and further outward from the centerline 10 than the ball joint of the front mount 232 of the snowmobile of FIG. 25A.

In at least one embodiment, a front suspension 214 is coupled to the front frame 125/front frame assembly 124 by one or more suspension mounts (see e.g., FIGS. 21-23 and 25A-27B). A suspension mount may be an integral part of a cast joint (e.g., joint 158d) or coupled to a component of the front frame 125 (e.g., joint 158b). The front suspension 214 may include an upper control arm 220 (e.g., an upper A-arm), a lower control arm 222 (e.g., a lower A-arm), a tie bar 224, and a vibrational dampener (e.g., shocks) 226 coupled to a spindle 228. In some embodiments, the front suspension 214 is symmetrical about the centerline 10.

The upper A-arm 220, lower A-arm 222, tie bar 224, and vibrational dampener 226 may be coupled to the front frame 125. For example, each upper A-arm 220 is coupled to the front frame 125 at suspension mounts 158b and suspension mount 158f, each lower A-arm 222 is coupled to the front frame 125 at a suspension mount 158e and a suspension mount integrally formed on 158d, each tie bar 224 is coupled to the front frame 125 at the joint 158d, and the vibrational dampeners 226 are coupled to the front frame 125 at joint 158a. Optionally, the rearward arms of the lower A-arms 222 may be further coupled to joint 158c by a suspension subassembly 250 (see e.g., FIGS. 22B and 23). Because the cross-tube 144 and the vibrational dampeners 226 are coupled to joint 158a, the cross-tube 144 may be referred to as a shock-support cross-tube.

In at least one embodiment, the front frame 125 includes a first cast joint 158a1 that couples a forward leg 140a, the horizontal member 166, the cross-tube 144, and the upper front member 146; a second cast joint 158a2 that couples a forward leg 140b, the cross-tube 144, the upper front member 146, and the horizontal member 240; and a third cast joint 158d that couples the lower front member 148 and the arms 157a, 157b of the lower member 152. As illustrated in FIGS. 62A-63B, the cast joints 158a1 and 158a2 may comprise a base 280 that defines a downwardly facing channel 282 that receives at least an upper portion of the upper front member 146 therein, and the upper front member 146 may be welded to the cast joints 158a when positioned thereon. In some embodiments, the cast joint 158a1 may include an attachment point 284 configured to permanently secure the horizontal member 166 thereto. For example, the attachment point may facilitate positioning and alignment of the horizontal member 166 thereon during the welding process. However, the cast joint 158a2 may include a horizontal channel 286 configured to removably secure (i.e., releasably couple) the horizontal member 240. For example, the channel may also include one or more apertures for receiving a removable fastener therethrough to secure the horizontal member 240 to the cast joint 158a2. The cast joints 158a1, 158a2 may include a cross tube attachment point 288 configured to secure the cross tube 144 and a forward leg attachment point 290 configured to secure the forward leg 140. In some embodiments, the cross tube 144, the forward leg 140, the upper front member 146, and/or the horizontal member 166 may be secured to the cast joint 158a1, 158a1 by a weld, crimp, rivet, or fastener. The cast joints 158a1, 158a2 may include a vertical channel 292 configured to receive and secure the vibrational damper 226 (i.e., shock) of the suspension assembly (see FIG. 33). The vertical channels 292 include one or more apertures for receiving a removable fastener therethrough to secure the damper 226 to the cast joints 158a1, 158a2. In some embodiments, the cast joints 158a1, 158a2 may be configured to provide a direct load path between the vibration damper 226 and the column steering mount 136, i.e., the vibrational damper 226 is directly aligned with the forward leg 140 such that a load is transferred from the vibrational damper 226, through the cast joint 158a1, 158a2 and the forward leg 140, to the column steering mount 136.

In some embodiments, the front frame 125 includes a welded joint 158g that directly couples the upright support 150 and the lower member 152, and a welded joint 158h that directly couples the upright support 150 and the upper front member 146 (see e.g., FIG. 11). In some embodiments, the joint 158d further couples the steering column 112 (see e.g., FIGS. 24A-B). Optionally, the cast joint 158a and the welded joint 158h are a single joint. Optionally, the cast joint 158d is positioned further forward along the centerline 10 than the first and second cast joints 158a (see e.g., FIG. 20). Optionally, the welded joint 158g is positioned along the longitudinal centerline 10 between cast joint 158d and the cast joints 158a1, 158a2. In at least one embodiment, a horizontal member 240 is releasably coupled to the cast joint 158a2 of the front frame 125 to form a forward frame assembly 124.

In at least one embodiment, the front frame 125 includes a plurality of joints 158 coupling the frame components 140/142/166/144/146/148/152, wherein the plurality of joints includes a welded joint 158i and a cast joint 158d positioned rearward of the suspension mount 158b (see e.g., FIGS. 11 and 20). In some embodiments, the front frame 125 further includes a cast joint 158a positioned rearward of the cast joint 158d, and a welded joint 158h positioned beneath the cast joint 158a. The front frame 125 may further include suspension mounts 158b/158f for coupling the front frame 125 to a suspension assembly 220/222/224/226/228. Suspension mounts 158b and 158f may be coupled to the upper front member 146 to connect the upper A-arms to the frame assembly 124. Suspension mount 158f may be positioned rearward of suspension mount 158b and the joint 158. The additional mounts for coupling the front frame 125 to a suspension assembly may further include mount 158c. Mount 158c may be coupled to the upright support 150 to connect the suspension subassembly 250 to the frame assembly 124.

In at least one embodiment, the front frame 125 includes a first cast joint 158a1 that couples a forward leg 140, the horizontal member 166, the cross-tube 144, the upper front member 146, and a vibrational dampener 226; a second cast joint 158a2 that couples a forward leg 140, the cross-tube 144, the upper front member 146, the horizontal member 240, and a vibrational dampener 226; a third cast joint 158d that couples the lower front member 148, the lower member 152, the tie bars 224, the steering column 112, and the forward arms of the lower A-arms 222. Optionally, the front frame 125 includes a fourth and fifth welded joint 158g1, 158g2 that couples the upright support 150 and the lower member 152; a sixth and seventh welded joint 158h1, 158h2 that couples the upright support 150 and the upper front member 146; an eighth welded joint 158i that couples the lower front member 148 to the upper front member 146. Suspension mounts 158b1, 158b2 may be metal stampings or castings that are welded to the upper front member 146 to couple the forward arms of the upper A-arms 220 and the upper front member 146. Lower suspension mounts 158e1, 158e2 may be metal stampings or castings that are welded to the lower member 152 to couple the rearward arms of the lower A-arms 222 thereto. Upper suspension mounts 158f1, 158f2 are welded to the upper front member 146 to couple a rearward arm of the upper A-arms 220 and the upper front member 146 (see e.g., FIGS. 11, 21, 22A-B, 23, 24A-B, 25A-B). Optionally, suspension mounts 158c1, 158c2 couple the upright support 150 and a suspension subassembly 250 for the rearward arm of the lower A-arms 222 (see e.g., FIGS. 22B and 23). The suspension mounts 158c1, 158c2 may be welded to the upright support 150 between the cast joint 158a and the welded joint 158g (see e.g., FIG. 11). Optionally, the suspension mounts 158c1, 158c2 extend outward from the upright support 150. In at least one embodiment, a horizontal member 240 is releasably coupled to the second cast joint 158a2. Optionally, the first cast joint 158a1 is positioned between the suspension mount 158b1 and the suspension mount 158f1, and the second cast joint 158a2 is positioned between the suspension mount 158b2 and the suspension mount 158f2 (see also FIG. 13). Optionally, the welded joint 158h1 is positioned between the suspension mount 158b1 and the suspension mount 158f1 and the welded joint 158h2 is positioned between the suspension mount 158b2 and the suspension mount 158f2.

In at least one embodiment, a belt housing assembly 550 may be secured to the front frame 125. In some embodiments, the belt housing assembly 550 may include a belt housing assembly described in commonly owned, U.S. patent application Ser. No. 17/588,487, filed on Jan. 31, 2022, and entitled "Adjustable Belt Drive Assembly, System, and Method", and/or commonly owned U.S. patent application Ser. No. 18/085,068, filed on Dec. 20, 2022 and entitled "Clutch Guard with Integrated Torque Control Link", the contents of which are incorporated by reference in their entirety. As illustrated in FIGS. 34-36B, the belt housing assembly 550 may be secured to the front frame by mounting onto the metal plate components 154, 156, the lower member 152, the rearward leg 142 of the forward frame, and/or the horizontal member 166. The mounting of the metal plate components 154, 156 onto the heat exchanger end caps 127 of the front frame 125 is further described in commonly own U.S. Provisional Application No. 63/405,176, filed on Sep. 9, 2022, and entitled "Recreational Vehicle Heat Exchanger End Caps and Assembly", the contents of which are hereby incorporated by reference in their entirety.

Figure 64A:
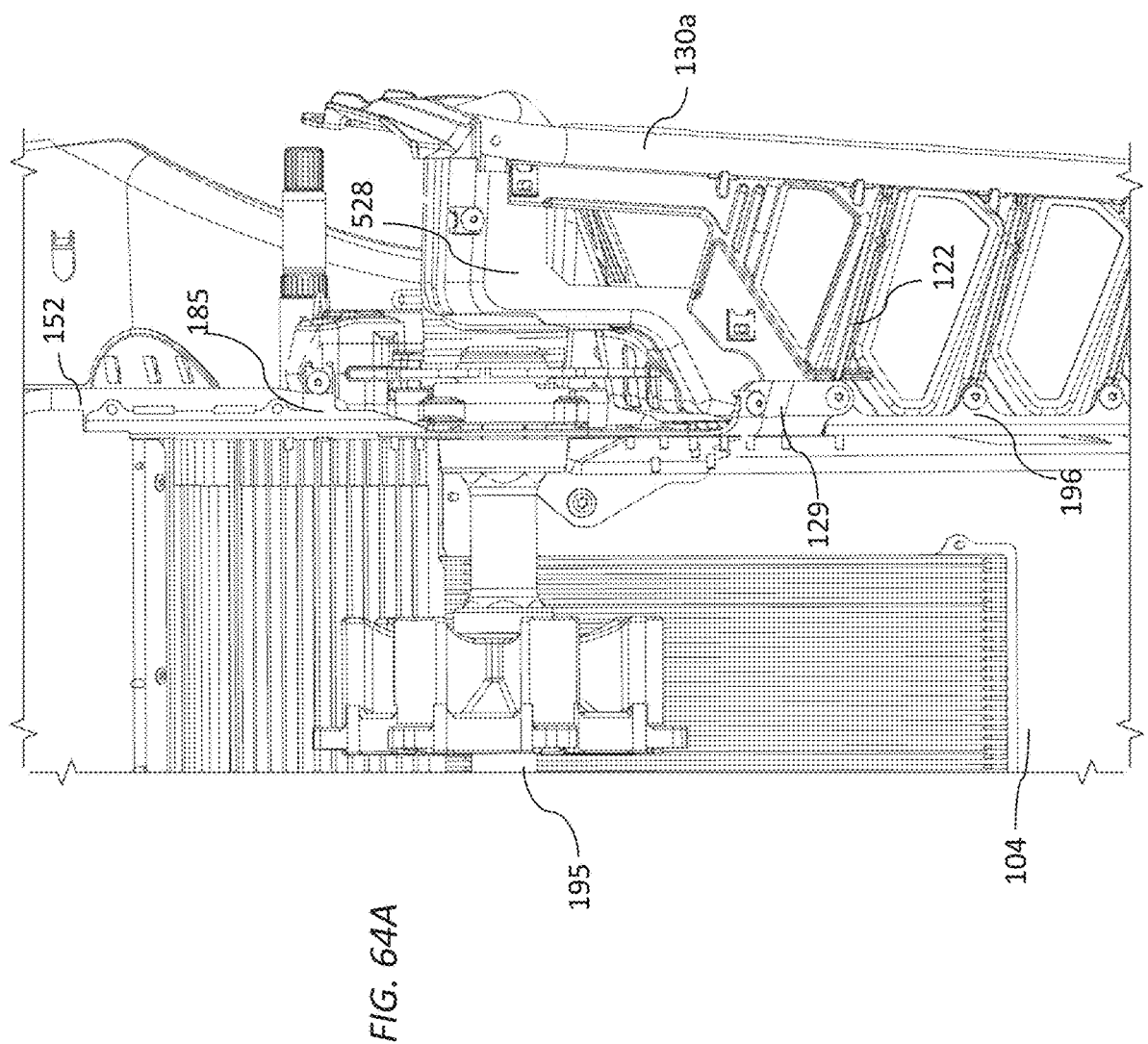
FIG. 64A illustrates a bottom view of a track drive shaft of the snowmobile of FIG. 6A, according to some embodiments.
Figure 64B:
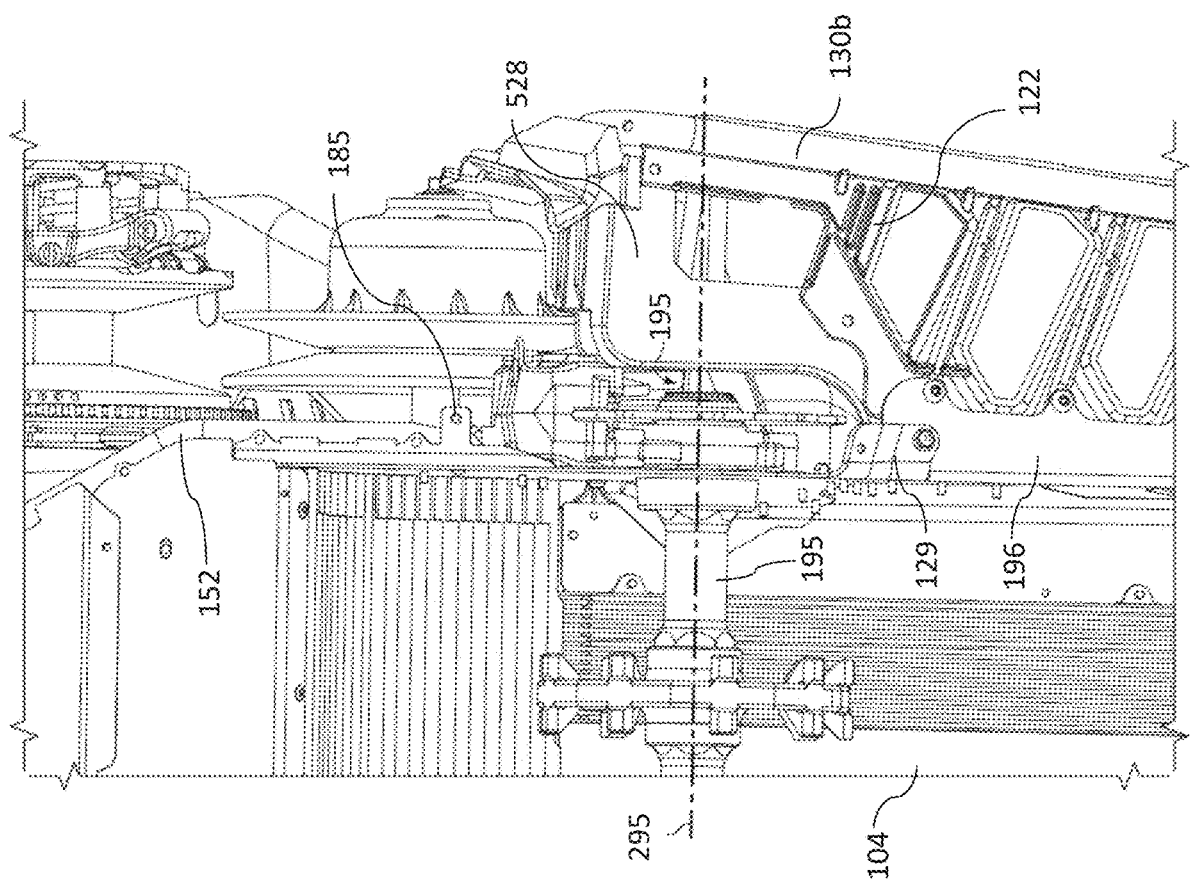
FIG. 64B illustrates a bottom view of a track drive shaft of the snowmobile of FIG. 6B, according to some embodiments.

In some embodiments (e.g., FIGS. 35A-B), the housing assembly 550 may be secured to the metal plate component 154 in a first position as shown in FIG. 35A that positions the track drive shaft 195 in the first position as shown in FIG. 35B. In other embodiments (e.g., FIGS. 36A-B), the housing assembly 550 may be secured to the metal plate component 154 in a second position as shown in FIG. 36A that is different than the first position. The second position positions the track drive shaft 195 in the second position shown in FIG. 36B. Accordingly, the front frame assembly 125 can accommodate two different track drive shaft (and housing assembly 550) configurations for different snowmobile models. As illustrated in FIGS. 64A-B, the track drive shaft 195 may extend along a track drive shaft axis 295 and through an aperture/opening in the metal plate 154, 156 and/or heat exchanger end cap 127. FIG. 64A shows the track drive shaft 195 in a first position (i.e., the snowmobile of FIG. 6A), whereas FIG. 64B illustrates the track drive shaft in a second position (i.e., the snowmobile of FIG. 6B).

Figure 37:
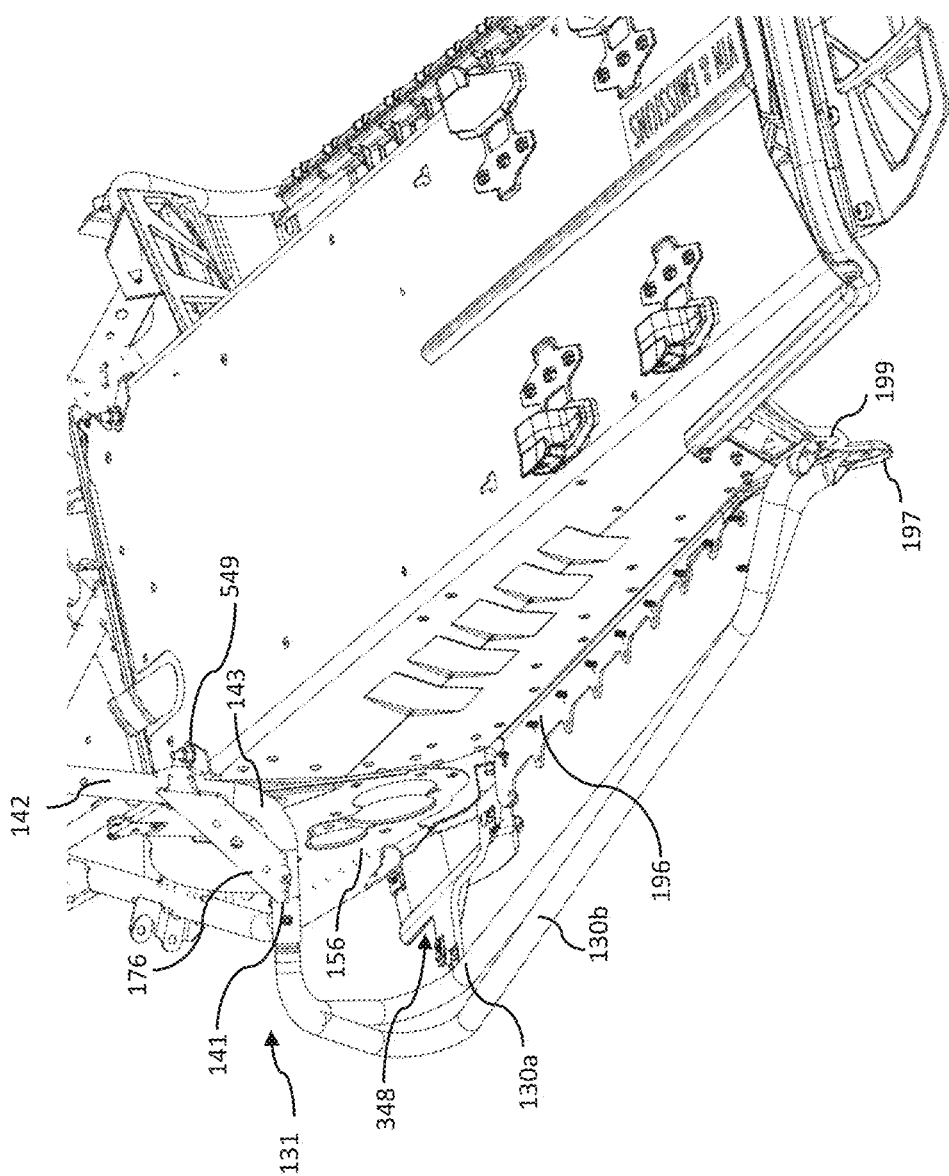
FIG. 37 illustrates an isometric superimposed view of a first running board support and a second running board each support secured to the common front frame, according to some embodiments.

In at least one embodiment, a running board support member 130a may be secured to the front frame 125 (see e.g., FIG. 8A). As illustrated in FIG. 37, the running board support member 130a may be secured to the front frame 125 at the running board mounting point 131. In some embodiments, the running board support member 130a may be secured to a first mounting point 199 on the bracket 196 (see e.g., FIG. 37). An alternative running board support member 130b (see e.g., FIGS. 8B and 37) may also be secured to the front frame 125 at the running board mounting point 131, i.e., multiple different running board support members may be secured to the same front frame 125. In some embodiments, the alternative running board support member 130b may be secured to a second mounting point 197 of the bracket 196 (see e.g., FIG. 37). In some embodiments, two different brackets 196 may be used, i.e., a first bracket (see FIGS. 8A and 54) used with the running board support member 130a and a second bracket (see FIGS. 8B and 37) that is configured differently than the first bracket used with the alternative running board support member 130b. The running board support members 130/130a/130b may include embodiments and/or descriptions described in commonly owned U.S. patent application Ser. No. 18/090,074 filed on Dec. 28, 2022 and entitled, "Running Board Support Member," the contents of which are hereby incorporated by reference in their entirety. The bracket 196 (and the first bracket and the second bracket described above) may include embodiments and/or descriptions described in commonly owned U.S. patent application Ser. No. 18/089,643 filed on Dec. 28, 2022 and entitled, "Snow Vehicle Support Bracket," the contents of which are hereby incorporated by reference in their entirety.

In some embodiments, the running board support member 130a may be secured to the running board 122a (see e.g., FIG. 65A). The running board 122a may be secured to the rear kick-up 132a via one or more elongate slots 332 configured to receive a fastener therein. The elongate slots 332 may be configured to accommodate a plurality of different orientations, and thus, the angle between the rear kick-up 132a and the running board 122a may be adjusted. In some embodiments, the running board support member 130b may be secured to the running board 122b (see e.g., FIG. 65B). The running board 122b may be secured to the rear kick-up 132b via the one or more elongate slots 332 configured to receive a fastener therein.

Figure 38:
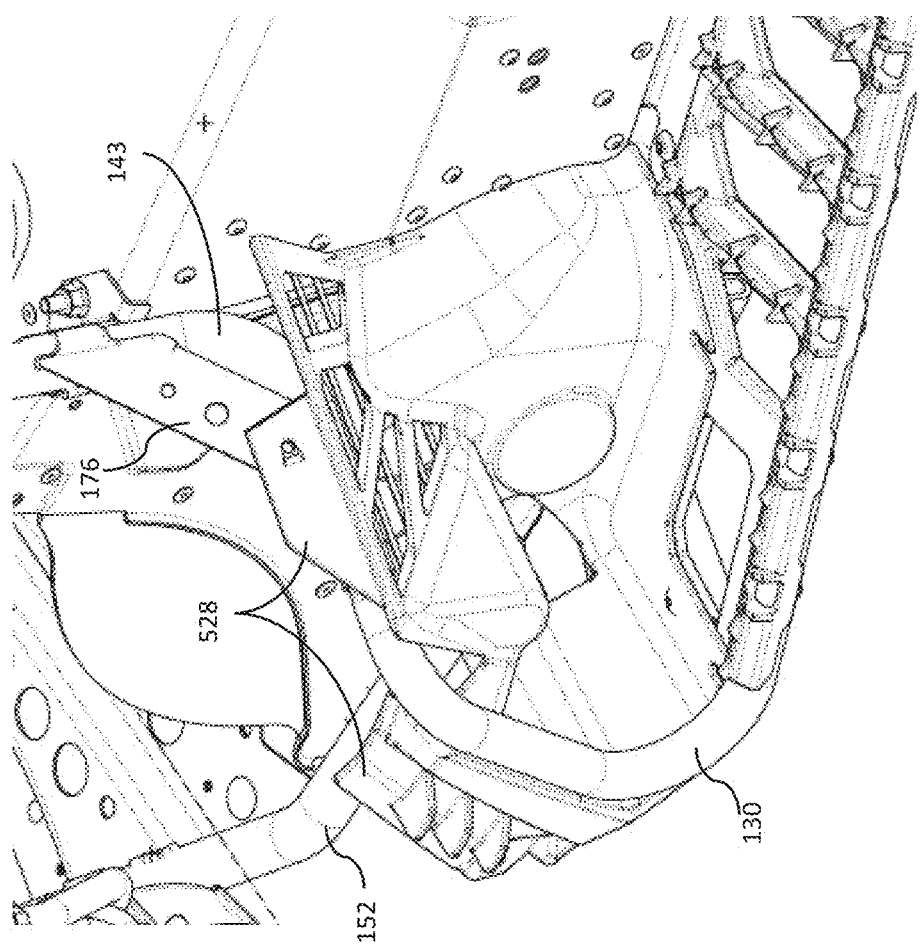
FIG. 38 illustrates an isometric view of a second toe stop and the second running board support associated with the second snowmobile of FIG. 6B each secured to the front frame, according to some embodiments.
Figure 39:
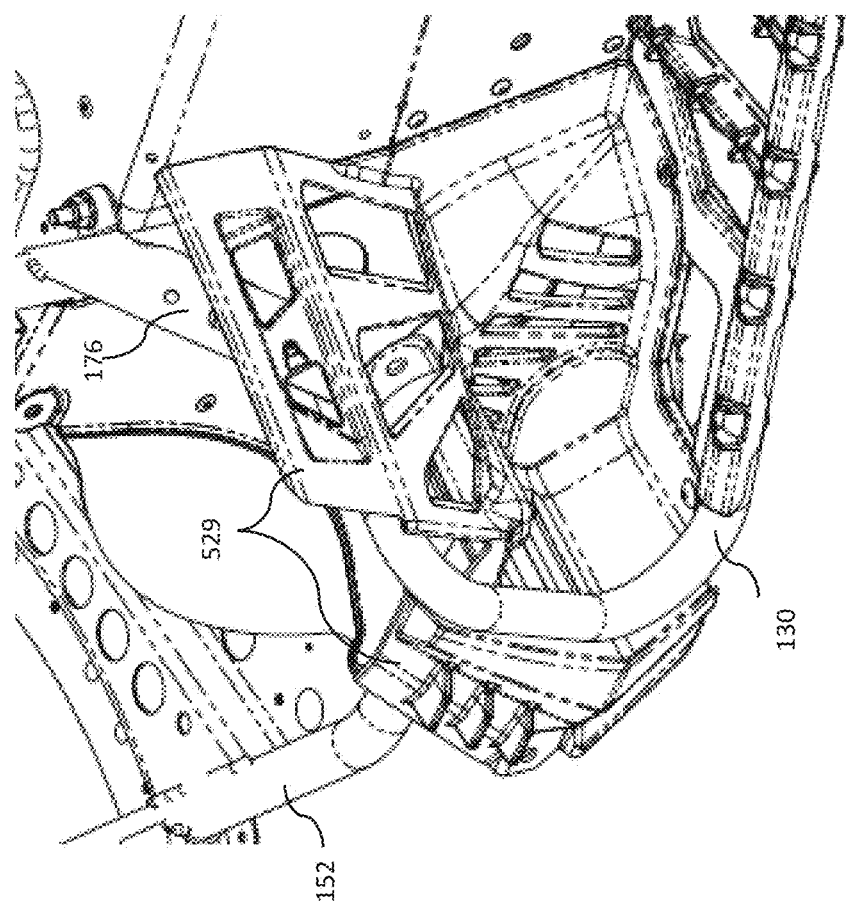
FIG. 39 illustrates an isometric view of a first toe stop and the first running board support associated with the first snowmobile of FIG. 6A each secured to the front frame, according to some embodiments.

In at least one embodiment, a toe stop 528 may be secured to the front frame 125. As illustrated in FIG. 38, the toe stop 528 is secured to the front toe stop mounting point 176 disposed on the curved section of the rearward leg 142. The toe stop 528 may be secured directly to the front frame 125 via a removable fastener inserted through the front toe stop mounting point 176. As illustrated in FIG. 39, an alternative toe stop 529 may be secured to the front toe stop mounting point 176, i.e., multiple different toe stops may be secured to the same front frame 125. Various toe stops and toe stop connections to the forward frame are described in commonly owned U.S. patent application Ser. No. 18/089,126, filed Dec. 27, 2022 and entitled "Recreational Vehicle Toe Stop, Toe Stop Assemblies, and Methods of Assembling a Recreational Vehicle", the contents of which are hereby incorporated by reference in their entirety.

Figure 40:
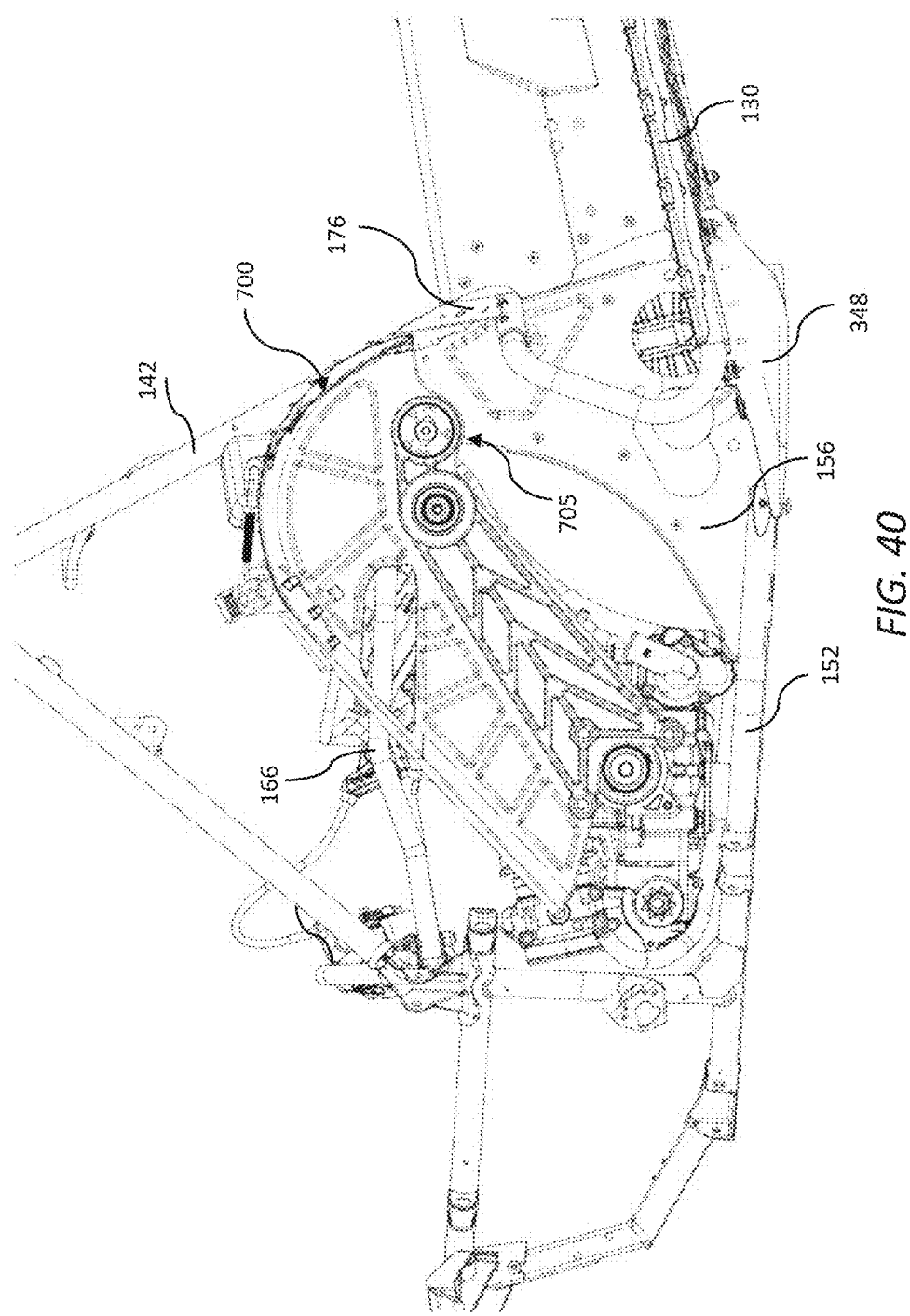
FIG. 40 illustrates a left side view of a clutch guard assembly secured to the front frame, according to some embodiments.
Figure 41:
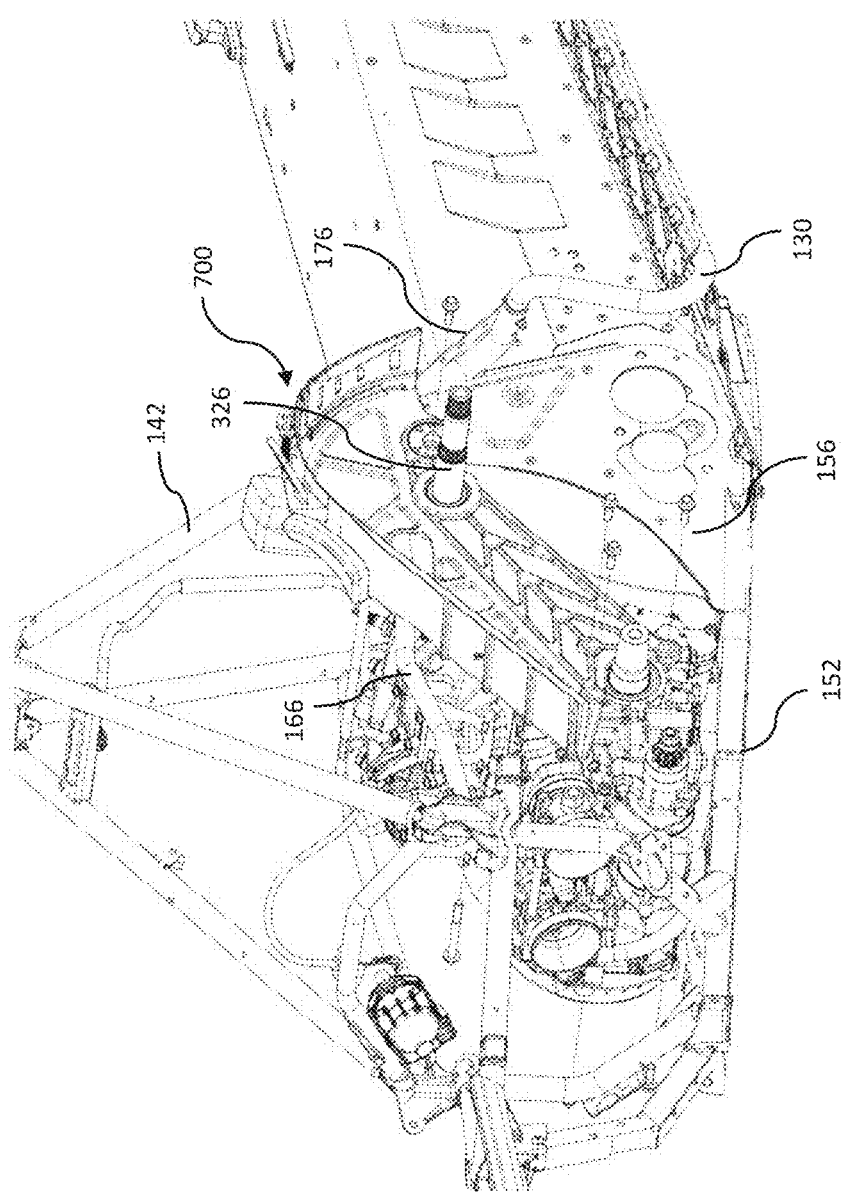
FIG. 41 illustrates an isometric view of a clutch guard assembly secured to the front frame, according to some embodiments.
Figure 42:
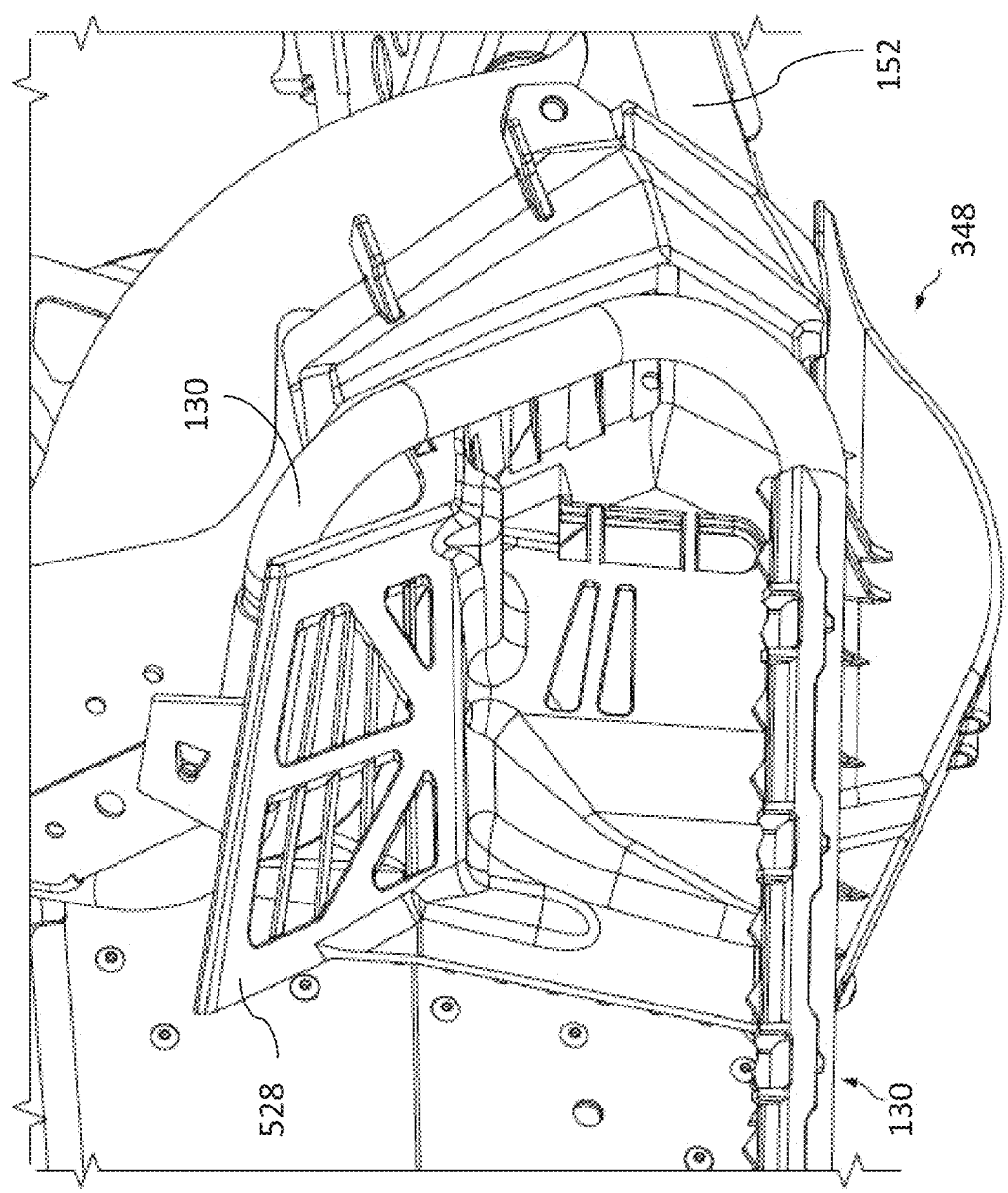
FIG. 42 illustrates a right side isometric view of the first toe stop and a first bottom-out protector secured to the front frame, according to some embodiments.

In at least one embodiment, a clutch guard assembly 700 may be secured to the front frame 125. As illustrated in FIGS. 40-41, the clutch guard assembly 700 may be secured to the metal plate component 154, 156 of the front frame 125. In some embodiments, the clutch guard assembly may be secured to a clutch guard mounting point 705 disposed on the metal plate component 156 (see FIG. 10). The clutch guard assembly may also be secured to the rearward leg 142, the horizontal member 166, and/or the front toe stop mounting point 176. A clutch guard assembly is described in commonly owned U.S. patent application Ser. No. 18/085,068, filed on Dec. 20, 2022 and entitled "Clutch Guard with Integrated Torque Control Link", the contents of which are incorporated by reference in their entirety.

Figure 43:
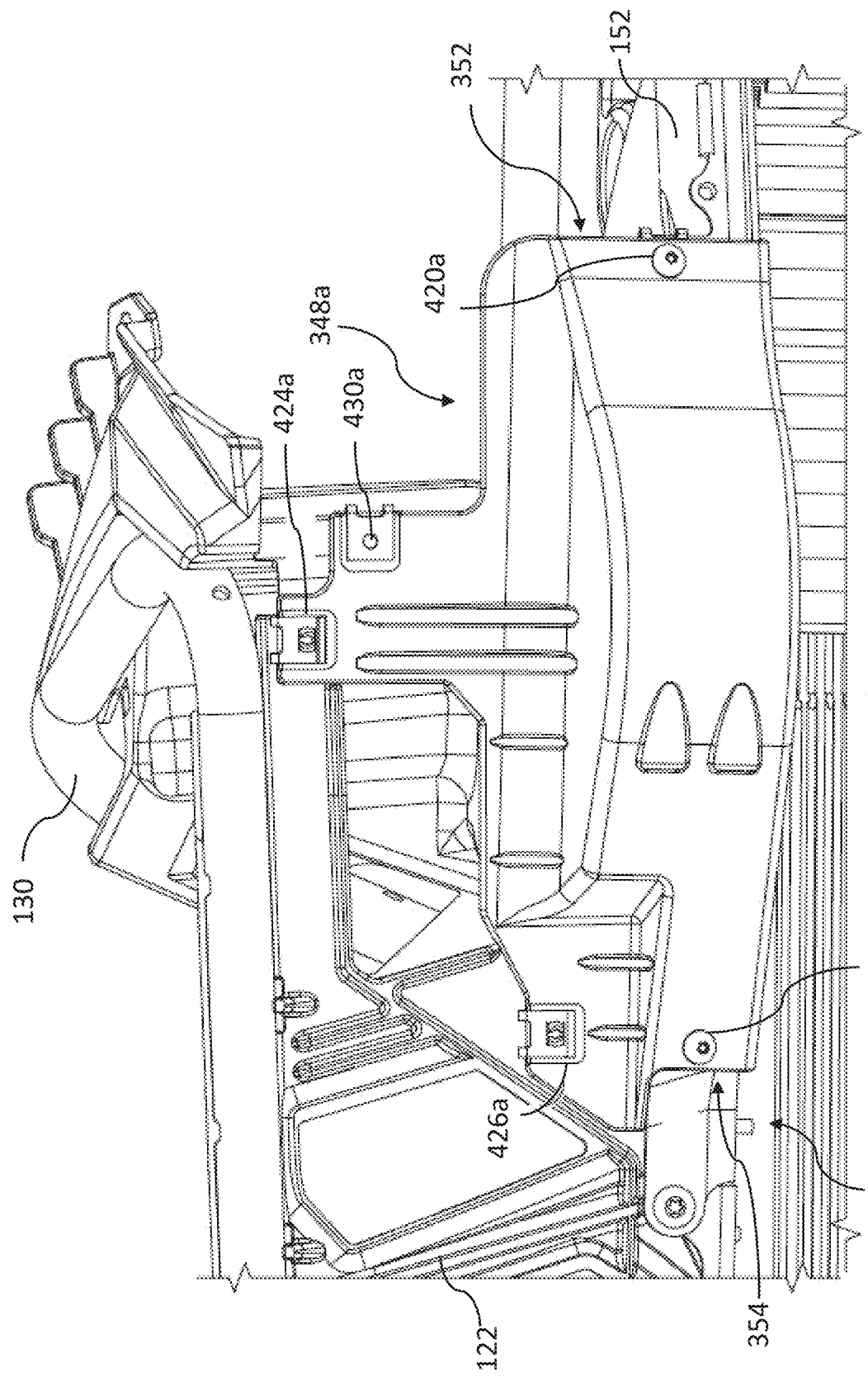
FIG. 43 illustrates a bottom view of the first toe stop and the first bottom-out protector secured to the front frame, according to some embodiments.
Figure 44:
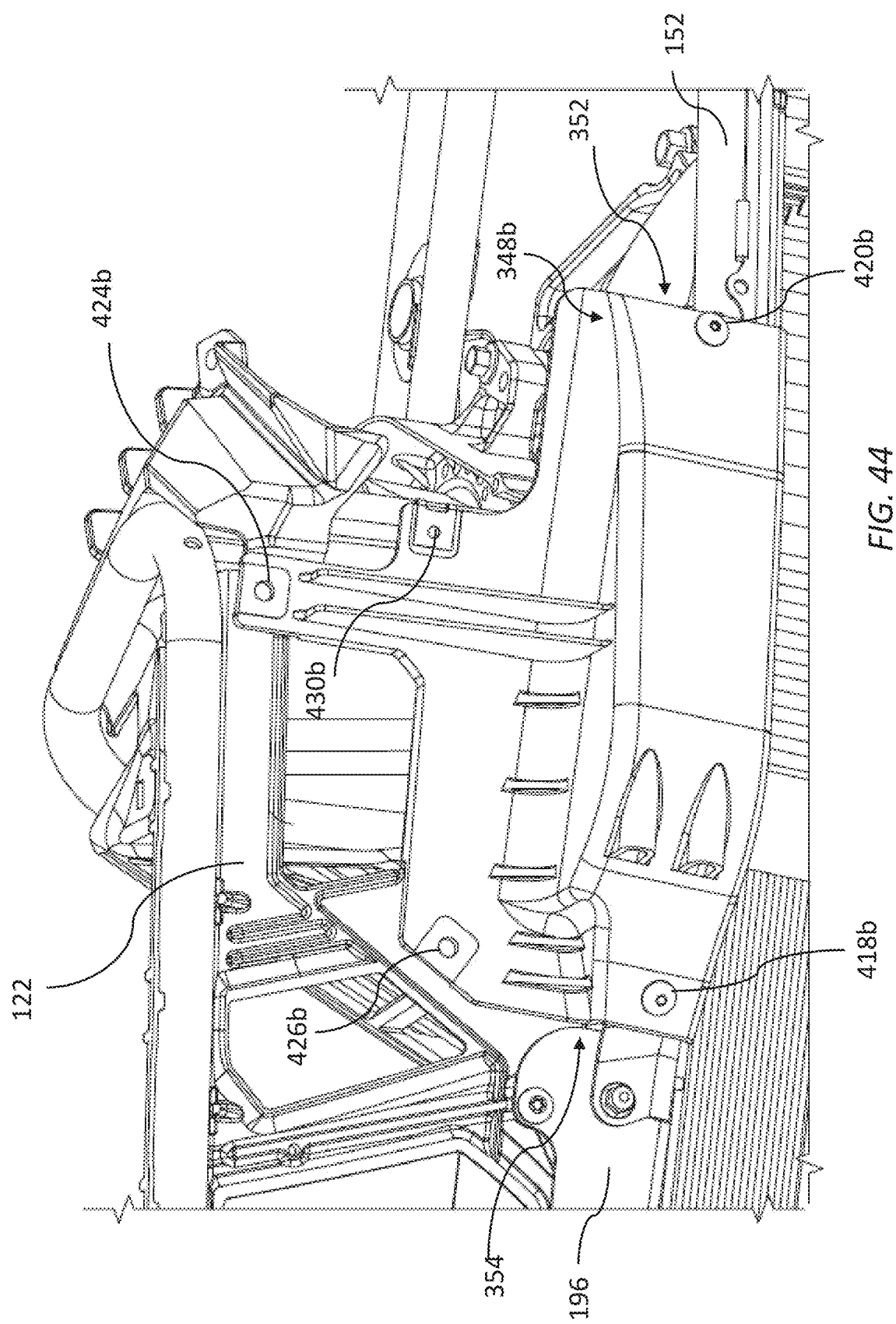
FIG. 44 illustrates a bottom isometric view of the second toe stop and the second bottom-out protector secured to the front frame, according to some embodiments.
Figure 58:
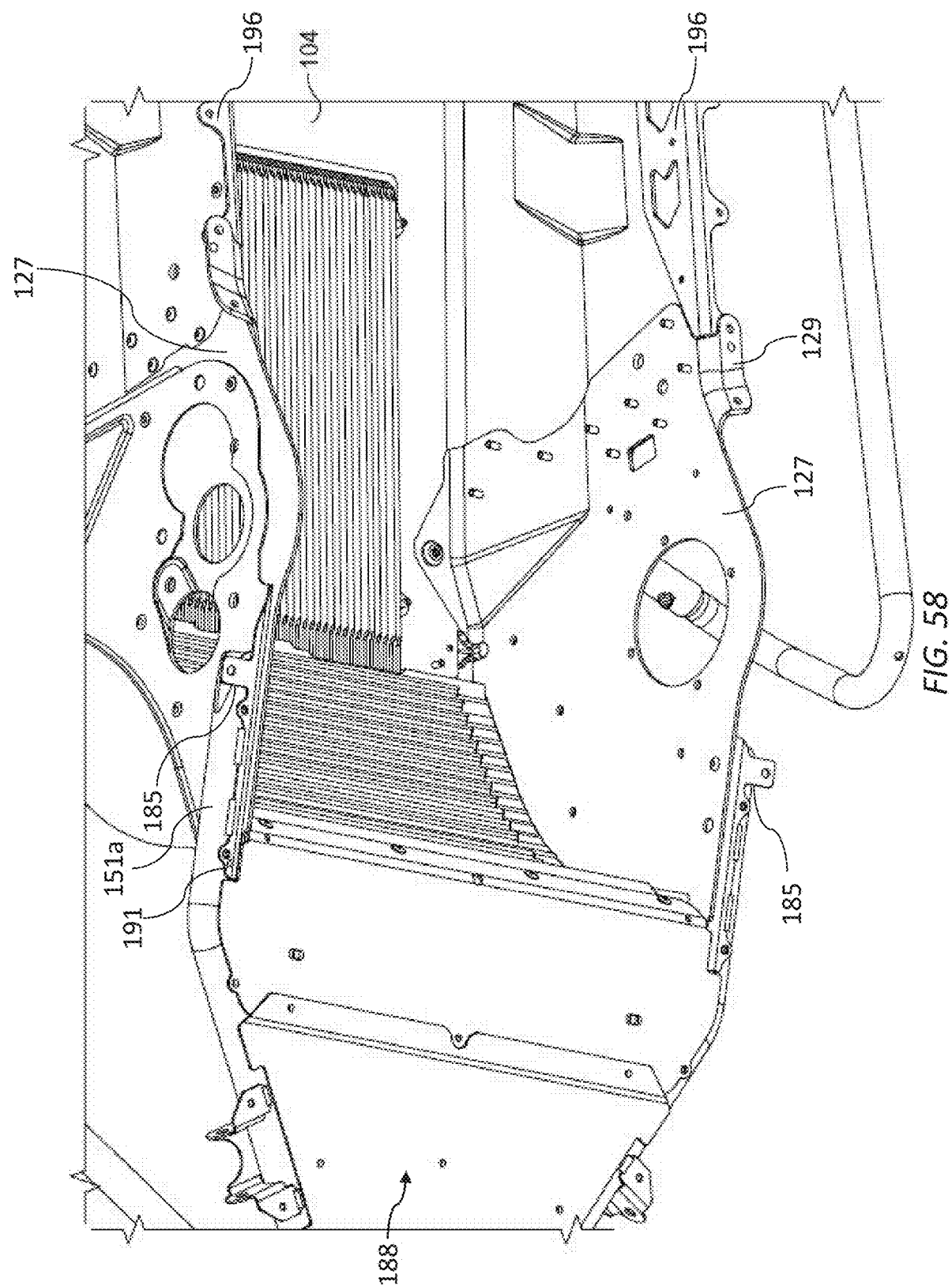
FIG. 58 illustrates a bottom isometric view of a heat exchanger assembly secured to a forward frame associated with the snowmobile of FIG. 6A, according to some embodiments.

In at least one embodiment, a bottom-out protector 348 may be secured to the front frame 125. As illustrated in FIGS. 42-45, the bottom-out protector 348 may include a front end 352 secured to the bottom member 152 of the front frame 125. In some embodiments, the bottom-out protector may be secured to the projecting tab 185 of the end cap 127 (see e.g., FIGS. 45 and 58). In some embodiments, the bottom-out protector 348 may include a channel configured to receive the heat exchanger end cap 127 therein. In some embodiments, the bottom-out protector assembly described in commonly owned U.S. patent application Ser. No. 18/089,952, filed on Dec. 28, 2022 and entitled "Recreational Vehicle Bottom-Out Protector and Assemblies Thereof", the contents of which are incorporated by reference in their entirety, may be used. The bottom-out protector 348a, 348b may include one or more running board mounting points 424, 426, 430 configured to secure the bottom-out protector 348 to the running board 122. For example, FIGS. 43-44 illustrate the running board mounting points 424a, 424b, 426a, 426b, 430a, 430b receiving fasteners therethrough (the fasteners extending through both the bottom-out protector 348 and the running board 122). In some embodiments, the bottom-out protector 348a, 348b may include a frame mounting point 420a, 420b configured to secure the bottom-out protector 348a, 348b to the forward frame 125. The frame mounting point 420a, 420b may be configured to receive a fastener therethrough. In some embodiments, the bottom-out protector 348a, 348b may include a second frame mounting point 418a, 418b configured to secure the bottom-out protector 348a, 348b to the forward frame 125.

Figure 45:
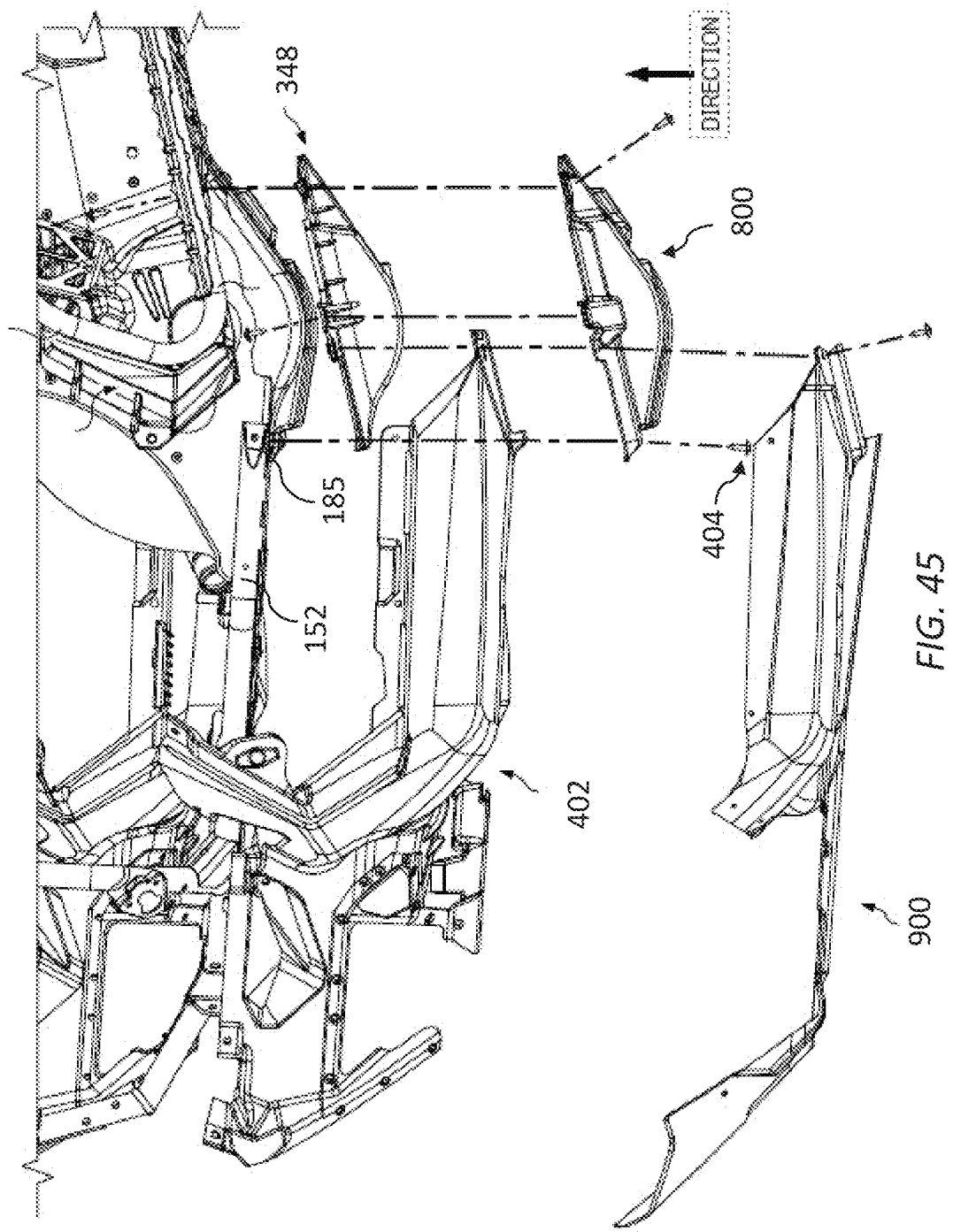
FIG. 45 illustrates an exploded left side view of a skid plate assembly and bottom out protector securing to a front frame, according to some embodiments.
Figure 47:
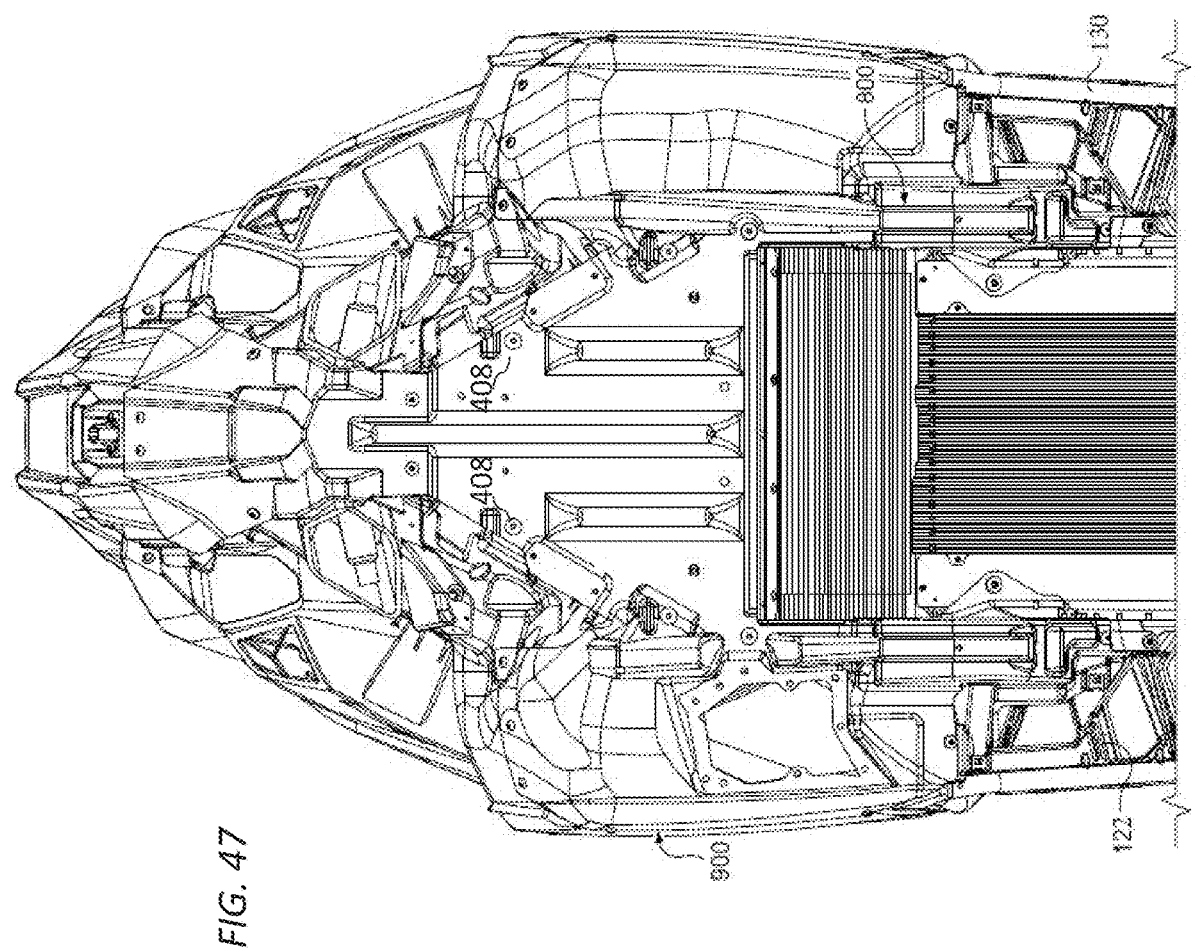
FIG. 47 illustrates a bottom view of the front frame including an accessory skid plate, according to some embodiments.
Figure 48:
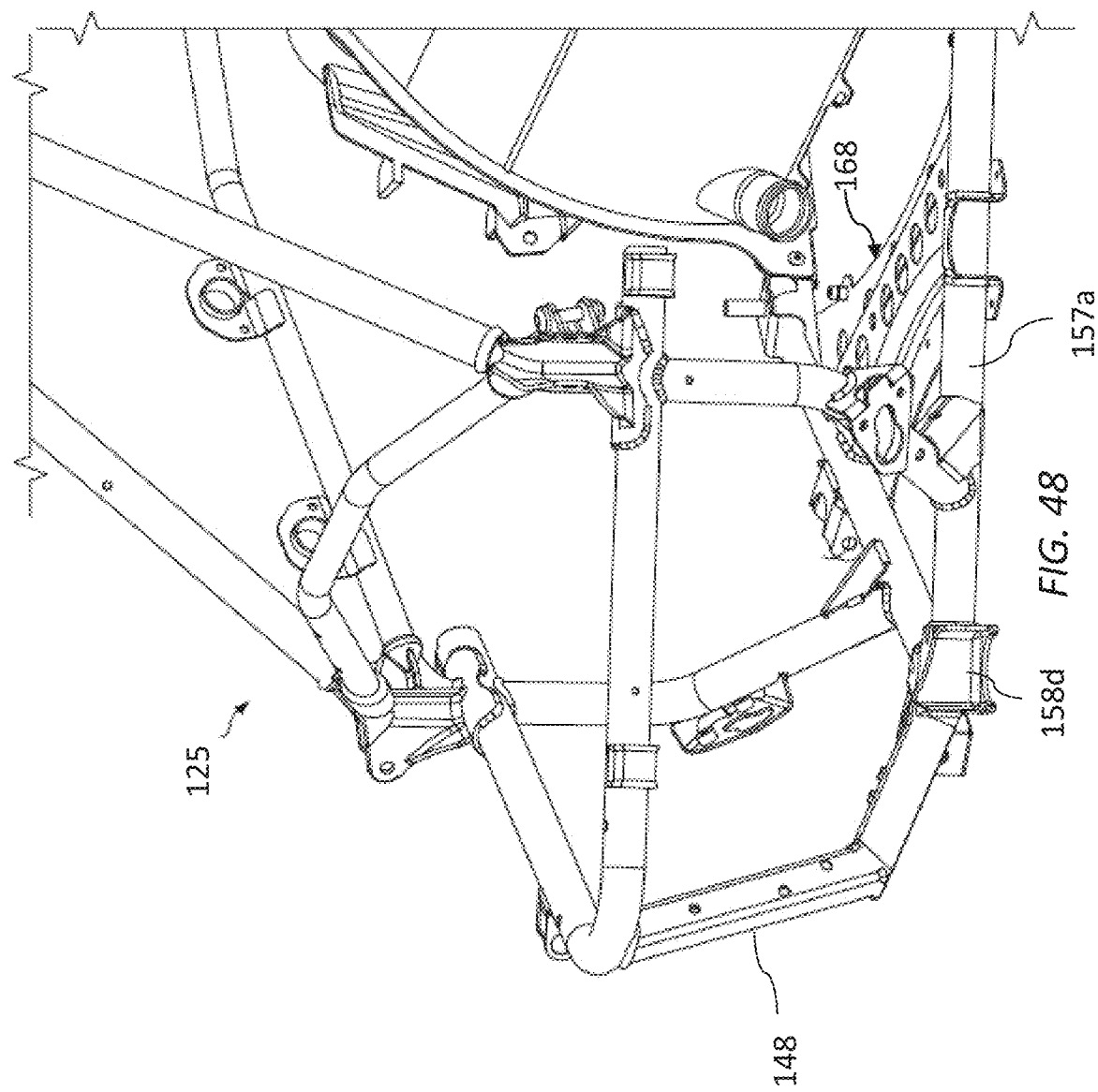
FIG. 48 illustrates an isometric view of the front frame, according to some embodiments.

In at least one embodiment, a skid plate 402, a track drive protector 800, and/or an accessory skid plate 900 may be secured to the front frame 125. FIG. 45 illustrates an exploded view of the bottom-out protector 348, the skid plate 402, and the track drive protector 800 secured to the bottom member 152 of the front frame 125 via a fastener 404. In some embodiments, the arms 157a, 157b may include a plurality of mounting holes 406 configured to align with the accessory skid plate 900 (see FIGS. 46-47). In some embodiments, the bottom plate 168 may secure the belly pan 188, and fasteners 408 may extend through the belly pan 188 to secure the accessory skid plate 900 to the front frame 125. In some embodiments, the skid plate 402, the track drive protector 800, and/or the accessory skid plate 900 may be secured to the projecting tab 185 of the end cap (see e.g., FIGS. 45 and 58). In some embodiments, the skid plate/bottom-out protector assembly described in commonly owned U.S. patent application Ser. No. 18/090,170, filed on Dec. 28, 2022 and entitled "Skid Plate, Secondary Skid Plate, and Track Drive Protector for a Recreational Vehicle", the contents of which are incorporated by reference in their entirety, may be used.

In at least one embodiment, a method of assembling a snowmobile includes: coupling a first forward leg 140*a*, a horizontal member 166, a cross-tube 144, and an upper front member 146 to a first joint 158*a*1; coupling a second forward leg 140*b*, the cross-tube 144, the upper front member 146 to a second joint 158*a*2; coupling a lower front member 148 and the first and second arms 157*a*, 157*b* of the lower member 152 to a third joint 158*d*; optionally coupling a first upright support 150*a* and the first arm 157*a* at a fourth joint 158*g*1; optionally coupling a second upright support 150*b* and the arm 157*b* at a fifth joint 158*g*2; optionally coupling the first upright support 150*a* and the upper front member 146 at a sixth joint 158*h*1; optionally coupling the second upright support 150*b* and the upper front member 146 at a seventh joint 158*h*2; optionally coupling the lower front member 148 to the upper front member 146 at a eighth joint 158*i*; and optionally coupling the first forward leg 140*a*, the second forward leg 140*b*, a first rearward leg 142*a*, and a second rearward leg 142*b* to a column steering mount 136. The method may further include coupling a first metal plate component 154 to the first arm 157*a* and to the first rearward leg 142*a*; and coupling a second metal plate component 156 to the second arm 157*b* and to the second rearward leg 142*b*. The method may further include coupling the horizontal member 166 to a flange 350 of the first metal plate component 154. The method may further include coupling a bottom plate 168 to the first and second arms 157*a*, 157*b* of the lower member 152. The method may further include coupling a rear belly pan 188 to the bottom plate 168. The method may further include coupling a front belly pan 200 to the bottom plate 168. The method may further include releasably coupling a horizontal member 240 to the first joint 158*a* and to the second metal plate component 156 of the front frame 125. The method may further include coupling the first rearward leg 142*a* and the second rearward leg 142*b* to a tunnel 104 with at least one removable fastener 82. The method may further include coupling a front bumper assembly to the upper front member 146. The method may further include coupling a steering column 112 to the column steering mount 136. The method may further include coupling the steering column 112 to the third joint 158*d*. The method may further include coupling a first running board assembly to the first rearward leg 142*a* and coupling a second running board assembly to the second rearward leg 142*b*. The method may further include coupling the first and second running board assemblies to the front frame 125. The method may further include coupling a heat exchanger assembly 126 to the first and second metal plate components 154, 156. The method may further include coupling the heat exchanger assembly 126 to the tunnel 104. The method may further include coupling an engine to the bottom plate 168. The method may further include coupling a belt housing assembly to at least one of the metal plate components 154, 156. The method may further include removably coupling the belt housing assembly to the heat exchanger assembly 126 with a plurality of removable fasteners. The method may further include removably coupling the belt housing assembly to the tunnel 104 with a plurality of removable fasteners. The method may further include coupling a front suspension with a plurality of fasteners. Coupling the front suspension may include coupling a first vibrational dampener 226 to the first joint 158*a*1; coupling a second vibrational dampener 226 to the second joint 158*a*2; coupling a forward arm of a first lower A-arm 222 to the third joint 158*d*; coupling a forward arm of a second lower A-arm 222 to the third joint 158*d*; coupling a rearward arm of the first lower A-arm 222 to a suspension mount 158*e*1; coupling a rearward arm of the second lower A-arm 222 to a suspension mount 158*e*2; coupling a tie bar 224 to the third joint 158*d*; coupling a forward arm of a first upper A-arm 220 to a suspension mount 158*b*1; coupling a forward arm of a second upper A-arm 220 to a suspension mount 158*b*2; coupling a rearward arm of the first upper A-arm 220 to a suspension mount 158*f*1; coupling a rearward arm of the second upper A-arm to a suspension mount 158*f*2. Coupling the front suspension may further include coupling a first suspension subassembly 250*a* to the rearward arm of the first lower A-arm 222 and to a suspension mount 158*c*1; and coupling a second suspension subassembly 250*b* to a suspension mount 158*c*2.

In some embodiments, a method of assembling front frame 125 includes: coupling a first forward leg 140*a*, a horizontal member 166, a cross-tube 144, and an upper front member 146 to a first joint 158*a*1; coupling a second forward leg 140*b*, the cross-tube 144, the upper front member 146, to a second joint 158*a*2; and coupling one or both of a lower front member 148 and tube members 157*a,b* to a third joint 158*d*. The method may also include one or more steps of coupling a first upright support 150*a* and the first arm 157*a* of the lower member 152 at a fourth joint 158*g*1; coupling a second upright support 150*b* and the second arm 157*b* of the lower member 152 at a fifth joint 158*g*2; coupling the lower front member 148 to the upper front member 146 at a sixth joint 158*i*; and coupling the first forward leg 140*a*, the second forward leg 140*b*, a first rearward leg 142*a*, and a second rearward leg 142*b* to a column steering mount 136. The method may further include coupling a first metal plate component 154 to the first arm 157*a* of the lower member 152 and to the first rearward leg 142*a*; and coupling a second metal plate component 156 to the second arm 157*b* of the lower member 152 and to the second rearward leg 142*b*. The method may further include coupling the horizontal member 166 to a rearward joint 239. The rearward joint 239 may include a flange 350 of the first metal plate component 154. The method may further include coupling a bottom plate 168 to the first and second arms 157*a*, 157*b* of the lower member 152. The method may further include coupling a rear belly pan 188 to the bottom plate 168. The method may further include coupling a front belly pan 200 to the bottom plate 168.

In some embodiments, a method of assembling a forward frame assembly 124 includes: forming a front frame 125 and releasably coupling a horizontal member 240 to the front frame 125. Forming the front frame 125 includes coupling a first forward leg 140*a*, a horizontal member 166, a cross-tube 144, and an upper front member 146 to a first joint 158*a*1; coupling a second forward leg 140*b*, the cross-tube 144, and the upper front member 146 to a second joint 158*a*2; and coupling one or both of a lower front member 148 and the first and second arms 157*a*, 157*b* of the lower member 152 to a third joint 158*d*. The method may optionally comprise one or more steps of coupling a first upright support 150*a* and the first arm 157*a* of the lower member 152 at a fourth joint 158*g*1; coupling a second upright support 150*b* and the second arm 157*b* of the lower member 152 at a fifth joint 158*g*2; coupling the lower front member 148 to the upper front member 146 at a sixth joint 158*i*; and coupling the first forward leg 140*a*, the second forward leg 140*b*, a first rearward leg 142*a*, and a second rearward leg 142*b* to a column steering mount 136. Forming the front frame 125 may include coupling a first metal plate component 154 to the first arm 157*a* of the lower member 152 and to the first rearward leg 142*a*; and coupling a second metal plate component 156 to the second arm 157*b* of the lower member 152 and to the second rearward leg 142*b*. The first and second metal plate components 154, 156 may include a flange 340, 304 for coupling to the first and second arms 157*a*, 157*b* of the lower member 152. Forming the front frame 125 may further include coupling the horizontal member 166 to a flange 350 of the first metal plate component 154. Forming the front frame 125 may further include coupling a bottom plate 168 to arms 157*a*, 157*b* of the lower member 152. Forming the front frame 125 may further include coupling a rear belly pan 188 to the bottom plate 168. Forming the front frame 125 may further include coupling a front belly pan 200 to the bottom plate 168. The horizontal member 240 may be releasably coupled to the first joint 158*a* and to the second metal plate component 156 of the front frame 125.

In some embodiments, a method of assembling a front frame 125 includes coupling a lower frame section 54 and an upper frame section 56. The lower frame section may include an upper front member 146, a lower front member 148, a first upright support 150*a*, a second upright support 150*b*, and the lower member 152. Components of the lower frame section 54 may be coupled by a first joint 158*d*, a second joint 158*g*, a third joint 158*h*, flange 340, and flange 304. The lower frame section 54 may further include a bottom plate 168. The lower frame section 54 may further include at least one belly pan 188, 200. The upper frame section 56 may include forward legs 140*a*, 140*b*, rearward legs 142*a*, 142*b*, steering column mount component 136, cross-tube 144, and horizontal member 166. Components of the upper frame section 56 may be coupled by the steering column mount component 126 and a fourth joint 158*a*. The upper frame section 56 may further include an upper frame member 138. The upper frame member 138 may couple the forward legs 140*a,b*. The upper and lower frame sections 54, 56 may be coupled at the fourth joints 158*a*. The upper and lower frame sections 54, 56 may be further coupled by a metal plate component 154, 156. The lower frame section 54 may further include a track drive shaft 195, a heat exchanger assembly 126, and an engine. The end caps 127 of the heat exchanger assembly 126 may be coupled to the metal plate components 154, 156. The engine may be positioned forward of the heat exchanger assembly 126.

In some embodiments, a method of assembling a snowmobile 100 includes coupling a running board support 196 to tunnel 104; coupling a heat exchanger assembly 126 to the tunnel 104; coupling the common front frame 125 to the heat exchanger assembly 126 and/or the tunnel 104; and coupling a support member 130 to the front frame 125 and the tunnel 104 or running board support 196. The method of assembling the snowmobile 100 may further include coupling a running board to the support member 130, coupling a front toe stop 128, and coupling a rear kick-up panel 132. The method of assembling the snowmobile 100 may further include coupling a rear bumper 120. The method of assembling the snowmobile 100 may further include positioning an engine within the front frame 125, coupling the engine to the front frame 125, and coupling a horizontal member 240 to the front frame 125.

In some embodiments, a method of assembling two different types of snowmobiles 100*a*, 100*b* with a common forward frame 125/124 includes providing a common forward frame that includes a longitudinal centerline 10 and a steering column mount component 136 positioned at an upper portion of the common forward frame 124, the steering column mount component 136 including a first side 181 and a second side 183, the first side 181 is positioned forward of the second side 183 along the longitudinal centerline 10; providing a first steering assembly that includes a steering column 112*a* and a handlebar 114*a* having a first pivot axis; providing a second steering assembly including a steering column 112*b* and a handlebar 114*b* having a second pivot axis that is different than the first pivot axis; and securing the first steering assembly or the second steering assembly to the steering column mount component 136, wherein the steering column 112*a* of the first steering assembly is positioned on the second side 183 of the steering column mount when the first steering assembly is secured to the steering column mount component 136, and wherein the steering column 112*b* of the second steering assembly is positioned on the first side 181 of the steering column mount component 136 when the second steering assembly is secured to the steering column mount component 136.

In some embodiments, a method of assembling two different types of snowmobiles with a common forward frame 125/124 includes providing a common front frame 125 including a centerline 10 and a control arm joint 158*d*, 158*e*; providing a first suspension assembly 104*a* including a control arm and a spindle 228 that includes a front mount 232*a* comprising a ball joint; providing a second suspension assembly 104*b* that is different than the first suspension assembly 104*a*, the second suspension assembly 104*b* including a control arm and a spindle 228*b* that includes a front mount 232*b* comprising a ball joint; and securing the control arm of either the first suspension assembly or the second suspension assembly to the control arm mounting point 158*d*, 158*e*, wherein the ball joint of the first front mount 232*a* is positioned at a different position along the centerline 10 of common forward frame 125/124 than the ball joint of the second front mount 232*b* when the respective suspension assembly is secured to the common forward frame 125/124.

Figure 66:
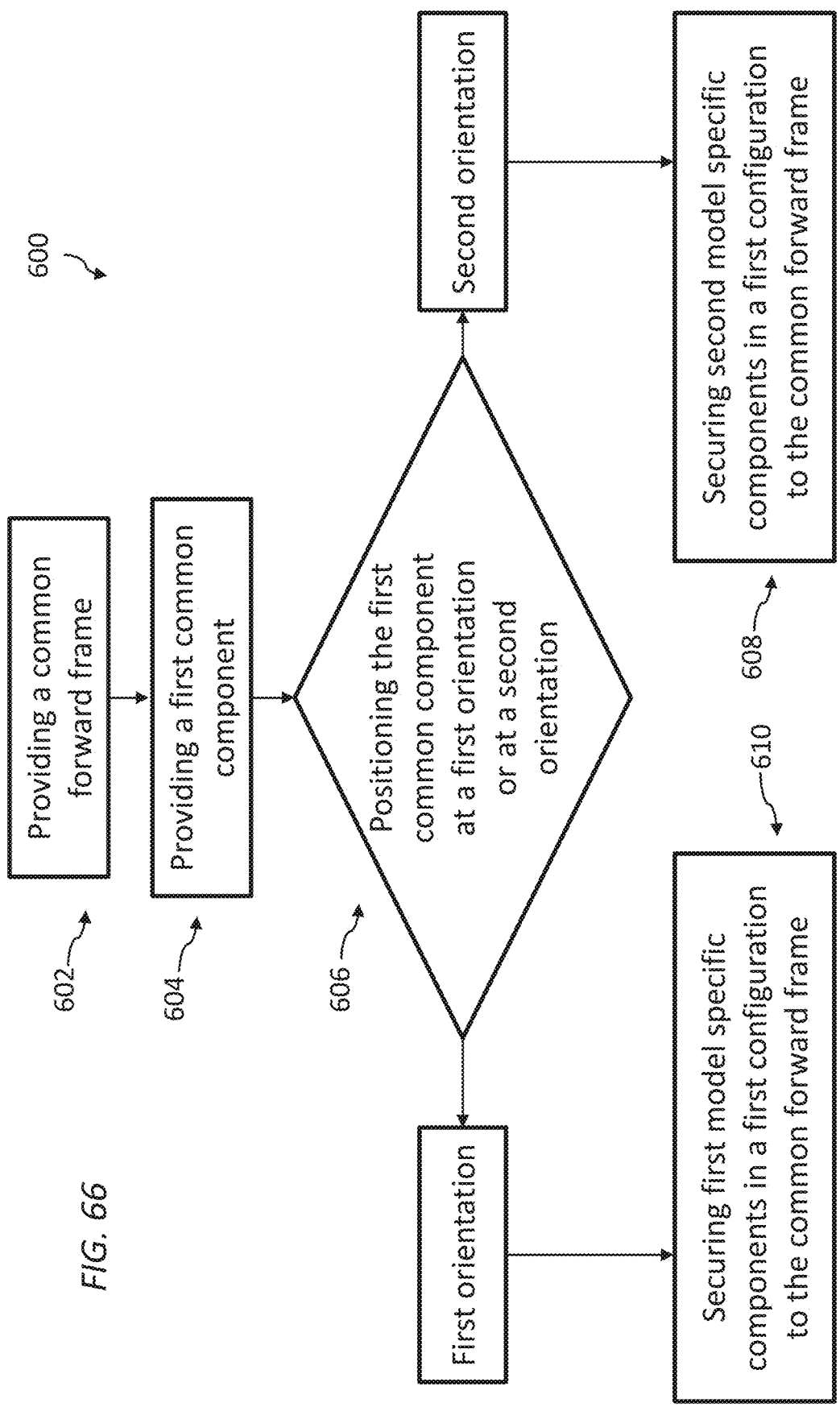
FIG. 66 illustrates a flow chart of a method of assembling a two snowmobiles with a common forward frame, according to some embodiments.

As illustrated in FIG. 66, a method 600 of assembling two different snowmobile models (e.g., the snowmobile of FIG. 6A and the snowmobile of FIG. 6B) with a common forward frame assembly (e.g., the forward frame assembly 124/125) is described. The method 600 includes providing a common forward frame 602; providing a first common component 604; positioning the first common component at a first orientation or at a second orientation with respect to the common forward frame 606; securing the first common component at the first orientation or at the second orientation, which may include selecting between a first set of first model components and a second set of second model components; and securing the first set of first model components 610 or the second set of second model components 612. In some embodiments, the first common component may include one or more of a running board 122, a belt case assembly 550, or a track drive shaft 195. In some embodiments the first set of first model components includes one or more of a first running board support tube 130*a*, a first support bracket 196, a first toe stop 128*a*, a first bottom-out protector 348*a*, a first spindle 228*a*, a first heat exchanger end cap 127*a*, a first steering column assembly 112*a*, and/or a first skid plate assembly 402. In some embodiments, the second set of second model components includes one or more of a second running board support tube 130b, a second support bracket 196, a second toe stop 128b, a second bottom-out protector 348b, a second spindle 228b, a second heat exchanger end cap 127b, a second steering column assembly 112b, and/or a second skid plate assembly 402.

Figure 67:
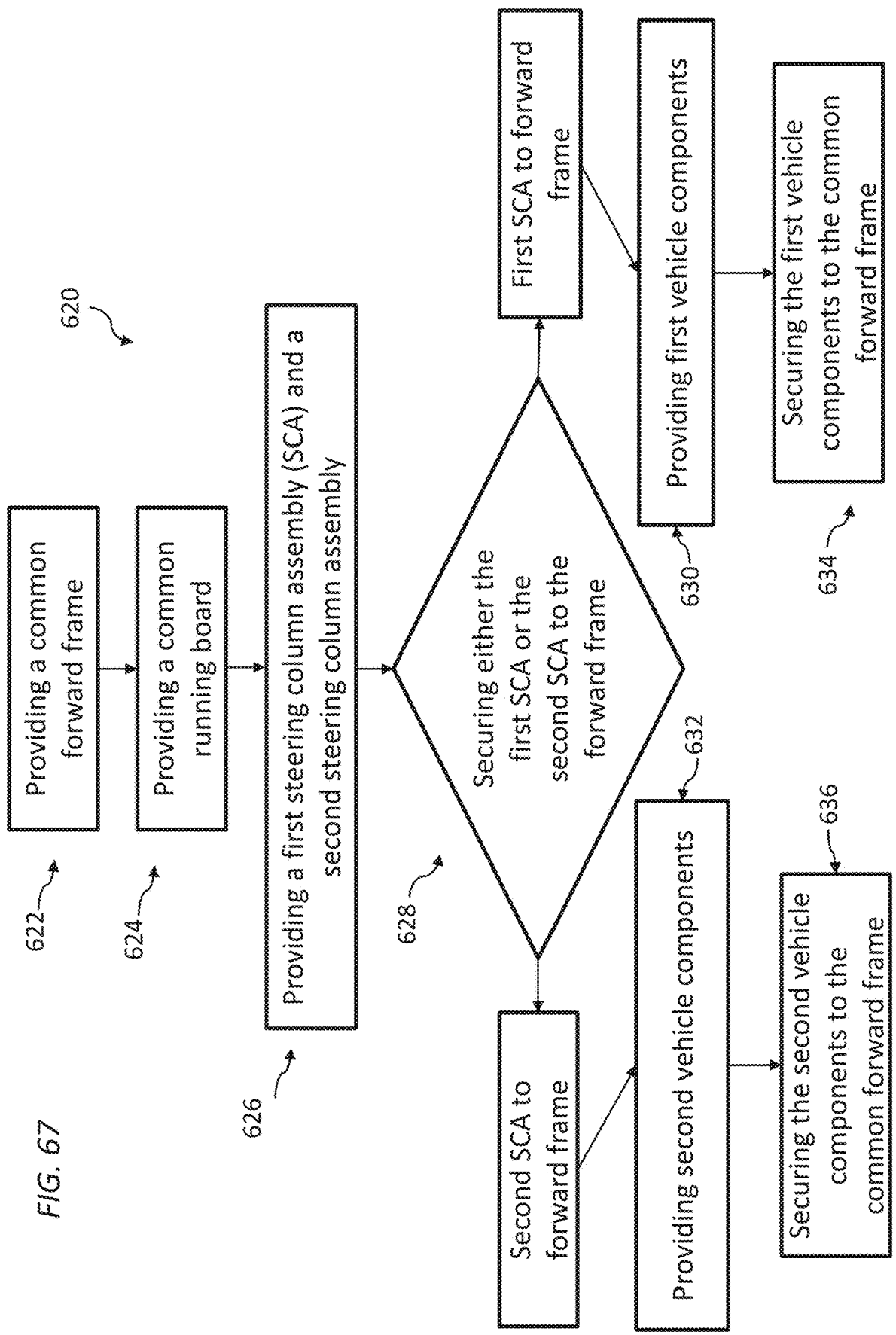
FIG. 67 illustrates a flow chart of a method of assembling a two snowmobiles with a common forward frame, according to some embodiments.

As illustrated in FIG. 67, a method 620 of assembling two different snowmobile models (e.g., the snowmobile of FIG. 6A and the snowmobile of FIG. 6B) with a common forward frame assembly (e.g., the forward frame assembly 124/125) is described. The method 620 includes providing a common forward frame assembly including a mounting feature 622; providing a running board positionable with respect to the common forward frame in a first position for a first snowmobile and in a second position for a second snowmobile 624; and providing a first steering column assembly and a second steering column assembly 626, wherein the first steering column assembly is configured to be secured at a first steering column orientation on the common forward frame for the first snowmobile and wherein the second steering column assembly is configured to be secured at a second steering column location on the common forward frame for the second snowmobile 628. The method 620 further includes providing second vehicle components 632 and securing the second vehicle components to the forward frame 636, or providing first vehicle components 630 and securing the first vehicle components to the forward frame 634. In some embodiments the first set of first model components includes one or more of a first running board support tube 130a, a first support bracket 196, a first toe stop 128a, a first bottom-out protector 348a, a first spindle 228a, a first heat exchanger end cap 127a, a first steering column assembly 112a, and/or a first skid plate assembly 402. In some embodiments, the second set of second model components includes one or more of a second running board support tube 130b, a second support bracket 196, a second toe stop 128b, a second bottom-out protector 348b, a second spindle 228b, a second heat exchanger end cap 127b, a second steering column assembly 112b, and/or a second skid plate assembly 402.

Figure 68:
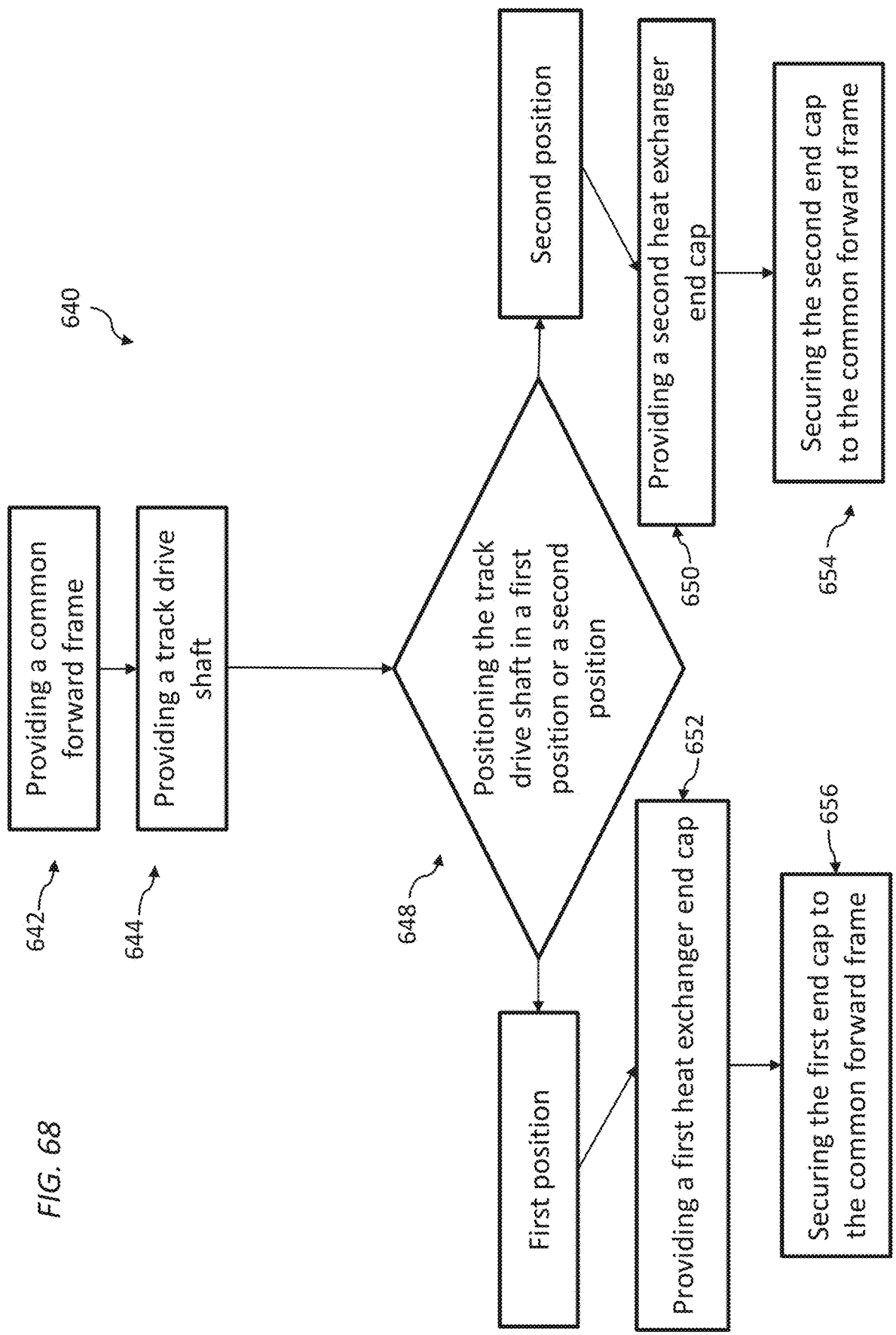
FIG. 68 illustrates a flow chart of a method of assembling a two snowmobiles with a common forward frame, according to some embodiments.

As illustrated in FIG. 68, a method 640 of assembling two different snowmobile models (e.g., the snowmobile of FIG. 6A and the snowmobile of FIG. 6B) with a common forward frame assembly (e.g., the forward frame assembly 124/125) is described. The method 640 may include providing the common forward frame including a mounting feature 642; providing a track drive shaft 644; positioning the track drive shaft with respect to the common forward frame in a first position for a first snowmobile and in a second position for a second snowmobile 648; and securing a first heat exchanger end cap to the mounting feature of the common forward frame for the first snowmobile 652, 656; or securing a second heat exchanger end cap different from the first heat exchanger end cap to the mounting feature of the common forward frame for the second snowmobile 650, 654.

Figure 69:
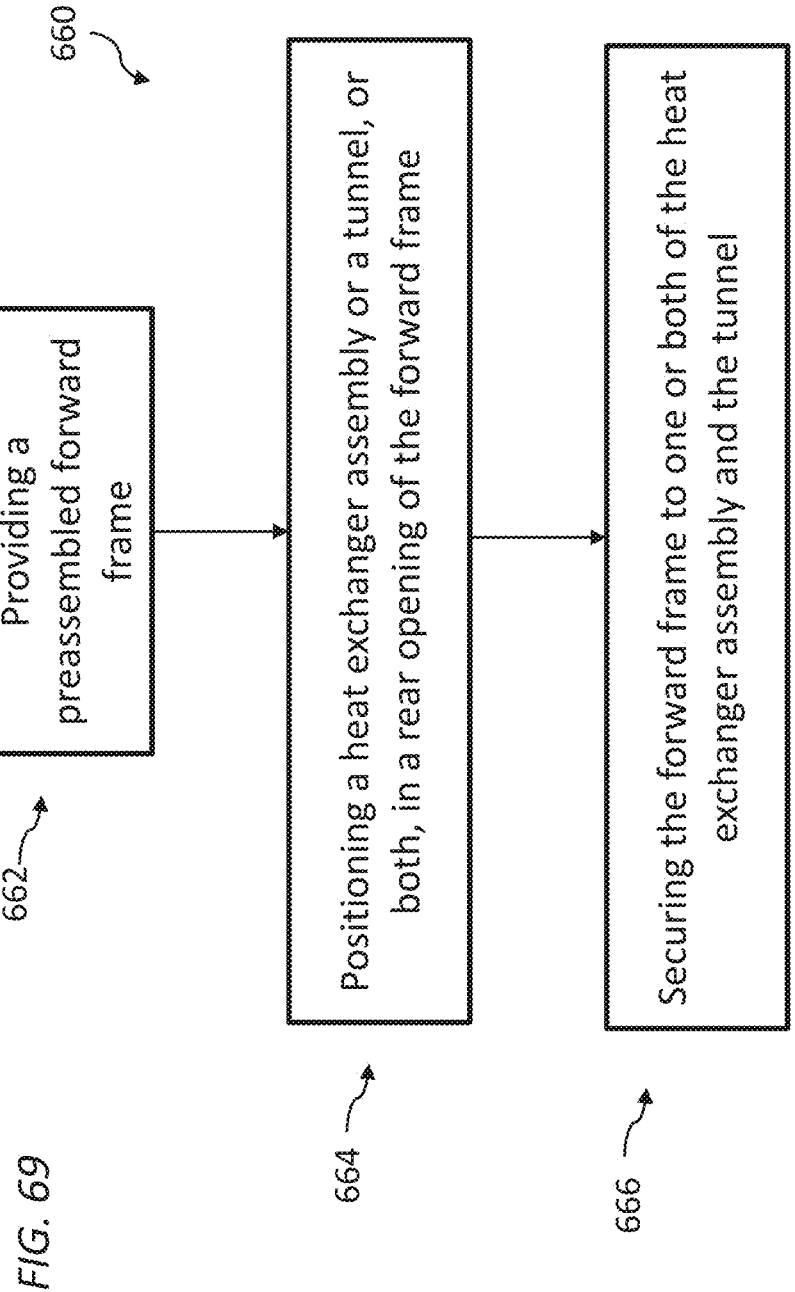
FIG. 69 illustrates a flow chart of a method of assembling a two snowmobiles with a common forward frame, according to some embodiments.

As illustrated in FIG. 69, a method 660 of assembling two different snowmobile models (e.g., the snowmobile of FIG. 6A and the snowmobile of FIG. 6B) with a common forward frame assembly (e.g., the forward frame assembly 124/125) is described. The method 660 may include providing a preassembled forward frame including a front and rear, the forward frame including a first side and a second side, wherein the first side and the second side are spaced apart to define a rear opening at the rear of the forward frame 662; positioning at least a portion of a heat exchanger assembly, a tunnel, or both in the rear opening between the first side and the second side 664; and securing the forward frame to one or both of the heat exchanger assembly and the tunnel 666.

In other embodiments, a method of assembling a snowmobile includes providing a preassembled forward frame including a front and rear, the forward frame including a first side and a second side, wherein the first side and the second side are spaced apart to define a rear opening at the rear of the forward frame; positioning at least a portion of a heat exchanger assembly, a tunnel, or both in the rear opening between the first side and the second side; and securing the forward frame to one or both of the heat exchanger assembly and the tunnel.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A method of assembling two snowmobiles with a common frame, the method comprising:
providing a common forward frame;

providing a first common component, wherein the first common component is positionable at a first orientation and positionable at a second orientation with respect to the common forward frame;

positioning the first common component at the first orientation or at the second orientation with respect to the common forward frame;

securing the first common component at the first orientation or at the second orientation;

selecting between a first set of first model components and a second set of second model components; and securing the first set of first model components or the second set of second model components.

2. The method of claim 1, wherein the first common component is a running board, a belt case assembly, or a track drive shaft.

3. The method of claim 2, wherein the first set of first model components includes one or more of a first running board support tube, a first support bracket, a first toe stop, a first bottom-out protector, a first spindle, a first heat exchanger end cap, a first steering column assembly, and/or a first skid plate assembly.

4. The method of claim 3, wherein the second set of second model components includes one or more of a second running board support tube, a second support bracket, a second toe stop, a second bottom-out protector, a second spindle, a second heat exchanger end cap, a second steering column assembly, and/or a second skid plate assembly.

5. A method of assembling two snowmobiles with a common forward frame, the method comprising:

providing a common forward frame assembly including a mounting feature;

providing a running board positionable with respect to the common forward frame in a first position for a first snowmobile and in a second position for a second snowmobile; and providing a first steering column assembly and a second steering column assembly, wherein the first steering column assembly is configured to be secured at a first steering column orientation on the common forward frame for the first snowmobile and wherein the second steering column assembly is configured to be secured at a second steering column location on the common forward frame for the second snowmobile, wherein the common forward frame assembly includes a pivot mount joint configured to receive a lower portion of a steering column at a plurality of locations.

6. The method of claim 5, further comprising providing a common belt housing assembly positionable with respect to the common forward frame in a first position for the first snowmobile and in second position for the second snowmobile.

7. The method of claim 5, further comprising providing a common track drive shaft positionable with respect to the common forward frame in a first position for a first snowmobile and in a second position for a second snowmobile.

8. The method of claim 5, further comprising securing a first running board support tube to the mounting feature of the common forward frame for the first snowmobile, or securing a second running board support tube to the mounting feature of the common forward frame for the second snowmobile.

9. The method of claim 5, further comprising securing a first toe stop to the common forward frame for the first snowmobile, or securing a second toe stop to the common forward frame for the second snowmobile.

10. The method of claim 5, further comprising securing a first bottom-out protector to the common forward frame for the first snowmobile, or securing a second bottom-out protector to the common forward frame for the second snowmobile.

11. The method of claim 5, further comprising securing a first spindle assembly to the common forward frame for the first snowmobile, or securing a second spindle assembly to the common forward frame for the second snowmobile.

12. The method of claim 5, wherein the first snowmobile and the second snowmobile include a tunnel having an equal tunnel width.

13. The method of claim 5, further comprising providing a caliper, wherein the caliper is positionable at a first caliper location on the first snowmobile and at a second caliper location on the second snowmobile.

14. A method of assembling different snowmobiles with a common forward frame, the method comprising:

providing the common forward frame including a mounting feature;

providing a track drive shaft positionable with respect to the common forward frame in a first position for a first snowmobile and positionable with respect to the common forward frame in a second position for a second snowmobile; and securing a first heat exchanger end cap to the mounting feature of the common forward frame for the first snowmobile, or securing a second heat exchanger end cap different from the first heat exchanger end cap to the mounting feature of the common forward frame for the second snowmobile.

15. The method of claim 14, wherein the common forward frame includes a lower frame member, the mounting feature positioned on the lower frame member.

16. The method of claim 15, wherein a heat exchanger body is coupled to the heat exchanger end cap and wherein the mounting feature is positioned forward of the heat exchanger body.

17. The method of claim 16, further comprising providing a running board positionable with respect to the common forward frame in a first position for the first snowmobile and in a second position for the second snowmobile.

18. The method of claim 17, further comprising providing a common belt housing assembly positionable with respect to the common forward frame in a first position for the first snowmobile and in second position for the second snowmobile.

19. The method of claim 18, further comprising:

securing a first running board support tube to the mounting feature of the common forward frame for the first snowmobile, or securing a second running board support tube to the mounting feature of the common forward frame for the second snowmobile;

securing a first toe stop to the common forward frame for the first snowmobile, or securing a second toe stop to the common forward frame for the second snowmobile;

securing a first bottom-out protector to the common forward frame for the first snowmobile, or securing a second bottom-out protector to the common forward frame for the second snowmobile; and securing a first spindle assembly to the common forward frame for the first snowmobile, or securing a second spindle assembly to the common forward frame for the second snowmobile.

20. A method of assembling a snowmobile comprising:

providing a preassembled forward frame including a front and rear, the forward frame including a first side and a second side, wherein the first side and the second side are spaced apart to define a rear opening at the rear of the forward frame, wherein each of the first side and the second side includes an inner perimeter defining a side opening;

positioning at least a portion of a heat exchanger assembly, a tunnel, or both in the rear opening between the first side and the second side;

securing the forward frame to one or both of the heat exchanger assembly and the tunnel;

inserting an engine through the side opening of the second side; and securing the engine to the forward frame.

21. A method of assembling two different snowmobiles with a common forward frame, the method comprising:
providing a common forward frame;
providing a first body component securable to the common forward frame and a second body component securable to the common forward frame;
selecting between the first body component and the second body component;
securing one of the first body component or the second body component to the forward frame based on the selection; and
securing a track drive shaft in a first position with respect to the forward frame when the first body component is secured to the forward frame or securing a track drive shaft in a second position with respect to the forward frame when the second body component is secured to the forward frame, wherein the first position is different than the second position.

22. The method of claim 21, wherein the first body component and the second body component are different tunnels or different heat exchanger assemblies.

23. The method of claim 21, wherein the first body component and the second body component are steering column assemblies.

24. The method of claim 21, wherein the first body component and the second body component are different front suspensions.

25. The method of claim 21, further comprising:
securing a belt housing assembly to the forward frame, the belt drive housing defining a track drive shaft opening, wherein the track drive shaft opening is located at a first position with respect to the forward frame when the forward frame is secured to the first body component, and wherein the track drive shaft opening is located at a second position with respect to the forward frame when the forward frame is secured to the second body component, wherein the first position is different than the second position.

26. A method of assembling two different types of snowmobiles with a common forward frame comprising:
providing a common forward frame including a longitudinal centerline and a support member mounting point positioned outboard of the longitudinal centerline;
providing a first running board assembly including a support member;
providing a second running board assembly including at least one component that is different than at least one component of the first running board assembly, the second running board assembly including a running board support member; and securing either the first running board assembly or the second running board assembly to the mounting point, wherein the first running board assembly is located at a first position with respect to the longitudinal centerline of the forward frame when secured to the mounting point, and wherein the second running board assembly is located at a second position with respect to the longitudinal centerline of the forward frame when secured to the mounting point, wherein the first position is different than the second position.

27. A powertrain assembly, comprising:
a chassis;
a prime mover positioned on the chassis;
a CVT coupled to the prime mover;
a driven/jack shaft including a first end and a second end, where the first end is operably coupled to the CVT;
a flexible mount positioned adjacent the first end of the driven shaft, the mount secured to the chassis; and
a belt assembly including a top sprocket operably connected to a bearing, a lower sprocket, and a belt operably connected to the sprockets, wherein the top sprocket is positioned a first distance from the lower sprocket, wherein the second end of the driven/jack shaft extends through the bearing, wherein the bearing has two degrees of freedom and the shaft can pivot in response to a torque input to change the center distance between sprockets to a second distance.

28. A method of assembling two types of snowmobiles with different drive track requirements comprising:
providing a common forward frame including a front and rear, the forward frame including a first side, and a second side spaced apart from the first side to define a rear opening at the rear of the forward frame;
providing a first body component associated with a first drive track shaft with a first drive track shaft position and a second body component associated with a second drive track shaft with a second drive track shaft position that is different than the first drive track position, wherein the first drive track shaft is different than the second drive shaft track;
positioning either the first body component or the second body component in the rear opening between the first side and the second side of the common forward frame;
providing a belt drive case that defines a track drive shaft opening; and
securing the belt drive case to the first side of the forward frame, wherein the track drive shaft opening is located at a first position with respect to the first side when the forward frame is secured to the first body component, and wherein the track drive shaft opening is located at a second position with respect to the first side when the forward frame is secured to the second body component, wherein the first position is different than the second position.

* * * * *